(12) United States Patent
Lewis

(10) Patent No.: US 12,210,230 B1
(45) Date of Patent: Jan. 28, 2025

(54) PERSONALIZED OPTICS

(71) Applicant: Percept Technologies Inc., Los Altos, CA (US)

(72) Inventor: Scott W Lewis, Las Vegas, NV (US)

(73) Assignee: Percept Technologies, Las Vegas, NV (US)

( * ) Notice: Subject to any disclaimer, the term of this patent is extended or adjusted under 35 U.S.C. 154(b) by 788 days.

(21) Appl. No.: 17/195,640

(22) Filed: Mar. 9, 2021

Related U.S. Application Data

(63) Continuation of application No. 17/179,268, filed on Feb. 18, 2021.

(51) Int. Cl.
| | |
|---|---|
| *G02C 7/10* | (2006.01) |
| *G02B 27/00* | (2006.01) |
| *G02C 7/08* | (2006.01) |
| *H04N 7/18* | (2006.01) |

(52) U.S. Cl.
CPC ......... *G02C 7/101* (2013.01); *G02B 27/0093* (2013.01); *G02C 7/083* (2013.01); *H04N 7/18* (2013.01)

(58) Field of Classification Search
CPC .... G02C 7/101; G02C 7/083; G02B 27/0093; H04N 7/18
See application file for complete search history.

(56) References Cited

U.S. PATENT DOCUMENTS

2012/0154920 A1\* 6/2012 Harrison ............. G02B 27/017
359/619

\* cited by examiner

*Primary Examiner* — James C. Jones
(74) *Attorney, Agent, or Firm* — Los Altos Law

(57) ABSTRACT

Eyewear dynamically adjusts viewing effects to match the wearer, the object or scene being viewed (luminance, color prominence, glare, visual blur/noise), other conditions: sensory parameters (gaze direction, focal length, eye gestures, other eye activity, other senses, wearer inputs), medical conditions, wearer location, environmental parameters, wearer activity, use by the wearer, the wearer's field of view. The eyewear can adjust visual features presented to the wearer, such as changes in refraction, polarization/shading, color, prismatic angles/functions, 3D displays. Eyewear can be tailored to form factor: glasses, contacts, RID, IOL, facemask/helmet, vehicles, windows, screens, scopes, AR/VR devices, nerve sensors, external devices. Eyewear can adjust refraction, polarization/shading, color filtering/injection, false coloring, color change; prismatic angles/functions. Eyewear can respond to wearer activity: police, military, firefighter, emergency responder, search and rescue, vehicle operation, sporting/theme-park events, viewing advertising/storefronts, conversation. Hybrid optimization of eyewear can be personalized to users.

20 Claims, 22 Drawing Sheets

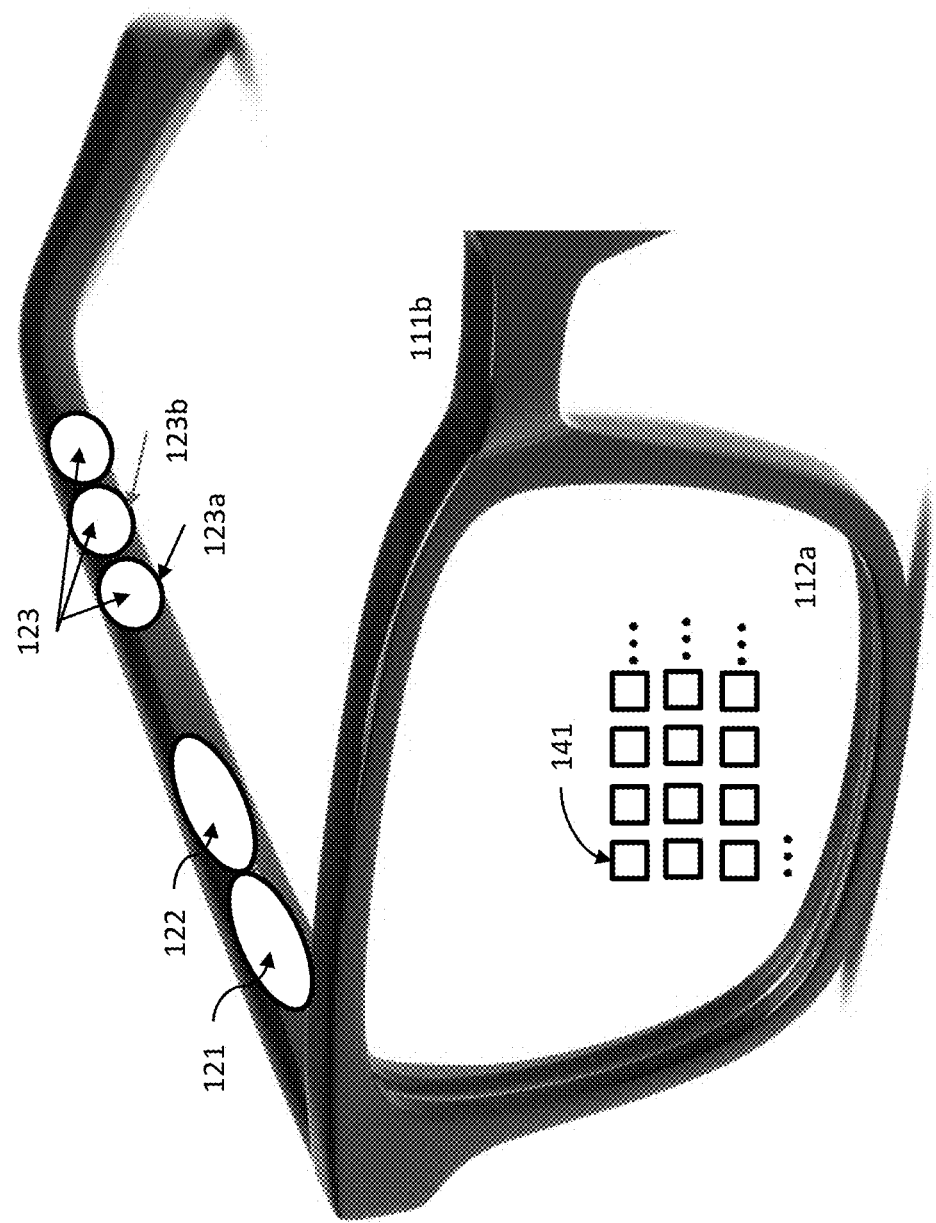
Figure 1A Eyewear 100

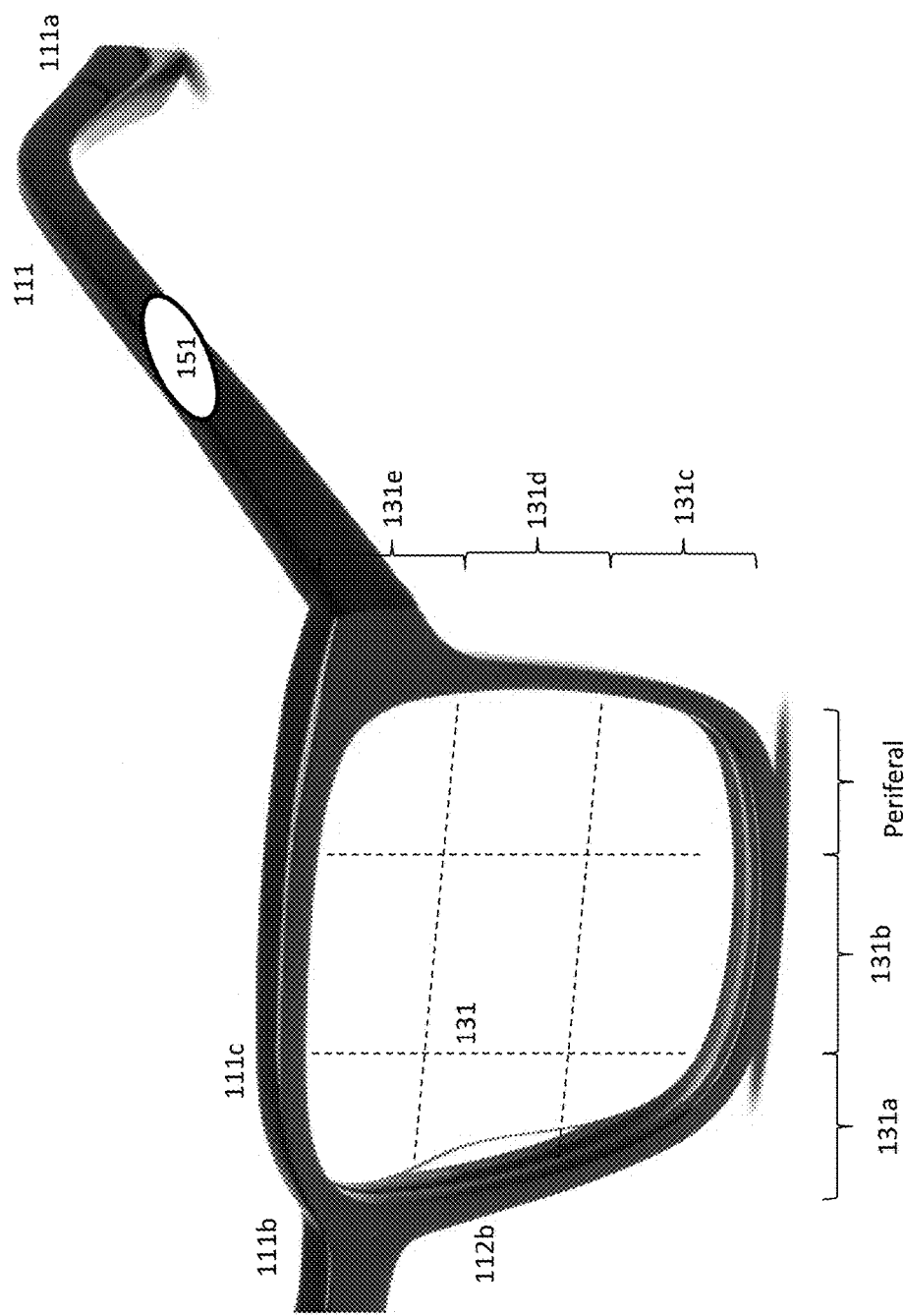

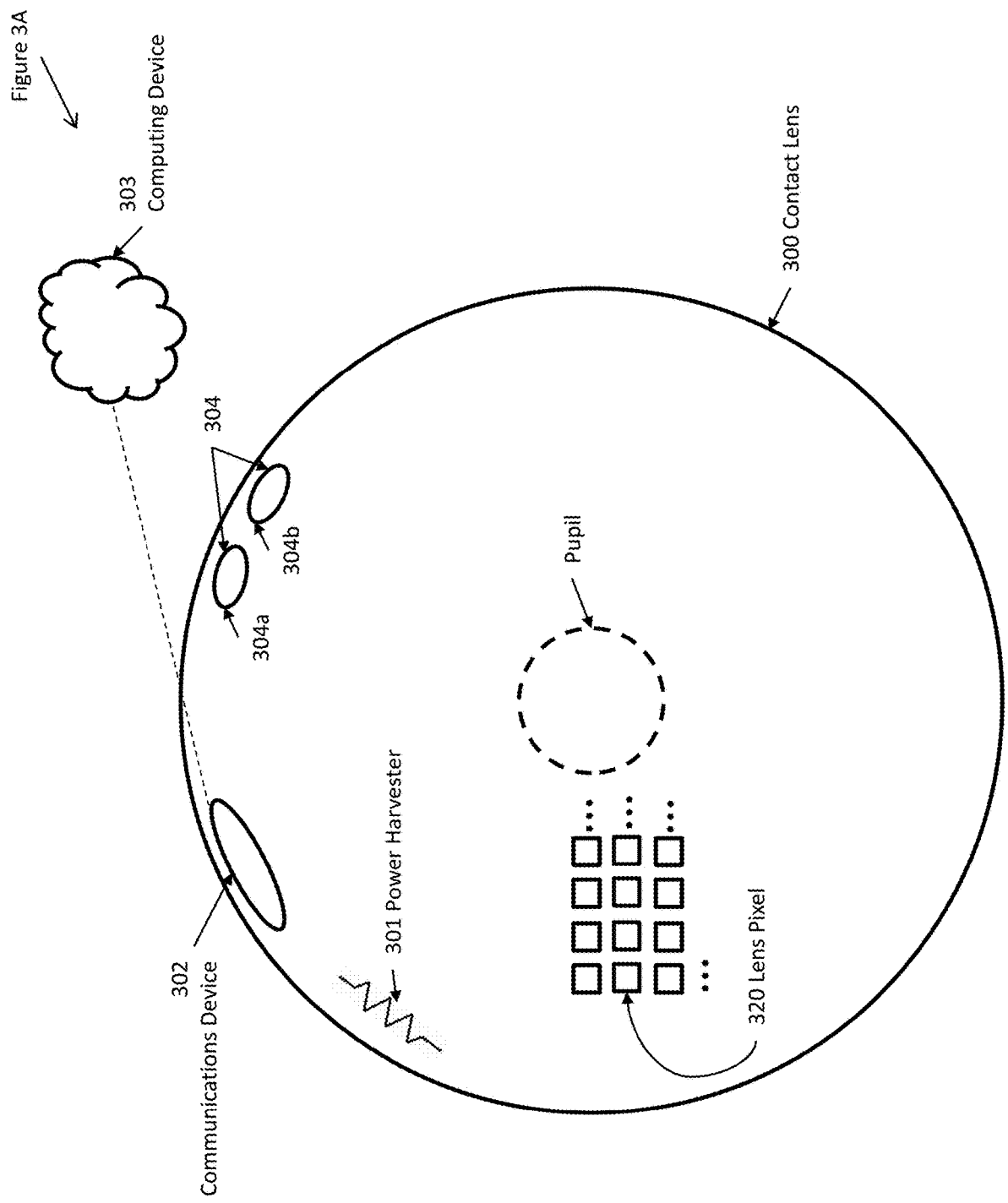

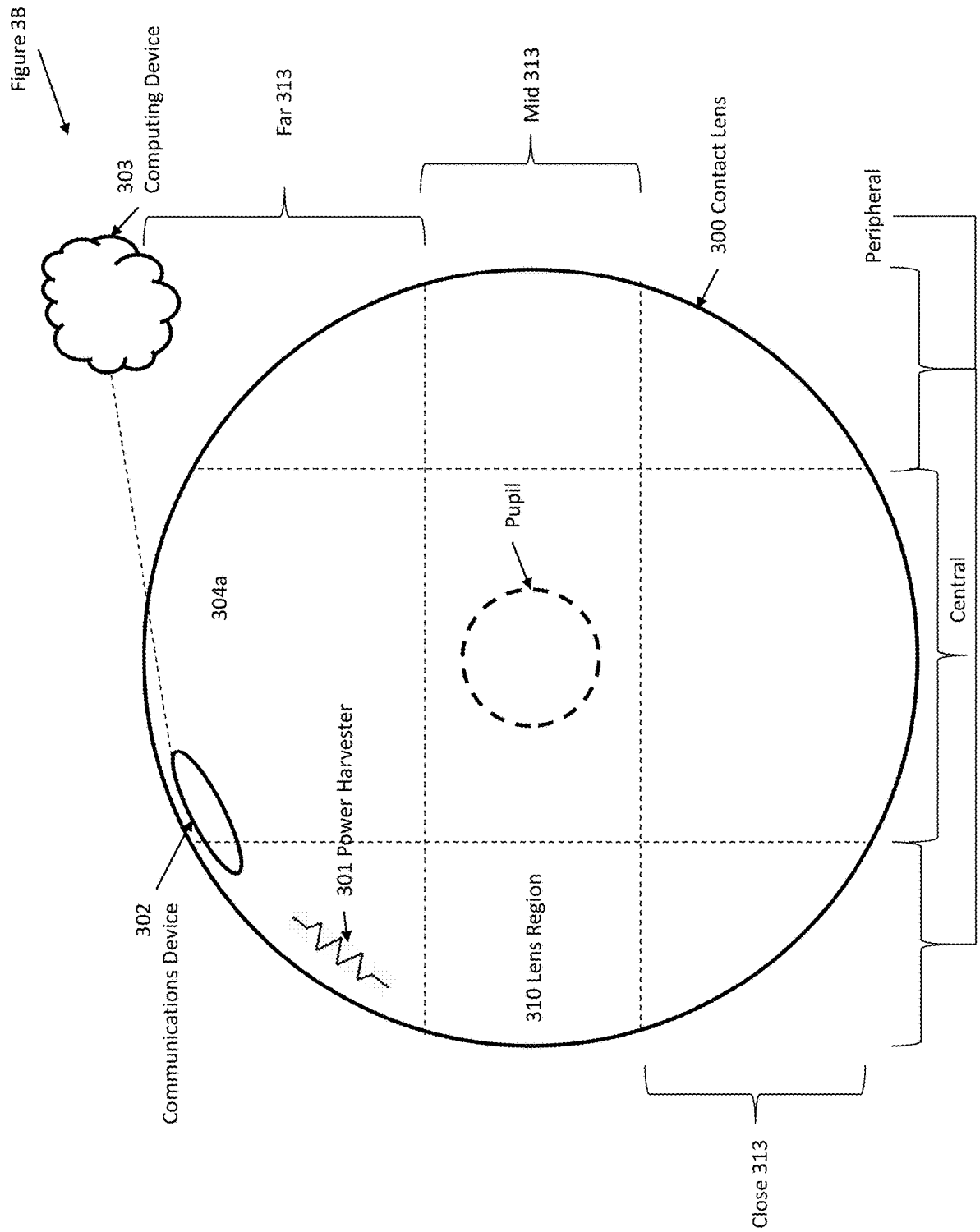

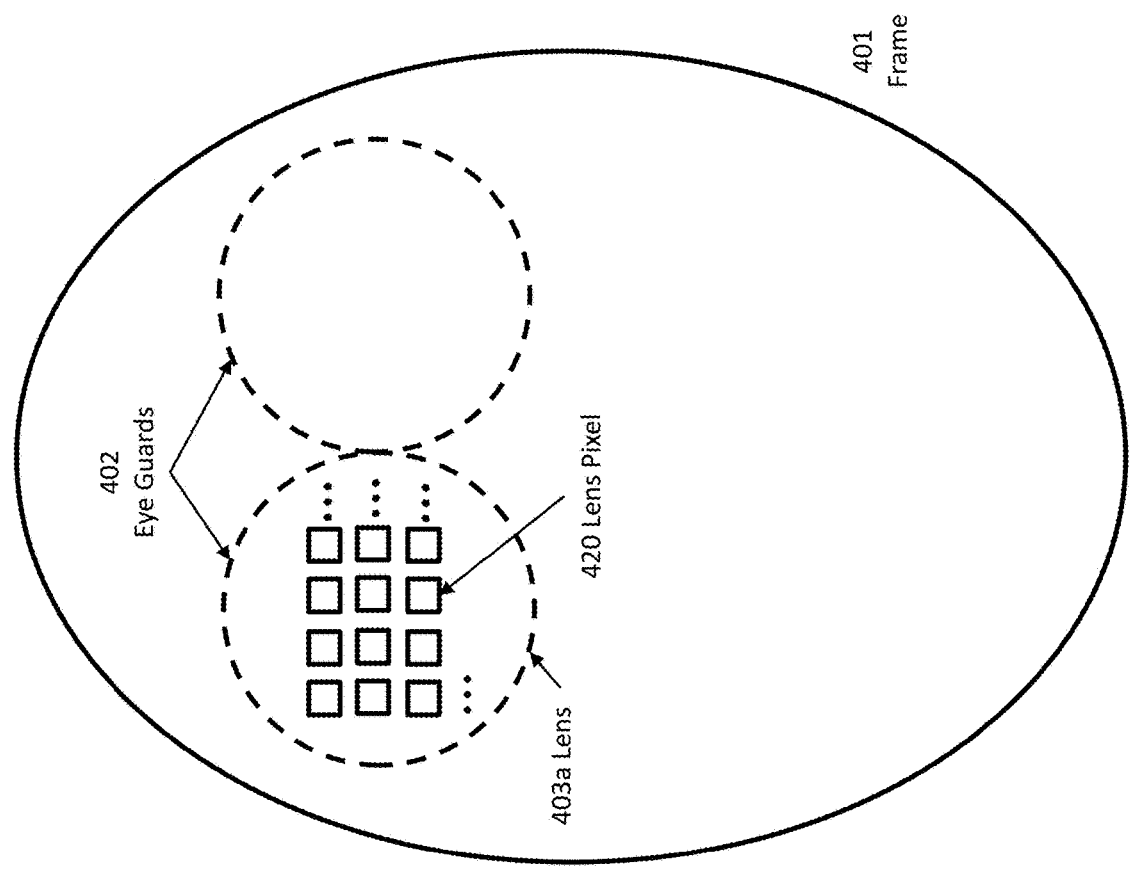

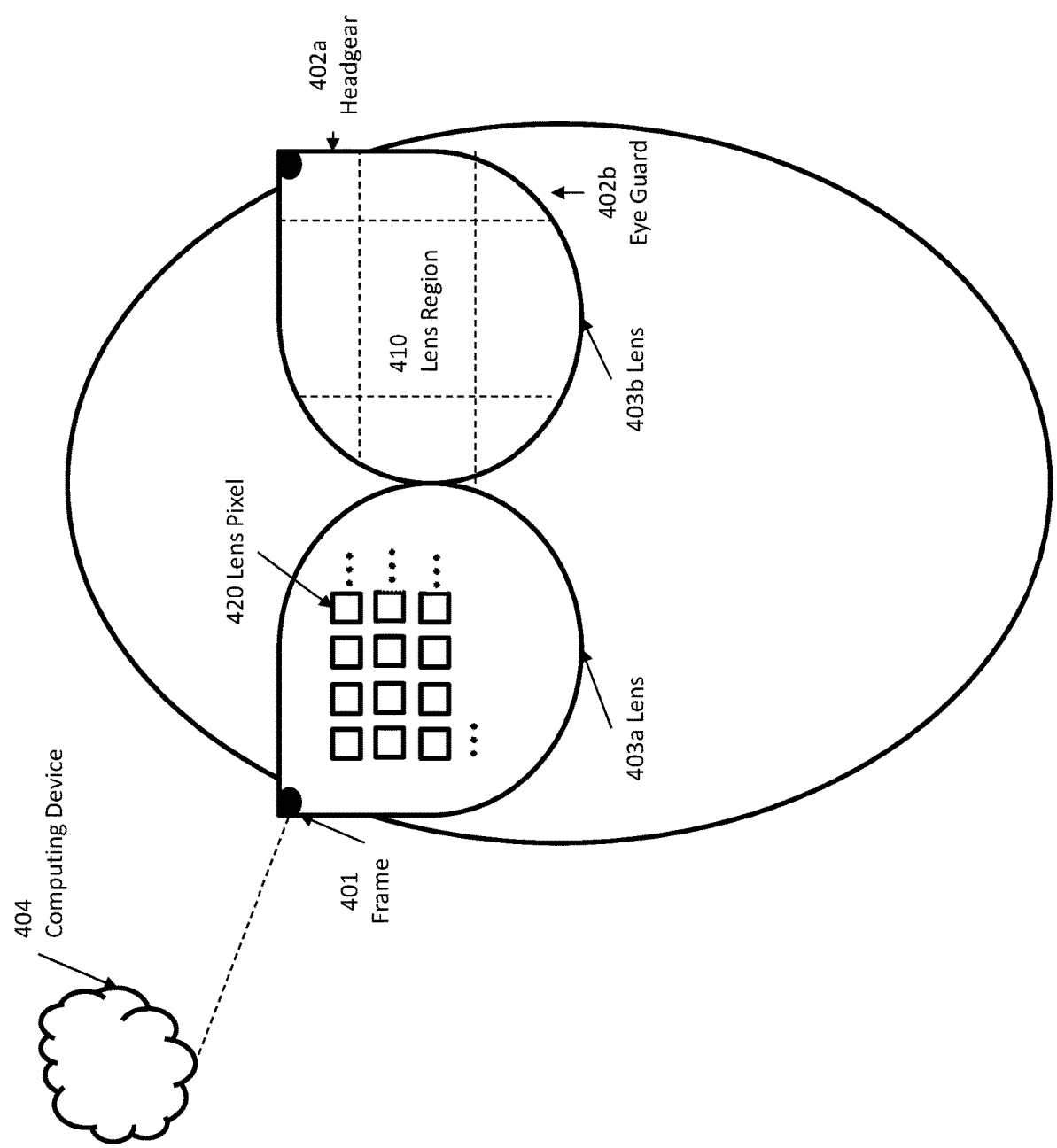

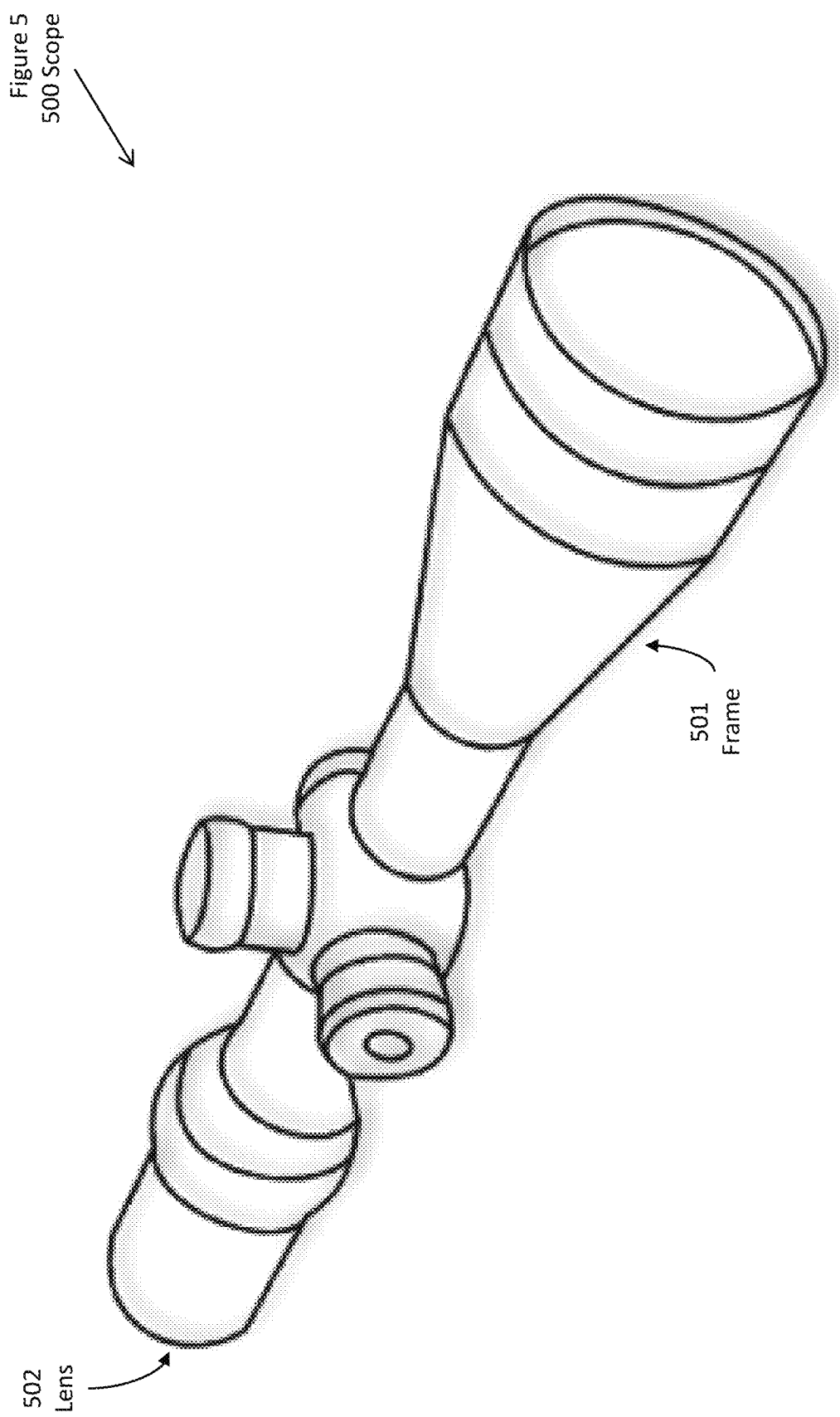

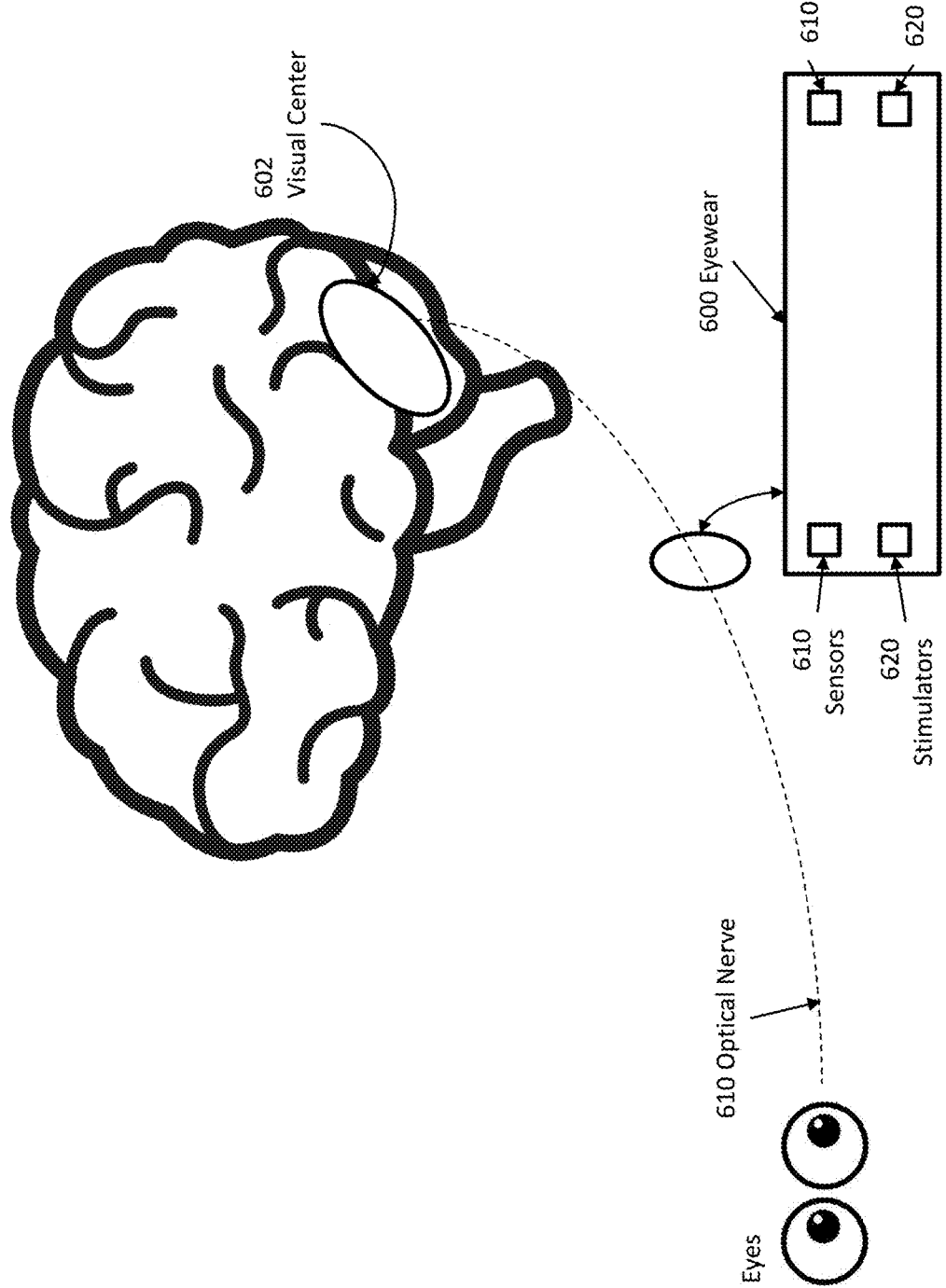

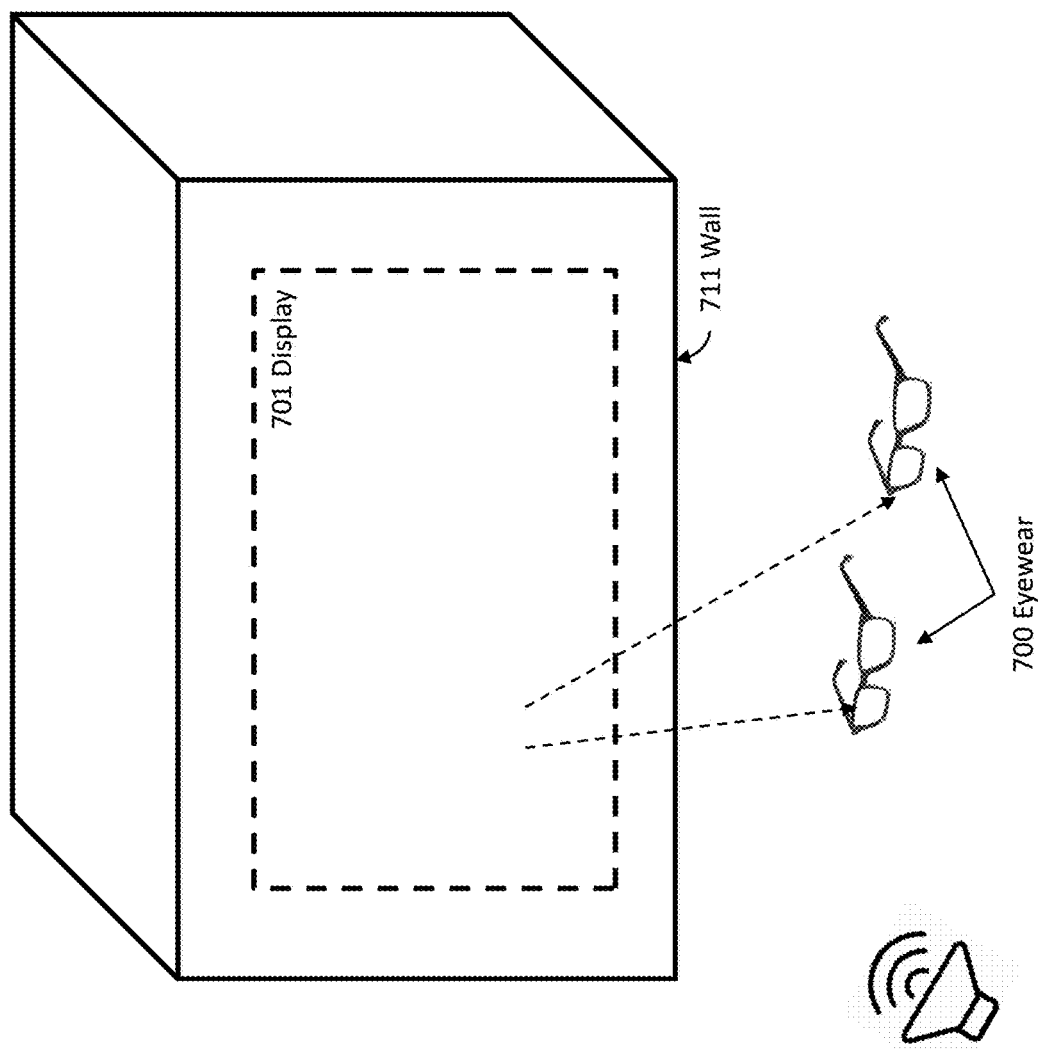

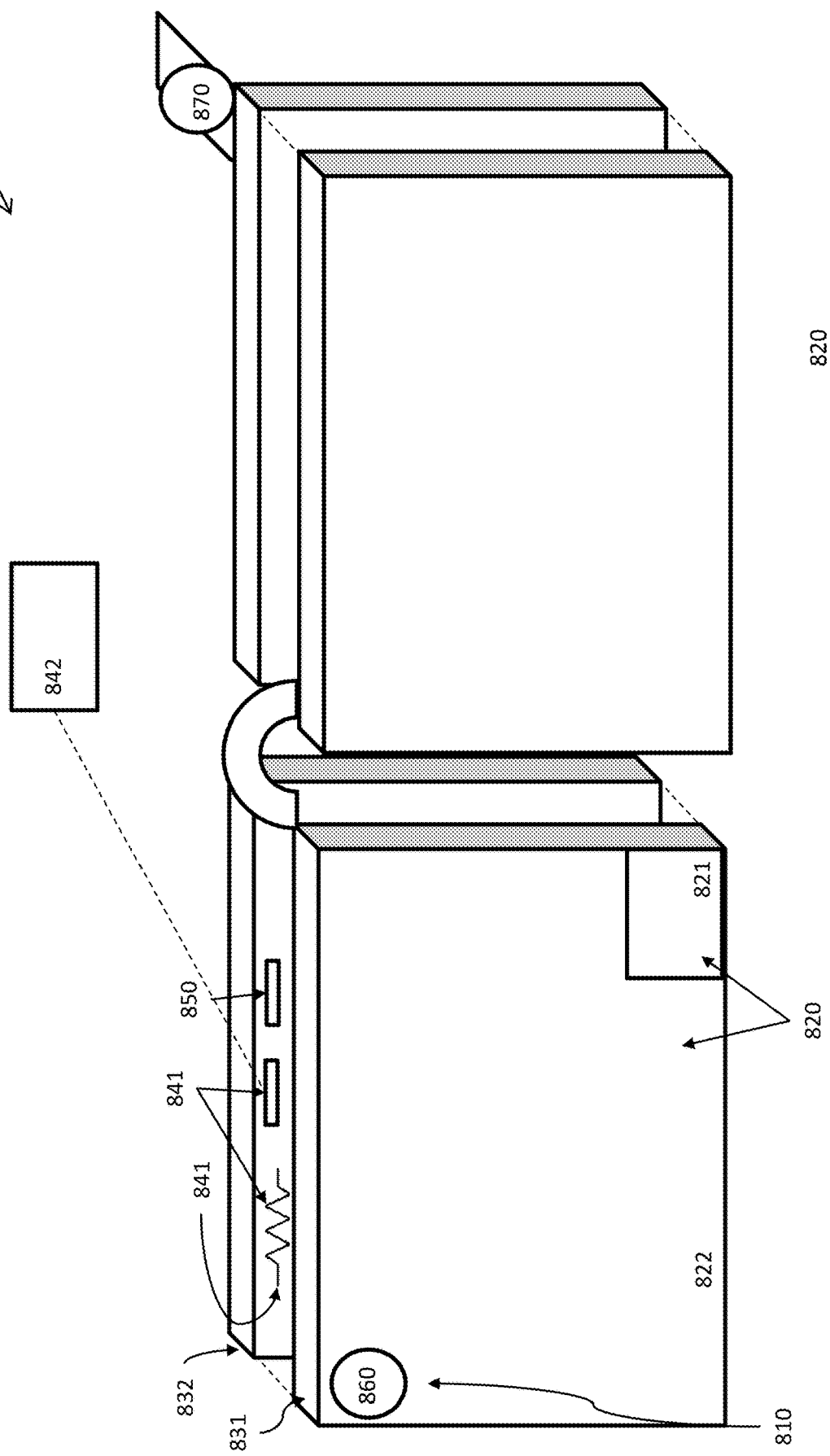

Eyewear 900

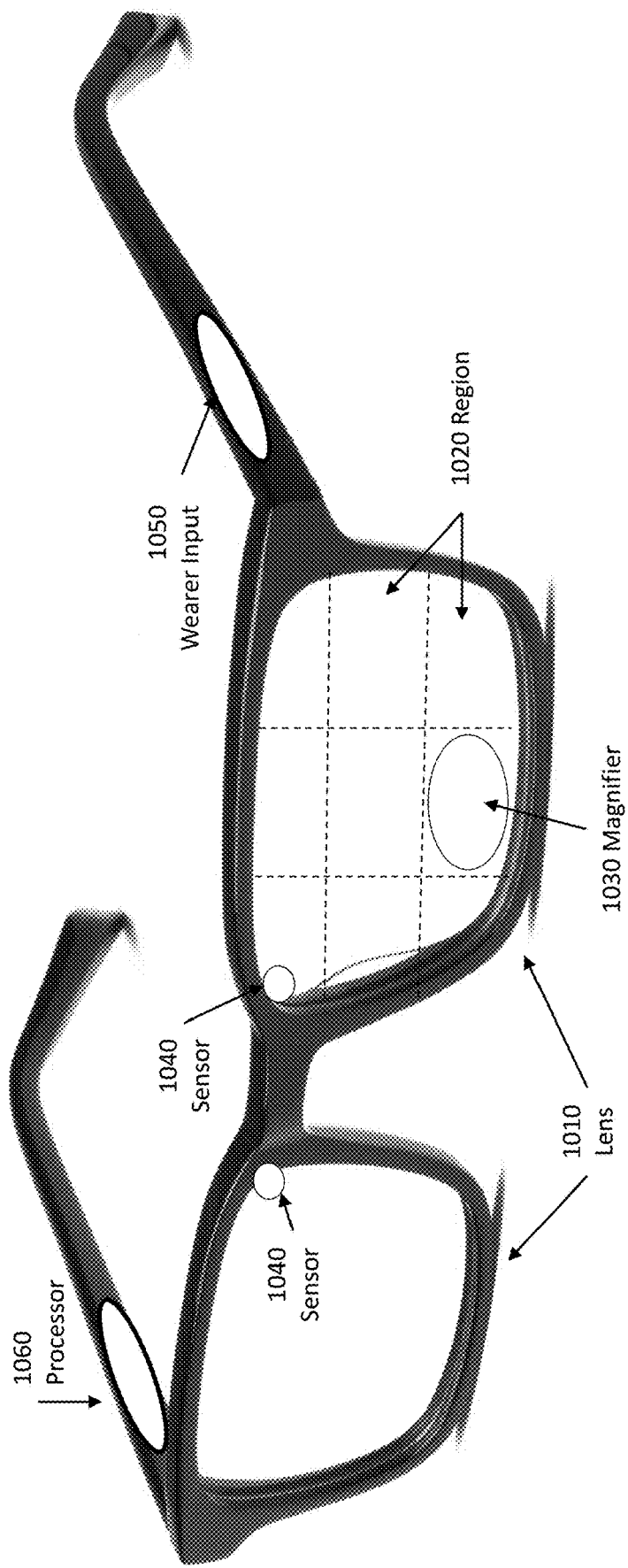

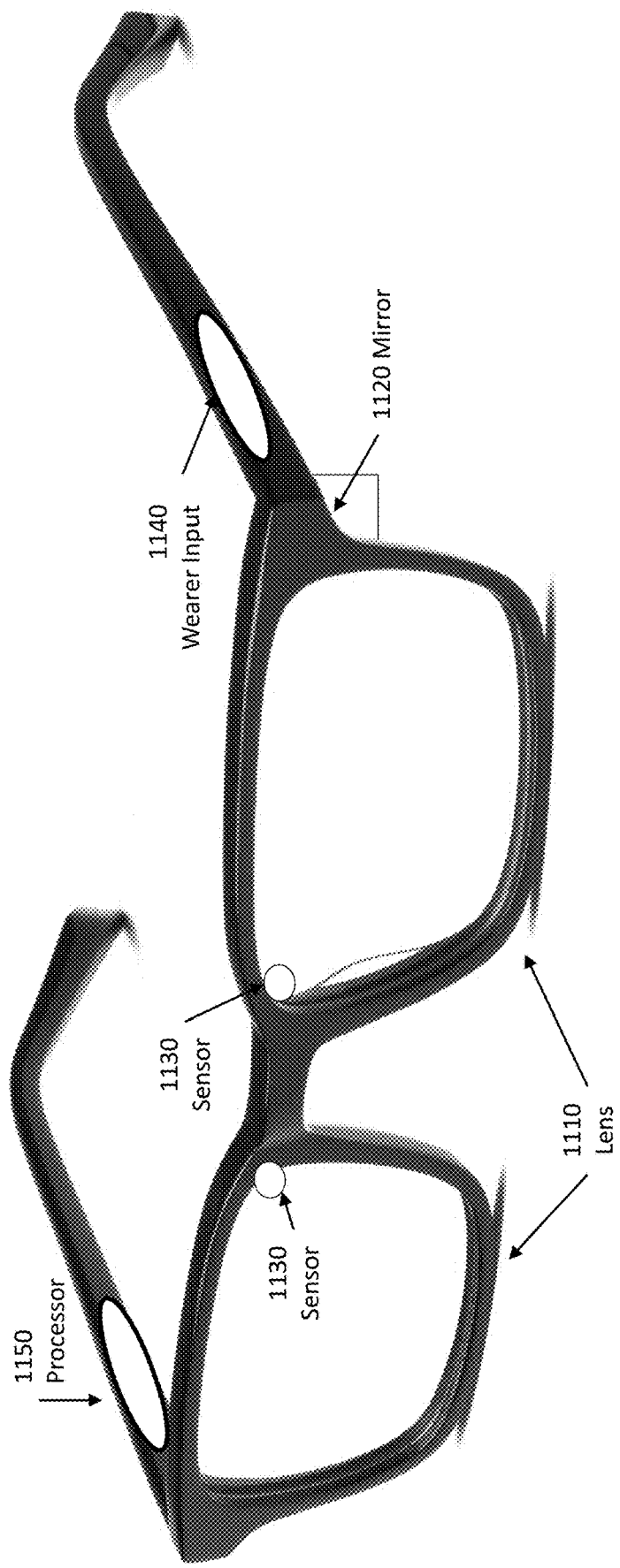

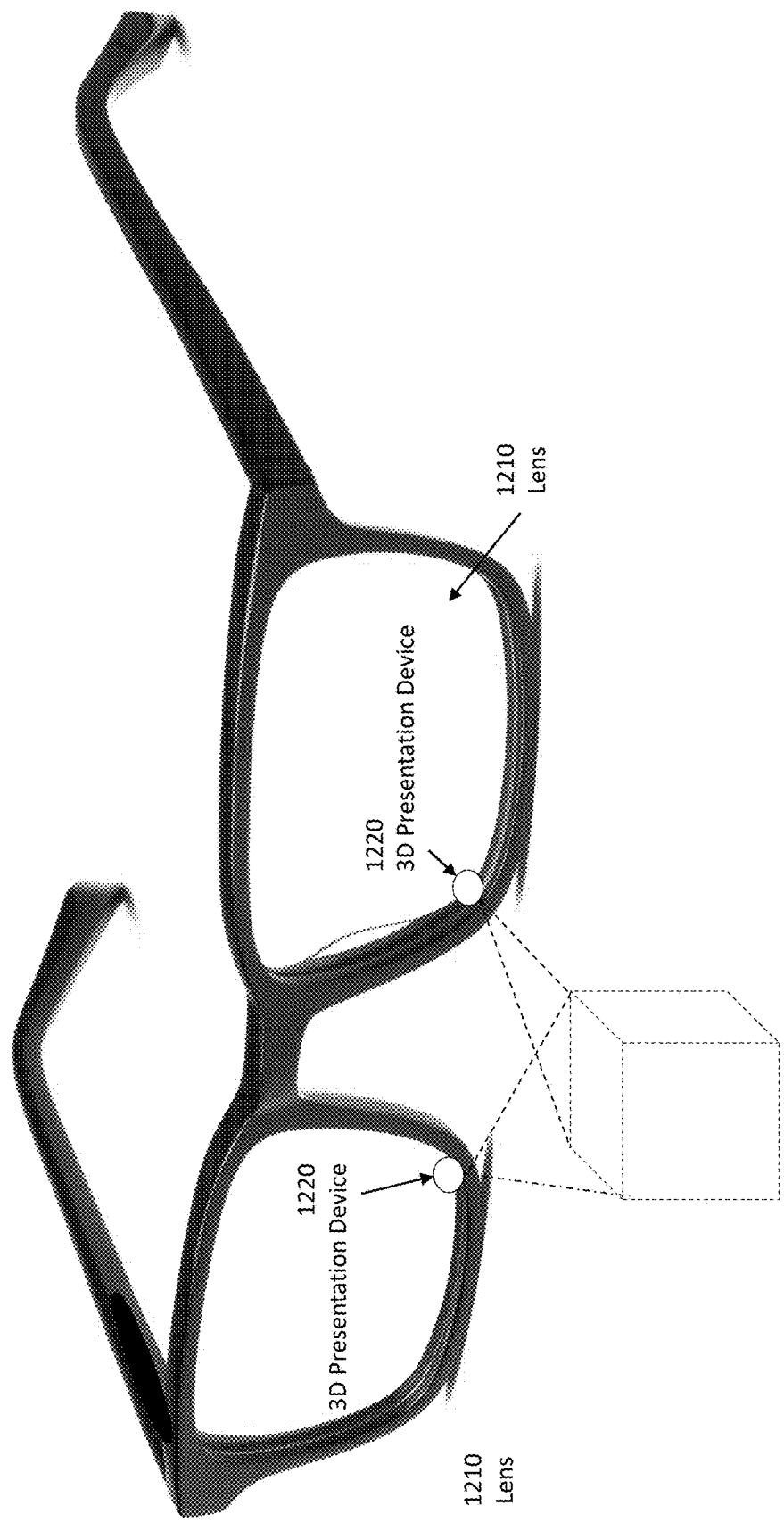

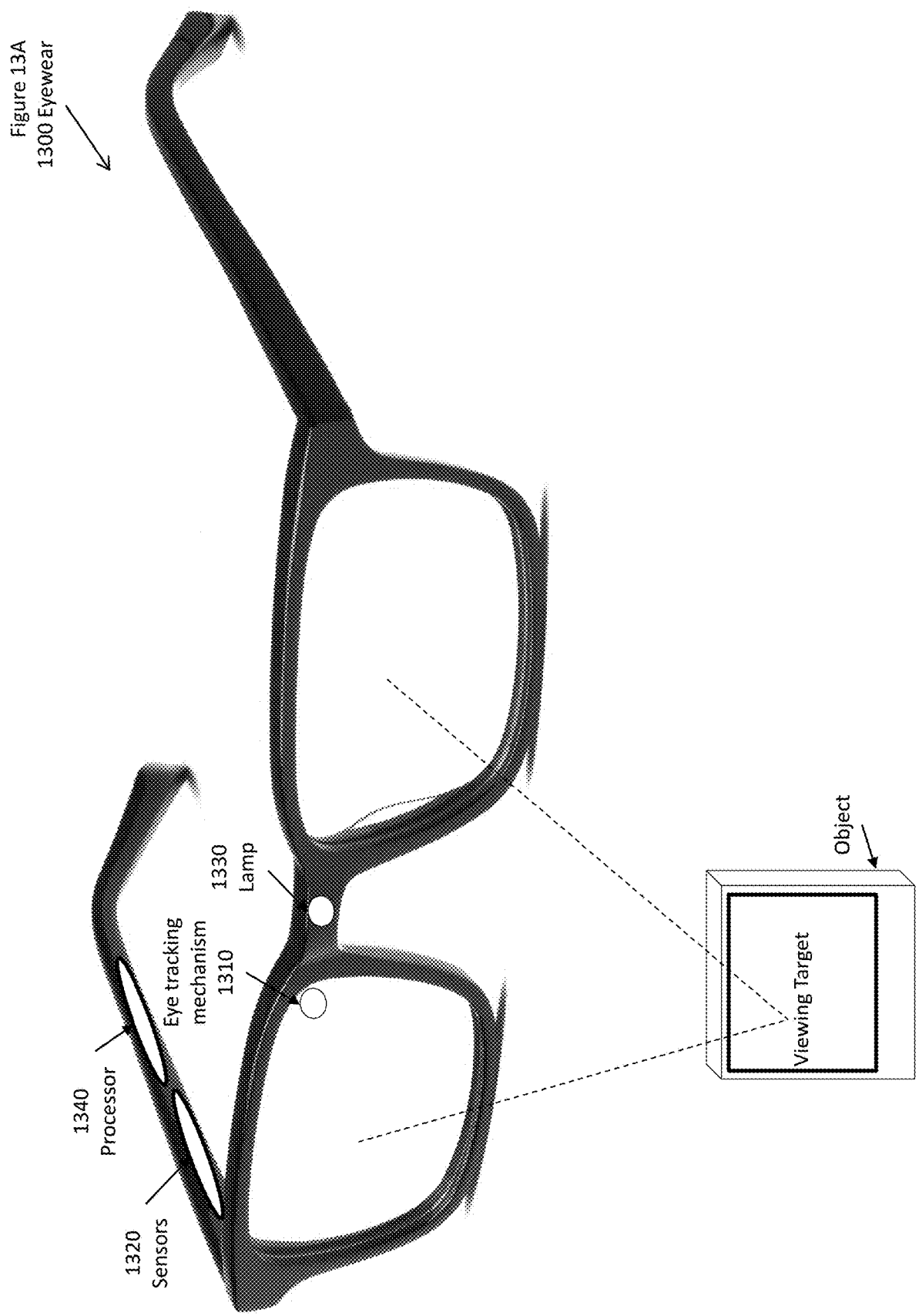

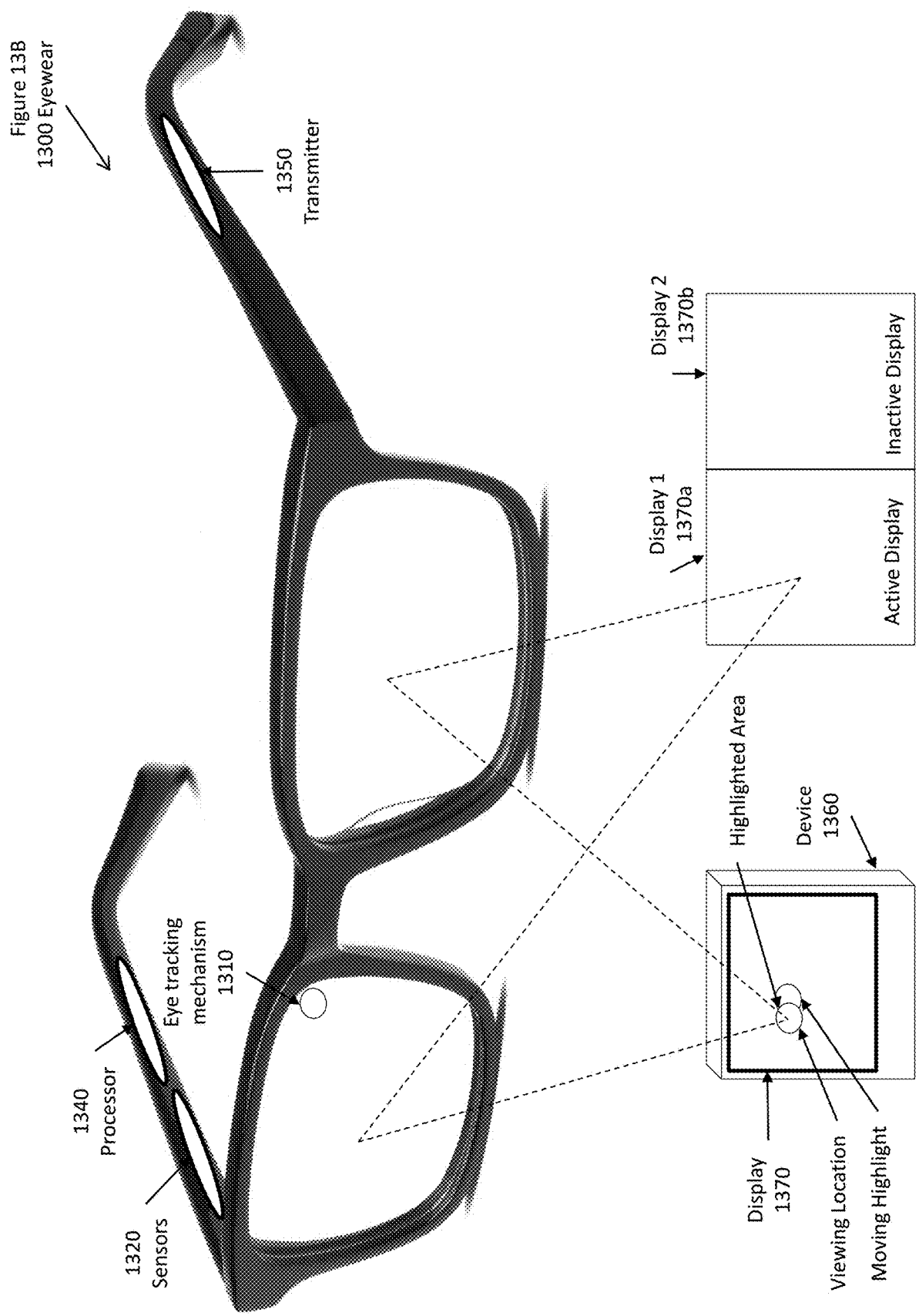

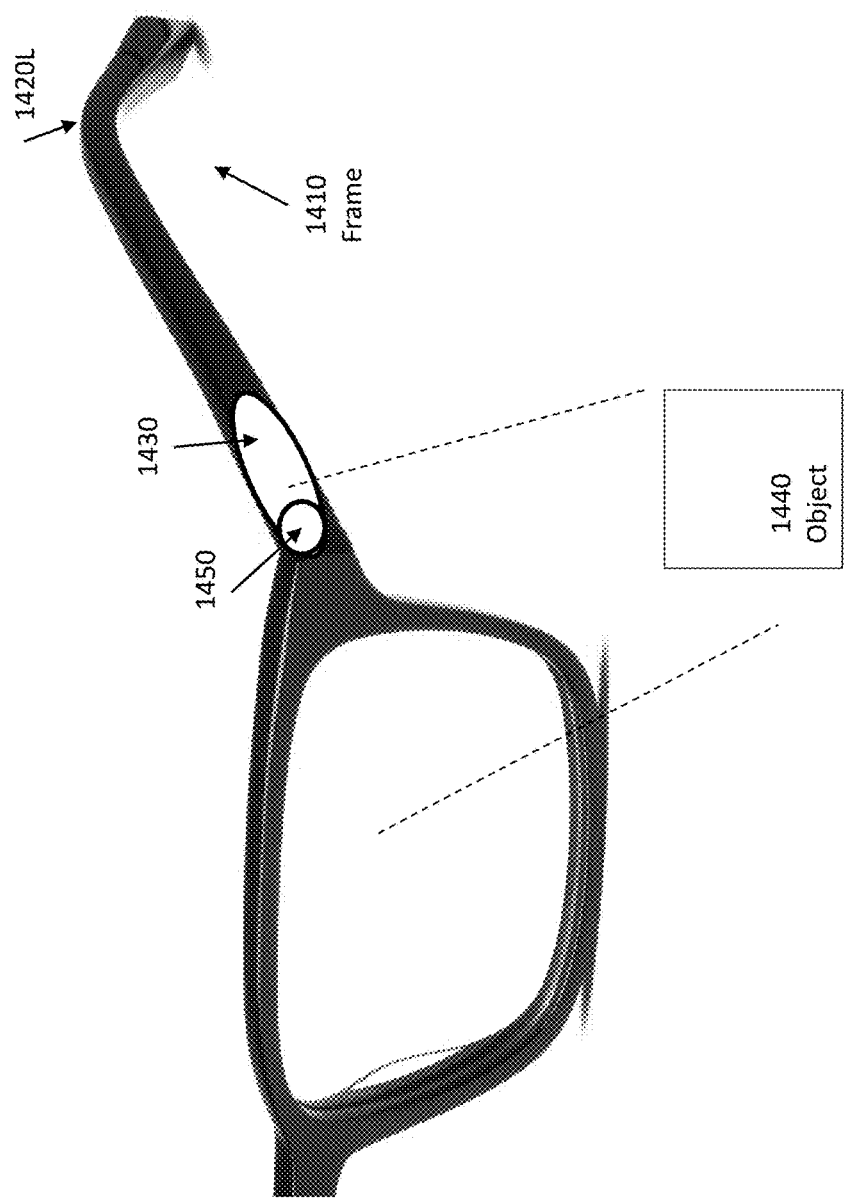

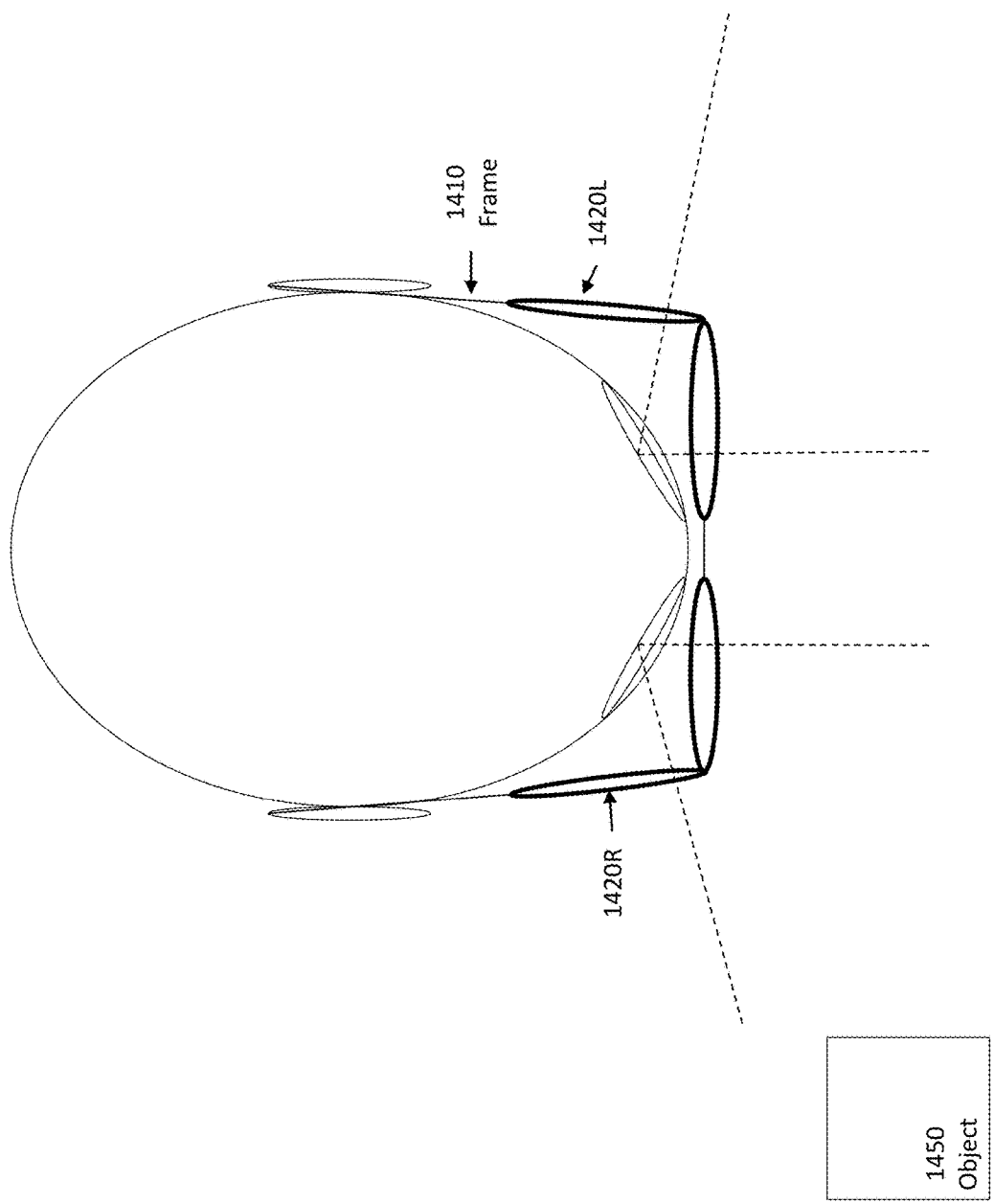

PERSONALIZED OPTICS

INCORPORATED DISCLOSURES

Priority Claim. This Application describes technologies that can be used with inventions, and other technologies, described in one or more of the following documents. This Application claims priority, to the fullest extent permitted by law, of these documents.

This Application is a continuation of
application Ser. No. 17/179,268, filed Feb. 18, 2021, naming inventor Scott LEWIS, titled "Personalized Optics", currently pending.

Each of these documents is hereby incorporated by reference as if fully set forth herein. Techniques described in this Application can be elaborated with detail found therein. These documents are sometimes referred to herein as the "Incorporated Disclosures," or variants thereof.

COPYRIGHT NOTICE

A portion of the disclosure of this patent document contains material subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

This background is provided as a convenience to the reader and does not admit to any prior art or restrict the scope of the disclosure or the invention. This background is intended as an introduction to the general nature of technology to which the disclosure or the invention can be applied.

Field of the disclosure. This Application generally relates to eyewear that dynamically changes to match the wearer and scene being viewed, and other issues.

Related art. Corrective lenses must match the needs of the wearer; more particularly, those lenses must match the needs of the wearer when viewing a object at a particular distance, or when otherwise providing assistance to the wearer in viewing. However, standardized lenses do not match every wearer, and even lenses that are specific to a particular wearer do not match every viewing distance or provide proper assistance in all circumstances. Accordingly, some corrective lenses provide more than one amount of correction, depending on distance to an object being viewed by the wearer. These are sometimes called "bifocals" or "progressive" lenses; they provide different corrective eye prescriptions depending on the position of the object in the wearer's field of view.

One drawback with bifocals or progressive lenses is that they cannot easily be standardized, as each wearer might have a different amount of correction required at each different distance. However, having bifocals or progressive lenses made-to-order can be expensive, at least in comparison with lenses having a single prescription. Another drawback that can occur is that the distance to an object being viewed might fail to match its location in the wearer's field of view, such as when the object is in an unexpected position or when the object is moving toward or away from the wearer. This can cause inconvenience to the wearer by prompting them to move their head about in an effort to move the object into a position within their field of view that is properly corrected. If the object is moving quickly, it might occur that the wearer cannot do this well enough to anticipate the object's movement.

Another drawback that can occur, both with single-prescription lenses and with bifocals or progressive lenses, is that the wearer's features might change. The wearer's eye prescription can change with time. The effective prescription needed by the wearer can also change with respect to whether the wearer is squinting, or possibly other reasons. This can cause inconvenience to the wearer by failing to provide proper correction after time, or in circumstances that might not have been anticipated by the lens maker.

Each of these issues, as well as other possible considerations, might cause difficulty in aspects of using eyewear that is preferably matched to the wearer and scene being viewed.

SUMMARY OF THE DISCLOSURE

This summary of the disclosure is provided as a convenience to the reader, without any intent to limit or restrict the scope of the disclosure or the invention. This summary is intended as an introduction to more detailed description found in this Application, and as an overview of techniques explained in this Application. The described techniques have applicability in other fields and beyond the embodiments specifically reviewed in detail.

This Application describes a system, and techniques for use, capable of providing eyewear that can dynamically adjust its effect on viewing to match a combination of the wearer, the object or scene being viewed, and possibly other conditions.

In one embodiment, the eyewear can be disposed to be responsive to one or more of:

sensory parameters, such as the wearer's gaze direction or focal length; eye gestures or multiple eye gestures by the wearer; other eye activity by the wearer, such as pupil or iris size, blink rate, squinting, eye twitching or nystagmus, saccades; or other senses such as hearing, smell, or touch (possibly including the wearer triggering a control on the eyewear, conducting a hand or other body gesture, or otherwise);

medical conditions, such as whether the wearer is subject to allergies, "dry eyes" and related conditions, migraines/photophobia or related conditions, sleep deprivation, epilepsy or other seizure concerns, being under the influence of alcohol or other substances, or otherwise;

wearer parameters, such as the wearer's eye activity, or changes thereof; the wearer's location or distance from a selected object, or changes thereof; or otherwise;

environmental parameters, features of the wearer's field of view, such as luminance, color prominence, glare, visual blur or noise, or otherwise; presence of particular objects or people in view, such as persons known to the wearer, or such as weapons (guns, knives, or otherwise); or features of the ambient environment, such as a relationship between the wearer and scene or object being viewed, such as whether the wearer is in motion with respect thereto, or otherwise.

In one embodiment, the eyewear can be disposed to be responsive to wearer activity, such as one or more of:

an activity being conducted by the wearer, such as whether the wearer is engaged in police, military, firefighter, emergency responder, search and rescue activity, or otherwise;

whether the wearer is engaged in operating a vehicle, such as a racing car, a speed boat, an aircraft, another type of vehicle, or otherwise; whether the wearer is engaged in observing a sporting activity or other event, such as a baseball or football game, a live-action or recorded concert, a movie or other presentation, a theme-park event or other interactive experience, an advertisement or store front, an augmented reality (AR) or virtual reality (VR) event or other three-dimensional (3D) experience, or otherwise;

whether the wearer is reading, conversing with another person, viewing a target at a distance, viewing a panorama, or otherwise; or other possible wearer activities.

In one embodiment, the type of eyewear can be disposed to be particular to a use being made by the wearer. For example, wearable eyewear can include one or more of:

glasses, contact lenses, a retinal image display (RID), an intra-ocular lens (IOL), or otherwise;

a helmet, such as might be disposed for use by police, military, firefighter, emergency responder, search and rescue activity, or other personnel;

augmented eyewear, such as a microscope or telescope, a rifle scope or other scope, binoculars, a still or motion-picture camera, "night vision" glasses or other infrared detectors, or otherwise;

nerve sensors or stimulators, such as optic nerve sensors or stimulators, optical cortex or other brain element sensors or stimulators, or otherwise;

whether the eyewear can be used in combination or conjunction with other devices, such as smartphones, smart watches, or other wearable or implantable devices; concert screens or other displays; AR presentations; cameras, scopes, and related devices; wireless or other electromagnetic signals; medical devices; or otherwise.

In one embodiment, the eyewear can be disposed to be responsive to a wearer's field of view (FOV), or a portion of the wearer's FOV, such as whether the wearer's FOV is long-range or short-range, higher or lower, right or left, central or peripheral vision, or otherwise.

In one embodiment, the eyewear can be disposed to adjust visual features presented to the wearer, such as using changes in refraction; changes in polarization or shading; changes in color filtering, color injection, false coloring, or otherwise; changes in prismatic angles or functions; changes in presentation of 3D displays; or otherwise.

For example, the eyewear can be disposed to adjust visual features presented to the wearer, so as to encourage the wearer to look in a particular direction or through a particular region of the lenses. In such cases, the eyewear can include multiple lenses with combined operations to provide further personalization.

In one embodiment, a lens can include a first region for vision correction (possibly using refraction), such as for close-range viewing, and a second region for different vision correction (also possibly using refraction), such as for longer-range viewing. The first region or the second region, or portions thereof, can be adjusted so as to optimize the viewer's clarity of vision. For one example, the amount of refraction can be adjusted in each region, such as using electronic control of the refraction. This can have the effect that the wearer can be provided with a relatively optimized view despite the distance of objects at which they are looking. For another example, one or more of the regions, or portions thereof, can be shaded or inverse-shaded, such as using electronic control of the shading or inverse-shading.

This can have the effect that the wearer can be provided with a relatively optimized view despite the direction in which they are looking.

In another embodiment, the eyewear can include a combination of more than one lens. For example, a first lens can include a first region for vision correction (again, e.g., using refraction) for close-range viewing and a second region for vision correction for longer-range viewing. A second lens can be aligned with the first lens and can shade either the first region or the second region, so as to encourage the wearer to focus on relative close-range viewing or on relative longer-range viewing. The second lens can be responsive to features of the wearer's eye, such as when the wearer's eyes become strained or dried-out in response to excessive close-range viewing. When the eyewear detects a prospective or actual problem with respect to the wearer's attention pattern, the eyewear can cause the second lens to shade regions aligned of the first lens, so as to encourage the wearer to alter their attention pattern. In alternative embodiments, the eyewear can respond to wearer's attention pattern with respect to bright lights or lights with glare or flashing, concentration on small objects, lights with a potentially adverse color balance, or other aspects of the wearer's field of view (FOV) that might affect the wearer's vision, attention, or medical conditions.

For example, the eyewear can be disposed to adjust shading with respect to an object or a portion of the user's field of view (FOV) at which the user is looking. In such cases, when the user is looking in a particular direction, the eyewear can be disposed to shade only portions of the user's FOV in that direction. Similarly, in such cases, when the user is looking at a particular object, such as when looking in a particular direction and at a particular depth of focus so as to distinguish a selected object, the eyewear can be disposed to shade only that selected object. An outbound camera, such as a camera mounted behind one or more of the lenses and disposed to view a location or region at which the user is looking, can be disposed to determine an amount of shading that optimizes the user's view, or to determine an amount of shading that optimizes a clarity of the location or region at which the user is looking.

In such cases, the eyewear can be disposed to detect where the user is looking in response to one or more of: a dynamic eye tracking system, or in response to one or more "outbound" cameras disposed to review the user's field of view (FOV) from inside one or more lenses. For example, the dynamic eye tracking system can be disposed to determine in what direction, and at what depth of focus, the user is looking. This can have the effect that the dynamic eye tracking system can determine a location in three-dimensional (3D) space at which the user is looking. For another example, the outbound camera can be disposed to examine the user's FOV from inside one or more of the lenses. Either of these techniques can have the effect that when the user moves their head or otherwise alters their FOV, the eyewear can adjust the 3D location that is shaded. More precisely, the eyewear can adjust a location on each lens so that the joint focus of the user's eyes at that 3D location is shaded.

This can have the effect that the eyewear shades "where the user is looking". When the user adjusts the direction they are looking, adjusts the depth of field at which they are looking, tilts their head, squints, otherwise moves due to an external force, the eyewear can shade where the user looks, and if so desired, only where the user looks. For example, the user might be in a vehicle, such as an aircraft, racecar, or sailboat or speedboat, or the user might be looking at a dashboard or instrument, or the user might be looking at an external object. In such cases, the eyewear can shade where the user is looking, notwithstanding the user's head or eye movement, the vehicle's movement, or other movement that might affect where the user is looking.

In another embodiment, the eyewear can be disposed to provide light in a direction where the user is looking, such as in response to a dynamic eye tracking mechanism. This can have the effect that the eyewear can illuminate objects at which the user is looking; thus the eyewear can "light where the user is looking". Thus, when the user adjusts the direction they are looking, adjusts the depth of field at which they are looking, tilts their head, squints, otherwise moves due to an external force, the eyewear can "light where the user looks", and if so desired, only where the user looks. For example, as described above, the user might be in a vehicle, such as an aircraft, racecar, or sailboat or speedboat, or the user might be looking at a dashboard or instrument, or the user might be looking at an external object. In such cases, the eyewear can illuminate where the user is looking, notwithstanding the user's head or eye movement, the vehicle's movement, or other movement that might affect where the user is looking. For example, such as illuminating.

In one such case, the eyewear can include a lamp (such as a laser or an LED) and can be disposed to direct the light from the lamp in a direction or at a focal length where the user's eyes are focusing. The lamp can be disposed on a portion of the eyewear, such as on a frontpiece (such as at a location between the user's eyes) or on an earpiece (such as at a location near the user's temple) and disposed to provide a light beam in a direction which the user is looking and focused at a distance at which the user is focusing.

In another such case, the eyewear can include a transmitter, such as an electromagnetic or ultrasonic transmitter, disposed to control a smartphone or other mobile device. For example, when the user is looking at a smartphone (or other mobile device), the eyewear can send a signal to the mobile device that directs the mobile device to highlight a designated portion of the mobile device's screen. Thus, when the user is looking at a particular portion of the screen, the eyewear can direct the mobile device to highlight only that portion of the screen.

This can have the effect that the mobile device can show the user just what the user is looking for. Possible advantages include (1) enabling the user to more easily see that portion of the screen, 60 saving power usage or battery time available to the smartphone, 64 providing increased brightness for the designated portion of the screen without using excessive power or battery time, and possibly other advantages. Alternatively, this can also have the effect that the mobile device can urge the user to review particular portions of the screen, such as by moving the highlighted portions of the screen across a sequence of text to improve reading speed.

In additional examples of these techniques, the eyewear can be disposed to recognize commands or requests from the user to alter the intensity (or other features) of the illumination. In such cases, user commands can include capacitive or touch controls, eye or face gestures, finger or hand gestures, head or mouth movements, voice commands, electromagnetic commands from another device, other user commands described herein, or other ways the user can direct the eyewear.

In such cases, the eyewear can be disposed to allow the user to direct the illumination to have a different amount of area at the illuminated device, a different angle or amount of polarization, a different color or color balance (or a different set of colors in a varying color pattern), or otherwise. In additional such cases, the eyewear can be disposed to direct the mobile device to increase a magnification, or to impose other visual effects, on the portion of the screen being viewed by the user. For example, the eyewear can be disposed to alter a color or color balance of that portion, to cause that portion to blink, or otherwise change a way that portion can be viewed by the user.

For another example, the eyewear can be disposed to operate with multiple display screens, whether controlled by a single device (either a mobile device or a "desktop" device) or multiple devices. In such cases, the eyewear can determine whether the user is looking at a first screen or a second screen, and in response thereto, cause the screen being looked at (the "active" screen) to have a first visual effect and the screen not being looked at (the "inactive" screen) to have a second visual effect. For example, the eyewear can direct the inactive screen to be substantially dimmed, so the user is not subject to excessive brightness directed at their peripheral vision. For another example, the eyewear can direct the inactive screen to have its color balance altered: (1) the inactive screen can be filtered to be more amber, so as to reduce peripheral-vision brightness in the blue portion of the visual spectrum; 60 the inactive screen can be directed to provide green light, so as to prevent or reduce the likelihood of, or to treat or reduce the severity of, migraines.

In another embodiment, the eyewear can include a combination of the two lenses described above, plus a third lens having an additional or complementary effect. For example, the third lens can be tinted, either with a fixed chemical tint or with an electronically activated tint. This can have effect that the eyewear can be disposed to provide clarity of vision to the wearer both at close-range and at longer-range distances, while also protecting the wearer's eyesight or night vision against damage from excessive light (whether ambient light or artificial spotlights) or from glare. In such cases, a chemical or electrochemical tint can be applied to a surface of the first or the second lens, without substantially increasing the thickness of the eyewear. In such cases, the third lens can assist with shading or inverse-shading, particularly with respect to colors that are relatively intense for computer, smartphone, and other device displays. For example, color balance, color filtering, tinting, and related effects can protect the wearer's eyes against excessive blue or ultraviolet from mobile phones, particularly when viewed in an otherwise dark environment. This can have the effect of allowing the wearer to read from a display in an otherwise bright ambient environment, without having to increase the brightness of the display to the point of eye pain.

In such cases, in addition to tinting, the third lens can also be disposed to adjust the color balance of the wearer's field of view, or to filter out undesired frequencies (or to specifically inject desired frequencies). For one example, wearers who are subject to migraines or photophobia can have the color balance of their field of view adjusted to allow for greater brightness without excessive pain, or to provide calming, soothing, or therapeutic colors such as amber or green. For another example, the third lens can provide a separate visual effect, such as a polarization effect (to reduce glare), a prismatic effect (to alter a direction of the wearer's line-of-sight or field of view), or otherwise as described herein.

In an environment in which there is a substantial amount of excessive lighting from one or more sources, it can matter (A) whether any particular light source exceeds an amount of ambient light, and if so, by how much; (B) whether the user is looking in the direction of, or focusing on, any particular light source, and if so, how directly; and (C) whether the object the user is looking at is bright or not, has contrast or not, is reflective or not, or other factors that might have an effect on the user's eyesight. In such cases, it can be desirable to adjust an amount of shading in response to lighting conditions and in response to the nature of the object at which the user is looking.

For example, one such environment can be when the user is controlling an aircraft. A pilot's eyes might need to look at instruments within the aircraft, and those instruments might be positioned (A) in shadow, (B) where they reflect sunlight, (C) where they are illuminated by cabin lights, or some combination thereof. A pilot's eyes might alternatively need to look at objects outside the aircraft, and those objects might be positioned (A) in shadow, such as under cloud cover, (B) where they reflect sunlight, such as when the cloud cover itself is brightly lit, (C) where they are backlit by sunlight, such as when transiting the sun or approaching from sunward, or some combination thereof.

Accordingly, it can be desirable to adjust shading in response to whether the user is looking at an object outside the aircraft or whether the user is looking at an instrument inside the aircraft. The eyewear can be disposed to shade in response to (A) a direction at which the user is looking or (B) a distance at which the user is focusing, such as in response to a dynamic eye tracking system, (C) whether the user tilts their head or otherwise gestures in response to a change in attitude concurrent with looking inside or outside the aircraft.

In one embodiment, the eyewear can be disposed to adjust shading with respect to at least a portion of the user's field of view (FOV) during a time period while the user blinks. Since a blink takes a finite amount of time, the eyewear can adjust an amount of shading while the user is blinking (and the pupil is covered by the eyelid). This can have the effect that the user sees a different amount of shading before the blink and after the blink. The eye integrates the amount of shading into its received image. This can have the effect that the user does not notice the change in the amount of shading.

In one embodiment, the eyewear can be disposed to adjust shading with respect to at least a portion of the user's field of view (FOV) in response to a sudden rise (or other change) in brightness/luminosity or color balance. For example, the user's eye might have been subjected to a bright light or a laser. In such cases, the eyewear can be disposed to shade in response to an intensity of the bright light or laser, so as to protect the user's eyes against damage to eyesight or night vision. In such cases, the eyewear can be disposed to shade in response to a direction of the bright light or laser, so as to maintain as much of the user's field of view (FOV) as possible, and so as to provide the user with an indicator of where the bright light or laser is coming from. If the user is piloting a vehicle, such as an aircraft, or sailboat or speedboat, the user can use this information to direct the vehicle toward or away from the source of the bright light or laser.

In one embodiment, the eyewear can be disposed to detect polarization of the bright light or laser, and to adjust polarization with respect to at least a portion of the user's field of view (FOV) in response thereto. This can have the effect that the brightness/luminosity of the bright light or laser can be reduced (when the bright light or laser is polarized). This can also have the effect that the eyewear can protect the user's eyes against damage to eyesight or night vision, while providing the user with the ability to see through the region of their FOV impacted by the bright light or laser. The eyewear can also be disposed to detect changes in the polarization of the bright light or laser, and to adjust polarization with respect to those changes, so as to maintain protection of the user's eyes even when the bright light or laser is itself changing.

In one embodiment, the eyewear can be similarly disposed to adjust other visual effects (such as polarization or refraction) with respect to at least a portion of the user's field of view (FOV) during a time period while the user blinks. Similar to adjustment of shading during the user's blink, this can have the effect that the user sees different other visual effects (such as polarization or refraction) before the blink and after the blink, which can be integrated by the eye into its received image, so that the user does not notice the change.

In one embodiment, the eyewear can be disposed to adjust polarization when light sources the user desires to view are polarized at a relative angle to the eyewear that causes those light sources to be difficult to see. In particular, the eyewear can be disposed to adjust polarization when the user divides their attention between an ambient environment, such as when operating a vehicle, and close-range devices, such as controls or sensors in that vehicle. Maladjustment between polarization of close-range devices and eyewear can cause the controls or sensors to appear extremely darkened, or even black, reducing their value to the user to nearly zero. The eyewear can be disposed to determine a relative angle between the external devices and the eyewear's own polarization angle, so as to assure that external devices remain clear to the user even when the user moves their head at different angles or looks at the external devices from differing angles.

In one embodiment, the eyewear can be disposed to determine a measurement of visual acuity available to the user, and to adjust an effect on the user's field of view in response thereto. For example, the eyewear can measure visual acuity in response to a comparison between (A) a first view available to the user using the eyewear, and (B) a second view available to the user without using the eyewear. The eyewear can include a first camera disposed to capture the field of view available to the user using the eyewear and a second camera disposed to capture the same field of view available to the user, only without using the eyewear. The first camera can be disposed to view through a lens of the eyewear; the second camera can be disposed to view outside any lens of the eyewear. By determining a difference between the first camera and the second camera, the eyewear can determine a measurement of visual acuity available to the user while using the eyewear.

In response to the measure of visual acuity, the eyewear can adjust one or more parameters, such as color balance, polarization, shading, or other parameters affecting the user's field of view. The user's field of view can depend at least in part on what one or more objects the user is looking at or focusing upon. As described herein, the eyewear can determine what one or more objects the user is looking at or focusing upon in response to a dynamic eye tracking system or other features of the scene available in the user's field of view.

In one embodiment, the eyewear can be disposed to present a 3D display on a selected background. For example, the selected background can include a screen, such as a smartphone screen or a screen with respect to another mobile device. For another example, the selected background can include a billboard, a movie theater screen, a theme-park display or other interactive display, an outdoor background, a region of the sky or other natural background, or another region of the wearer's field of view appropriate for a 3D display.

In one embodiment, the eyewear can be disposed to provide color change by the eyewear. For example, this can include a color change by the frame when the eyewear includes glasses, a facemask, helmet, or otherwise. For another example, this can include a color change by a portion of the eyewear, such as associated with the iris so as to not interfere with the wearer's vision, when the eyewear includes a contact lens, or otherwise. For another example, this can include a size change associated with the eyewear, such as associated with the pupil so as to not interfere with the wearer's vision, when the eyewear includes a contact lens, or otherwise. Thus, the color change can include a portion of a contact lens that covers the iris or sclera, but not the pupil. For another example, this can include a color change associated with the pupil or lens, so as to alter a color balance of the wearer's vision, when the eyewear includes a contact lens or implantable lens, or otherwise.

In one embodiment, the eyewear can be disposed to provide hybrid personalization of corrections or enhancement of the user's vision. For example, the hybrid personalization can include one or more alternative corrections or enhancements of the user's vision, in combination or conjunction with techniques for focusing the user's gaze through portions of the eyewear that provide those alternative corrections or enhancements in appropriate circumstances. For example, a region of the eyewear that provides close-range correction or enhancement of the user's vision can be combined with one or more techniques for directing the user's gaze through that portion of the eyewear when the user is focusing on one or more objects at that range.

BRIEF DESCRIPTION OF THE FIGURES

In the figures, like references generally indicate similar elements, although this is not strictly required.

FIG. 1 (collectively including FIGS. 1A and 1B) shows a conceptual drawing of example eyewear including glasses, such as providing active correction or enhancement. FIG. 1A shows a conceptual drawing of example glasses having multiple active regions related to wearer view. FIG. 1B shows a conceptual drawing of example glasses having multiple active pixels related to individual wearer view.

FIG. 3 (collectively including FIGS. 3A and 3B) shows a conceptual drawing of example eyewear including contact lenses or intra-ocular lenses. FIG. 3A shows a conceptual drawing of example contact lenses having multiple active regions related to wearer view. FIG. 3B shows a conceptual drawing of example contact lenses having multiple individual pixels related to wearer view.

FIG. 4 (collectively including FIGS. 4A-4D) shows a conceptual drawing of example eyewear including a facemask, helmet, goggles, or visor. FIG. 4A shows a conceptual drawing of an example facemask or helmet having multiple active regions related to wearer view. FIG. 4C shows a conceptual drawing of an example goggles or visor having multiple active regions related to wearer view.

FIG. 5 shows a conceptual drawing of example eyewear including one or more scopes or sights, including binoculars, microscopes, rifle scopes, spotting scopes, telescopes, analog or digital cameras, rangefinders, or otherwise.

FIG. 6 shows a conceptual drawing of example eyewear including one or more nerve sensors or stimulators.

FIG. 7 (collectively including FIGS. 7A and 7B) shows a conceptual drawing of eyewear used with an example display. FIG. 7A shows a conceptual drawing of the example display disposed on or in a building or structure.

FIG. 8 shows a conceptual drawing of an example eyewear used to provide hybrid personalization.

FIG. 10 shows a conceptual drawing of an example eyewear used to provide dynamic adjustment of magnification.

FIG. 11 shows a conceptual drawing of an example eyewear used to provide dynamic adjustment with respect to reflection and partial reflection.

FIG. 12 shows a conceptual drawing of an example eyewear used to provide dynamic adjustment with respect to three-dimensional (3D) viewing of a display.

FIG. 13 (collectively including FIGS. 13A and 13A) shows a conceptual drawing of eyewear used to provide dynamic lighting in a direction being viewed by a wearer.

FIG. 13A shows a conceptual drawing of eyewear being used to provide light where the user is looking. FIG. 13B shows a conceptual drawing of eyewear being used to control one or more devices to highlight one or more displays, in response to where the user is looking.

FIG. 14 (collectively including FIGS. 14A and 14B) shows a conceptual drawing of eyewear including a peripheral vision lens. FIG. 14A shows a side view of eyewear including a peripheral vision lens. FIG. 14B shows a top view of eyewear including a peripheral vision lens.

Figure 2:
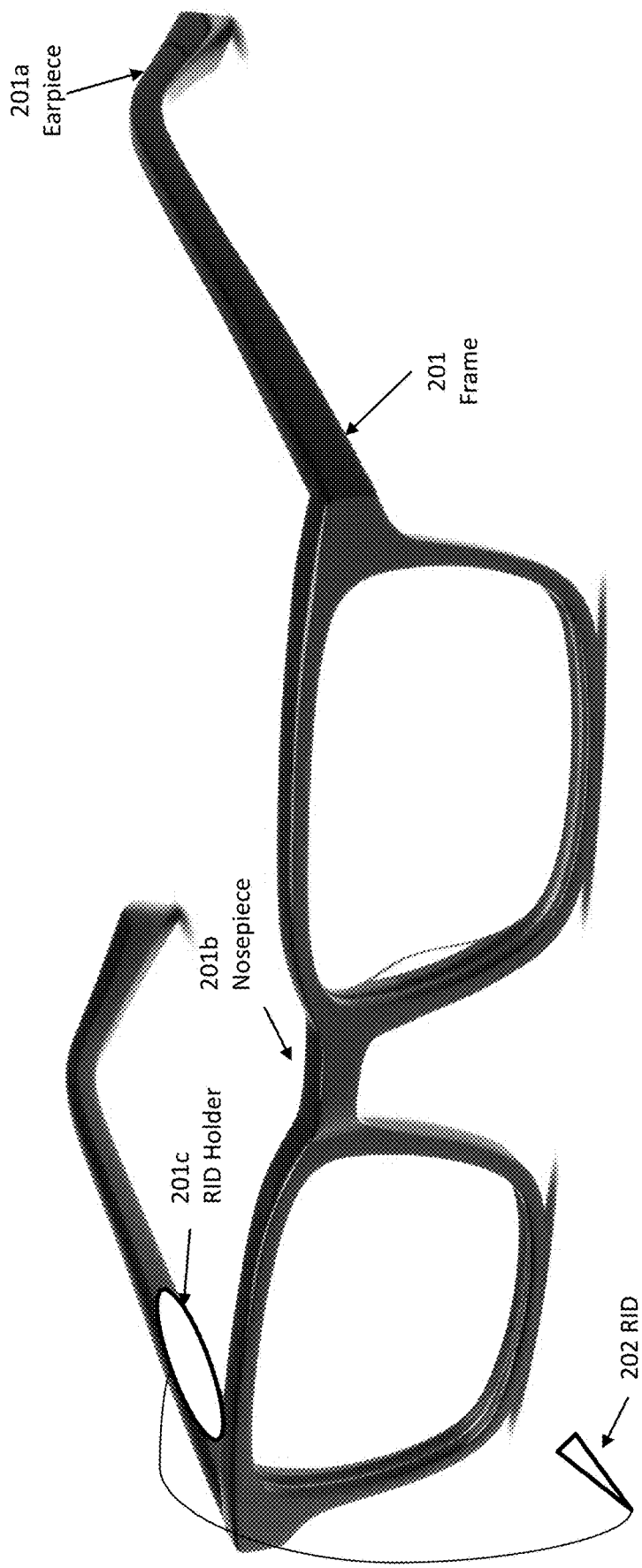
FIG. 2 shows a conceptual drawing of example eyewear including a retinal image display.

After reading this Application, those skilled in the art would recognize that the figures are not necessarily drawn to scale for construction, nor do they necessarily specify any particular location or order of construction.

DETAILED DESCRIPTION

General Discussion

In one embodiment, the eyewear can be responsive to one or more of: sensory parameters, wearer parameters, environmental parameters, or otherwise. For example, sensory parameters can include the wearer's gaze direction or focal length; eye gestures or multiple eye gestures by the wearer; other eye activity by the wearer, such as pupil or iris size, blink rate, squinting, eye twitching or nystagmus, saccades; or other senses such as hearing, smell, or touch (possibly including the wearer triggering a control on the eyewear, conducting a hand or other body gesture, or otherwise). Wearer parameters can include medical conditions, such as whether the wearer is subject to allergies, "dry eyes" and related conditions, migraines/photophobia or related conditions, sleep deprivation, epilepsy or other seizure concerns, being under the influence of alcohol or other substances, or otherwise; the wearer's eye activity, or changes thereof; the wearer's location or distance from a selected object, or changes thereof; or otherwise. Environmental parameters can include features of the wearer's field of view, such as luminance, color prominence, glare, visual blur or noise, or otherwise; presence of particular objects or people in view, such as persons known to the wearer, or such as weapons (guns, knives, or otherwise); or features of the ambient environment, such as a relationship between the wearer and scene or object being viewed, such as whether the wearer is in motion with respect thereto, or otherwise.

In one embodiment, the eyewear can be responsive to wearer activity. Wearer activity can include one or more of: an activity being conducted by the wearer, such as whether the wearer is engaged in police, military, firefighter, emergency responder, search and rescue activity, or otherwise; whether the wearer is engaged in operating a vehicle, such as a racing car, a speed boat, an aircraft, another type of vehicle, or otherwise; whether the wearer is engaged in observing a sporting activity or other event, such as a baseball or football game, a live-action or recorded concert, a movie or other presentation, a theme-park event or other interactive experience, or otherwise, an advertisement or store front, an augmented reality (AR) or virtual reality (VR) event or other three-dimensional (3D) experience, or otherwise; whether the wearer is reading, conversing with another person, viewing a target at a distance, viewing a panorama, or otherwise; or other possible wearer activities.

In one embodiment, the type of eyewear can be particular to a use being made by the wearer. For example, wearable eyewear can include glasses, contact lenses, a retinal image display (RID), an intra-ocular lens (IOL), or otherwise. For another example, wearable eyewear can include a helmet, such as might be disposed for use by police, military, firefighter, emergency responder, search and rescue activity, or other personnel. For another example, eyewear can include augmented eyewear, such as a microscope or telescope, a rifle scope or other scope, binoculars, a still or motion-picture camera, "night vision" glasses or other infrared detectors, or otherwise. For another example, eyewear can include nerve sensors or stimulators, such as optic nerve sensors or stimulators, optical cortex or other brain element sensors or stimulators, or otherwise. For another example, the eyewear can be used in combination or conjunction with other devices, such as smartphones, smart watches, or other wearable or implantable devices; concert screens or other displays; AR presentations; cameras, scopes, and related devices; wireless or other electromagnetic signals; medical devices; or otherwise.

In one embodiment, the eyewear can be responsive to a wearer's field of view (FOV), or a portion of the wearer's FOV, such as whether the wearer's FOV is long-range or short-range, higher or lower, right or left, central or peripheral vision, or otherwise.

In one embodiment, the eyewear can adjust visual features presented to the wearer, such as using changes in refraction; changes in polarization or shading; changes in color filtering, color injection, false coloring, color change by the eyewear, or otherwise; changes in prismatic angles or functions; changes in presentation of 3D displays; or otherwise.

In one embodiment, the eyewear can include multiple lenses to provide hybrid personalization. A first lens can provide a first adjustment of visual features presented to the wearer, such as correction or enhancement of the wearer's vision, while a second lens can provide a second adjustment of visual features presented to the wearer, possibly electronically induced, such as changes in refraction, changes in shading/inverse-shading, chromatic alteration (or other changes in color, color balance, color gamut, or false coloring, or otherwise), changes in polarization, changes in prismatic angles or functions; changes in presentation of 3D displays; or otherwise.

In one embodiment, the eyewear can include multiple lenses with combined operations to provide further personalization. For example, a first lens can include a first region in which it provides a first amount of vision correction (refraction), such as for close-range vision, and a second region in which it provides a second amount of vision correction, such as for longer-range vision. In such cases, a second lens can include a first region aligned with the first lens' first region, in which it provides a first variable amount of shading, and a second region aligned with the first lens' second region, in which it provides a second variable amount of shading. When the user has been looking through a close-range vision portion of the combined lens for too long, the eyewear can use shading (such as by polarizing that portion of the lens) to darken that portion of the lens and encourage the user to look elsewhere. Thus, the first lens can provide vision correction, while the second lens provides shading to encourage particular gaze directions (or to discourage particular gaze directions). This can have the effect that the user is encouraged not to stare at close objects for too long, and to look away periodically (or otherwise from time to time) at more distant objects. This can have the effect that the user is encouraged to avoid eyestrain. The first lens and the second lens can have additional regions, such as a close-range region, a mid-range region, and a long-range region. The first lens and the second lens can be responsive to other features of the user's field of view, such as an amount of brightness, a color balance, an amount of concentration on small objects, or other factors that might affect the user's eyesight, prompt headache, or prompt other medical issues.

In one embodiment, the eyewear can be disposed to adjust shading with respect to an object or a portion of the user's field of view (FOV) at which the user is looking. In such cases, when the user is looking in a particular direction, the eyewear can be disposed to shade only portions of the user's FOV in that direction. Similarly, in such cases, when the user is looking at a particular object, such as when looking in a particular direction and at a particular depth of focus so as to distinguish a selected object, the eyewear can be disposed to shade only that selected object. An outbound camera, such as a camera mounted behind one or more of the lenses and disposed to view a location or region at which the user is looking, can be disposed to determine an amount of shading that optimizes the user's view, or to determine an amount of shading that optimizes a clarity of the location or region at which the user is looking.

In one embodiment, the eyewear can be disposed to detect where the user is looking in response to one or more of: a dynamic eye tracking system, one or more "outbound" cameras disposed to review the user's field of view (FOV) from inside one or more lenses. For example, the dynamic eye tracking system can be disposed to determine in what direction, and at what depth of focus, the user is looking. This can have the effect that the dynamic eye tracking system can determine a location in three-dimensional (3D) space at which the user is looking. For another example, the outbound camera can be disposed to examine the user's FOV from inside one or more of the lenses. Either of these techniques can have the effect that when the user moves their head or otherwise alters their FOV, the eyewear can adjust the 3D location that is shaded. More precisely, the eyewear can adjust a location on each lens so that the joint focus of the user's eyes at that 3D location is shaded.

This can have the effect that the eyewear shades "where the user is looking". When the user adjusts the direction they are looking, adjusts the depth of field at which they are looking, tilts their head, squints, otherwise moves due to an external force, the eyewear can shade where the user looks, and if so desired, only where the user looks. For example, if the user might be in a vehicle, such as an aircraft, racecar, or sailboat or speedboat, and the user might be looking at a dashboard or instrument, or user might be looking at an external object. The eyewear can shade where the user is looking, notwithstanding the user's head or eye movement, the vehicle's movement, or other movement that might affect where the user is looking.

In one embodiment, it might occur that the environment has a substantial amount of excessive lighting from one or more sources. In such cases, it can matter (A) whether any particular light source exceeds an amount of ambient light, and if so, by how much; (B) whether the user is looking in the direction of, or focusing on, any particular light source, and if so, how directly; and (C) whether the object the user is looking at is bright or not, has contrast or not, is reflective or not, or other factors that might have an effect on the user's eyesight. In such cases, it can be desirable to adjust an amount of shading in response to lighting conditions and in response to the nature of the object at which the user is looking.

For example, one such environment can be when the user is controlling an aircraft. In such cases, a pilot's eyes might need to look at instruments within the aircraft, and those instruments might be positioned (A) in shadow, (B) where they reflect sunlight, (C) where they are illuminated by cabin lights, or some combination thereof. In alternative such cases, a pilot might need to look at objects outside the aircraft, and those objects might be positioned (A) in shadow, such as under cloud cover, (B) where they reflect sunlight, such as when the cloud cover itself is brightly lit, (C) where they are backlit by sunlight, such as when transiting the sun or approaching from sunward, or some combination thereof.

In such cases, the eyewear can be disposed to adjust shading in response to whether the user is looking at an object outside the aircraft or whether the user is looking at an instrument inside the aircraft. The eyewear can be disposed to shade in response to (A) a direction at which the user is looking or (B) a distance at which the user is focusing, such as in response to a dynamic eye tracking system, (C) whether the user tilts their head or otherwise gestures (such as using an eye/face gesture, a head gesture, a hand/finger gesture, or another gesture) in response to a change in one or more of (airspeed, altitude, attitude, or otherwise) concurrent with looking inside or outside the aircraft (or transitioning between the two).

In one embodiment, the eyewear can be disposed to adjust shading with respect to at least a portion of the user's field of view (FOV) during a time period while the user blinks. Since a blink takes a finite amount of time, the eyewear can adjust an amount of shading while the user is blinking (and the pupil is covered by the eyelid). This can have the effect that the user sees a different amount of shading before the blink and after the blink. The eye integrates the amount of shading into its received image. This can have the effect that the user does not notice the change in the amount of shading.

In one embodiment, the eyewear can be similarly disposed to adjust other visual effects (such as polarization or refraction) with respect to at least a portion of the user's field of view (FOV) during a time period while the user blinks. Similar to adjustment of shading during the user's blink, this can have the effect that the user sees different other visual effects (such as polarization or refraction) before the blink and after the blink, which can be integrated by the eye into its received image, so that the user does not notice the change.

As described above, in one embodiment, the eyewear can be disposed to adjust shading with respect to at least a portion of the user's field of view (FOV) during a time period while the user blinks. Since a blink takes a finite amount of time, the eyewear can adjust an amount of shading while the user is blinking (and the pupil is covered by the eyelid). This can have the effect that the user sees a different amount of shading before the blink and after the blink. The eye integrates the amount of shading into its received image. This can have the effect that the user does not notice the change in the amount of shading.

In one embodiment, the eyewear can be disposed to adjust shading with respect to at least a portion of the user's field of view (FOV) in response to a sudden rise (or other change) in brightness/luminosity or color balance. For example, the user's eye might have been subjected to a bright light or a laser. In such cases, the eyewear can be disposed to shade in response to an intensity of the bright light or laser, so as to protect the user's eyes against damage to eyesight or night vision. In such cases, the eyewear can be disposed to shade in response to a direction of the bright light or laser, so as to maintain as much of the user's field of view (FOV) as possible, and so as to provide the user with an indicator of where the bright light or laser is coming from. If the user is piloting a vehicle, such as an aircraft, or sailboat or speedboat, the user can use this information to direct the vehicle toward or away from the source of the bright light or laser.

In one embodiment, the eyewear can be disposed to detect polarization of the bright light or laser, and to adjust polarization with respect to at least a portion of the user's field of view (FOV) in response thereto. This can have the effect that the brightness/luminosity of the bright light or laser can be reduced (when the bright light or laser is polarized). This can also have the effect that the eyewear can protect the user's eyes against damage to eyesight or night vision, while providing the user with the ability to see through the region of their FOV impacted by the bright light or laser. The eyewear can also be disposed to detect changes in the polarization of the bright light or laser, and to adjust polarization with respect to those changes, so as to maintain protection of the user's eyes even when the bright light or laser is itself changing.

In one embodiment, the eyewear can include an electrically controlled polarizer disposed to alter an angle of polarization in real time. For example, the polarizer can be adjusted in real time in response to changes in a relative angle between the wearer's eye and a direction of infalling glare. When light is reflected from a surface, it can become polarized in a plane. This can have the effect that a planar polarizer can be adjusted so as to reduce or eliminate the amount of light allowed through the polarizer to the wearer's eye. In such cases, the electrically controlled polarizer can alter the plane of personalization in response to a sensor for determining an angle at which the glare is viewed. The sensor can include a gyroscope or a magnetometer, or another device suitable to determine a relative orientation of the eyewear with respect to the infalling glare. Alternatively, the sensor can be disposed inside the eyewear and include a light sensor, an infrared (IR) sensor, a camera, or another device suitable to determine an amount of infalling glare.

In one embodiment, the eyewear can include an electrically controlled magnifier disposed to alter an amount of magnification, such as in real time. For example, the magnifier can be adjusted, such as in real time, in response to eye gaze direction by the wearer's eye, in response to eye gestures or other inputs by the wearer, or in response to object recognition by the eyewear. When the wearer looks at a particular object, their gaze direction and focal length can be determined and can identify a particular object. The eyewear can also identify the object using object recognition. Alternatively, when the wearer provides an eye gesture or other input, the wearer can designate a particular object and direct the eyewear to identify that object. In such cases, the eyewear can determine, such as in response to the wearer's input, an amount of magnification desired by the wearer and can adjust an amount of magnification of that object provided by the eyewear.

In one embodiment, the eyewear can provide dynamic adjustment with respect to three-dimensional (3D) viewing of a display. For example, the display can include a smartphone or mobile device display, a phablet or tablet display, a computer display, a wearable or implantable device display, a gaming device display, a video display, or otherwise. In such cases, the eyewear can determine when the wearer is looking at, or otherwise directing their gaze toward, the display, and can determine whether the display is disposed to provide a 3D presentation. When the display is disposed to provide a 3D presentation and the wearer alters their gaze from/to the display, the eyewear can turn on/off a 3D presentation in response thereto. For example, when the eyewear is disposed to provide a 3D presentation at the display and the wearer moves their gaze from the display, the eyewear can turn off its 3D presentation and allow the wearer to see their normal field of view (FOV) without any 3D adjustment. When the wearer moves their gaze to the display, the eyewear can turn on its 3D presentation and allow the wearer to see the display using 3D viewing.

In one embodiment, the eyewear can be disposed to provide color change by the eyewear. For example, this can include a color change by the frame when the eyewear includes glasses, a facemask, helmet, or otherwise. For another example, this can include a color change by a portion of the eyewear, such as associated with the iris so as to not interfere with the wearer's vision, when the eyewear includes a contact lens, or otherwise. For another example, this can include a size change associated with the eyewear, such as associated with the pupil so as to not interfere with the wearer's vision, when the eyewear includes a contact lens, or otherwise. Thus, the color change can include a portion of a contact lens that covers the iris or sclera, but not the pupil. For another example, this can include a color change associated with the pupil or lens, so as to alter a color balance of the wearer's vision, when the eyewear includes a contact lens or implantable lens, or otherwise.

In addition to color change, the eyewear can be disposed to provide a color texture. The color texture can include a combination of multiple colors, such as a color gradient, a color pattern, a picture, or another technique in which more than one color is disposed on the eyewear frame or on a contact lens. The color texture can be disposed over the entire eyewear, such as a gradient, pattern, or picture that is disposed over the entire frame or the whole contact lens. Alternatively, the color texture can be disposed with respect to portions of the eyewear, such as a color texture that is only applied to portions touching the lenses, or only applied to portions at the edges of contact lenses.

The color change can also be disposed to itself change in response to time. The color change can include a continuous change, such as a color texture that cycles from a first to a second color and back again. The color change can include a random element, such as a color texture that changes the color of portions of the eyewear randomly or pseudo-randomly, or randomly or pseudo-randomly and in response to objects in the user's field of view (or otherwise subject to user parameters, such as the user's skin temperature). The color texture can even be disposed to present a moving picture, such as on the side of the frame or on the iris portion of a contact lens.

In one embodiment, the eyewear can combine two or more such functions, such as in response to an input from the wearer designating that those functions should be combined, or such as in response to the eyewear recognizing a circumstance in which the wearer typically requests that those functions should be combined. For example, the wearer can designate that those functions should be combined using an eye gesture or other input. For another example, the eyewear can recognize a circumstance in which the wearer typically requests that those functions should be combined in response to a machine learning technique, such as a statistical response to sensory parameters, wearer parameters, environmental parameters, or otherwise. In such cases, the sensory parameters or wearer parameters can include information with respect to the wearer's medical or other status; the environmental parameters or can include information with respect to the scene in the wearer's field of view (FOV). The eyewear can also be responsive to other information, or to a combination of factors, such as the eyewear being more/less sensitive to selected parameters (or to particular wearer inputs) when sensory parameters or wearer parameters indicate particular medical or other status, or otherwise.

TERMS AND PHRASES

The following terms and phrases are exemplary only, and not limiting.

The phrases "this application", "this description", and variants thereof, generally refer to any material shown or suggested by any portions of this Application, individually or collectively, and including all inferences that might be drawn by anyone skilled in the art after reviewing this Application, even if that material would not have been apparent without reviewing this Application at the time it was filed.

The term "e-sun reader", and variants thereof, generally refers to any device disposed to use a shading/inverse-shading effect to provide a readable portion of the wearer's field of view in bright light, such as in bright sunlight. For example, and without limitation, an e-sun reader can include eyewear disposed to shade/inverse-shade one or more lenses so as to adjust brightness on a smartphone, tablet/phablet, or computer screen or other screen. This can have the effect that the wearer of the eyewear can read the screen even in sunlight (or other bright light) that would otherwise wash out the display on the screen and make it difficult to read.

The term "eyewear", and variants thereof, generally refers to any device coupled to a wearer's (or other user's) input senses, including without limitation: glasses (such as those including lens frames and lenses), contact lenses (such as so-called "hard" and "soft" contact lenses applied to the surface of the eye, as well as lenses implanted in the eye), retinal image displays (RID), laser and other external lighting images, "heads-up" displays (HUD), holographic displays, electro-optical stimulation, artificial vision induced using other senses, transfer of brain signals or other neural signals, headphones and other auditory stimulation, bone conductive stimulation, wearable and implantable devices, and other devices disposed to influence (or be influenced by) the wearer. For example, the digital eyewear can be wearable by the user, either directly as eyeglasses or as part of one or more clothing items, or implantable in the user, either above or below the skin, in or on the eyes (such as contact lenses), or otherwise. The digital eyewear can include one or more devices operating in concert, or otherwise operating with other devices that are themselves not part of the digital eyewear.

The phrase "real time", and variants thereof, generally refer to timing, particularly with respect to sensory input or adjustment thereto, operating substantially in synchrony with real world activity, such as when a user is performing an action with respect to real world sensory input. For example, "real time" operation of digital eyewear with respect to sensory input generally includes user receipt of sensory input and activity substantially promptly in response to that sensory input, rather than user receipt of sensory input in preparation for later activity with respect to other sensory input.

The phrases "sensory input", "external sensory input", and variants thereof, generally refer to any input detectable by a human or animal user. For example, sensory inputs include audio stimuli such as in response to sound; haptic stimuli such as in response to touch, vibration, or electricity; visual stimuli such as in response to light of any detectable frequency; nasal or oral stimuli such as in response to aroma, odor, scent, taste, or otherwise; other stimuli such as balance; or otherwise.

The phrases "shading", "shading/inverse-shading", "inverse-shading", and variants thereof, generally refer to any technique for altering a sensory input, including but not limited to:
- altering a total luminance associated with an image, such as by reducing luminance at substantially each pixel in the image;
- altering a luminance associated with a portion of an image, such as by reducing luminance at a selected set of pixels in the image;
- altering a luminance associated with a portion of an image, such as by increasing luminance at a selected portion of the image, to brighten that portion of the image, to highlight a border around or near that portion of the image, to improve visibility of that portion of the image, or otherwise;
- altering a loudness associated with an auditory signal, such as by reducing loudness at substantially each portion of the auditory signal;
- altering a loudness associated with a portion of an auditory signal, such as by reducing loudness at a selected set of times or frequencies in that auditory signal;
- altering a loudness associated with a portion of an auditory signal, such as by increasing loudness at a selected set of times or frequencies in that auditory signal, to improve listening to that portion of the image, or otherwise;
- altering a selected set of frequencies associated with an image, such as to change a first color into a second color, for the entire image, for a portion of the image, or otherwise;
- altering a selected set of frequencies associated with an image, such as to provide a "false color" image of a signal not originally viewable by the human eye, such as to provide a visible image in response to an IR (infrared) or UV (ultraviolet) or other information ordinarily not available to human senses;
- altering a sensory input other than visual or auditory sensory inputs, such as by reducing/increasing an intensity of a haptic input, of an odor, or of another sense.

The phrases "signal input", "external signal input", and variants thereof, generally refer to any input detectable by digital eyewear or other devices. For example, in addition to or in lieu of sensory inputs and external sensory inputs, signal inputs can include
- information available to digital eyewear in response to electromagnetic signals other than human senses, such as signals disposed in a telephone protocol, a messaging protocol such as SMS or MMS or a variant thereof, an electromagnetic signal such as NFC or RFID or a variant thereof, an internet protocol such as TCP/IP or a variant thereof, or similar elements;
- information available to digital eyewear in response to an accelerometer, a gyroscope, a GPS signal receiver, a location device, an ultrasonic device, or similar elements;
- information available to digital eyewear in response to a magnetometer, a medical imaging device, an MRI device, a tomography device, or similar elements;
- or otherwise.

The phrase "mobile device", and variants thereof, generally refers to any relatively portable device disposed to receive inputs from and provide outputs to, one or more users. For example, a mobile device can include a smartphone, an MP3 player, a laptop or notebook computer, a computing tablet or phablet, or any other relatively portable device disposed to be capable as further described herein. The mobile device can include input elements such as a capacitive touchscreen; a keyboard; an audio input; an accelerometer or haptic input device; an input coupleable to an electromagnetic signal, to an SMS or MMS signal or a variant thereof, to an NFC or RFID signal or a variant thereof, to a signal disposed using TCP/IP or another internet protocol or a variant thereof, to a signal using a telephone protocol or a variant thereof; another type of input device; or otherwise.

The term "random", and variants thereof, generally refers to any process or technique having a substantially nonpredictable result, and includes pseudo-random processes and functions.

The phrase "remote device", and variants thereof, generally refers to any device disposed to be accessed, and not already integrated into the accessing device, such as disposed to be accessed by digital eyewear. For example, a remote device can include a database or a server, or another device or otherwise, coupled to a communication network, accessible using a communication protocol. For another example, a remote device can include one or more mobile devices other than a user's digital eyewear, accessible using a telephone protocol, a messaging protocol such as SMS or MMS or a variant thereof, an electromagnetic signal such as NFC or RFID or a variant thereof, an internet protocol such as TCP/IP or a variant thereof, or otherwise.

The phrase "user input", and variants thereof, generally refers to information received from the user, such as in response to audio/video conditions, requests by other persons, requests by the digital eyewear, or otherwise. For example, user input can be received by the digital eyewear in response to an input device (whether real or virtual), a gesture (whether by the users' eyes, hands, or otherwise), using a smartphone or controlling device, or otherwise.

The phrase "user parameters", and variants thereof, generally refers to information with respect to the user as determined by digital eyewear, user input, or other examination about the user. For example, user parameters can include measures of whether the user is able to distinguish objects from audio/video background signals, whether the user is currently undergoing an overload of audio/video signals (such as from excessive luminance or sound), a measure of confidence or probability thereof, a measure of severity or duration thereof, other information with respect to such events, or otherwise.

After reviewing this Application, those skilled in the art would recognize that these terms and phrases should be interpreted in light of their context in the specification.

FIGURES AND TEXT

FIG. 1—Active Correction or Enhancement

FIG. 1 (collectively including FIGS. 1A and 1B) shows a conceptual drawing of example eyewear including glasses. FIG. 1A shows a conceptual drawing of example glasses having multiple active regions related to wearer view. FIG. 1B shows a conceptual drawing of example glasses having multiple active pixels related to individual wearer view.
Active Correction or Enhancement—Regions FIG. 1A shows a conceptual drawing of example glasses having multiple active regions related to wearer view.

In one embodiment, an example eyewear 100 can include glasses 110 disposed for use by the wearer (not shown), including elements shown in the figure, such as one or more of:
 a frame 111, such as possibly including earpieces 111a, a nosepiece 111b, or lens holders 111c;
 at least one lens 112, such as possibly a right lens 112a (shown in FIG. 1A), or a left lens 112b (shown in FIG. 1B).

In one embodiment, the frame 111 can enclose, or hold, one or more electronic elements shown in the figure, such as one or more of:
 a computing device 121, such as possibly including a processor, memory or mass storage, a power supply, a clock circuit, or other elements used with computing devices;
 a communication device 122, such as possibly including a wireless or wired communicate element, a communication protocol stack, or other elements used with communication devices;
 one or more sensors 123, such as possibly including one or more of: wearer sensors 123a disposed to receive information about the wearer (or their current condition), ambient sensors 123b disposed to receive information about an environment near the wearer (or its current condition), or other sensors.

For example, the sensors 123 can include one or more visually evoked potential (VEP) elements disposed to measure a potential of the wearer's visual region of the brain. The VEP elements can be disposed using a set of electrodes disposed on the wearer's scalp, or on a headset or headband, on the wearer's forehead, on the back of the wearer's neck, or otherwise. The sensors 123 can also include elements disposed to measure an electroencephalogram (EEG), an amount of skin moisture, a skin temperature, a galvanic skin response, other elements disposed to measure the wearer's emotional state, or otherwise.

For another example, the sensors 123 can include one or more devices disposed to perform electroencephalography (EEG), electrooculography (EOG), electroretinography (ERG), optical computed tomography (OCT), or other measures with respect to eye function. For example, anxiety or depression can be determined in response to ERG. For another example, cardiac risk can be determined in response to OCT. For another example, the computing device 121 can be disposed to use other measures with respect to eye function, such as in combination with one or more artificial intelligence (AI) or machine learning (ML) techniques, to predict one or more measures of efficacy of treatment, quality of life after treatment, or otherwise, with respect to monitoring, predicting, preventing, diagnosing, or treating medical conditions.

For another example, the sensors 123 can include an electric field element disposed to measure a dipole moment of the eye. The dipole moment of the eye is weak but present; it is aligned at a known angle with respect to a gaze direction. This can have the effect that the element disposed to measure a dipole moment of the eye can measure a gaze direction, without requiring any input to, or view of, the pupil or iris.

For another example, the sensors 123 can include a gaze direction sensor (not shown), such as an element disposed to measure a reflection of an electromagnetic signal, such as infrared (IR) light directed at the eye and reflected in response to a direction of the pupil or the lens thereof. In such cases, the gaze direction sensor can provide a signal indicating a direction at which the wearer is looking, such as whether the wearer is looking up/down, right/left, centrally/peripherally, or through what region of the lens the wearer's gaze is directed. In such cases, the sensors 123 can also include a pupillometer, such as an element disposed to measure a size of the pupil, such as a camera or other device disposed to distinguish a size of the pupil. A size of the pupil can be used to determine a focal length at which the wearer is directing a gaze, such as at a distance, mid-range, or near range.

For another example, the sensors 123 can include one or more devices mounted on a vehicle, such as a vehicle being controlled by the wearer (such as a racing car or an aircraft). For example, the sensors 123 can be disposed surrounding the vehicle, directed at fields of view (FOV) not ordinarily available to the wearer when operating the vehicle. The sensors 123 can be mounted on the vehicle and directed to the sides or rear of the vehicle, at the front of the vehicle and directed at angles from the wearer's FOV, or otherwise. The sensors 123 can be mounted on the vehicle and disposed so as to move relative to the vehicle, such as when the vehicle is turning, climbing or diving, accelerating or decelerating, or otherwise.

For another example, the sensors 123 can include one or more remote devices, such as mounted on aircraft, drones, other vehicles, other distant stations, or otherwise. In such cases, the sensors 123 can be disposed to transmit information to the computing device 121, so as to control the lenses 112. In additional such cases, the sensors 123 can be disposed to transmit information from an over-the-horizon field of view (FOV), otherwise not ordinarily available to the wearer.

In one embodiment, the lens holders 111c can be disposed to maintain one or more lenses 112, such as lenses used to correct vision on behalf of the wearer, lenses used to enhance vision on behalf of the wearer, or otherwise. For example, lenses 112 used to correct vision can have one or more lens prescriptions associated therewith, disposed to correct for myopia, presbyopia, astigmatism, or other wearer vision artifacts. For another example, lenses 112 used to enhance vision can include a zoom feature disposed to present the wearer with a zoomed-in or zoomed-out view of the wearer's field of view (FOV), or can include other features disposed to present the wearer with other vision enhancements described in the Incorporated Disclosures, or otherwise.

The lenses 112 can include multiple lens regions 131, each disposed to correct vision or enhance vision on behalf of the wearer. For example, the lens regions 131 can include a central vision region 131a, disposed to provide distinct corrections or enhancements to vision in a region where the wearer is looking at objects using their central vision, or one or more peripheral vision regions 131b, disposed to provide distinct corrections or enhancements to vision in a region where the wearer is looking at objects using their peripheral vision. For another example, the lens regions 131 can include a close-vision region 131c, disposed to provide distinct corrections or enhancements to vision in a region where the wearer is looking at a close object, a mid-range vision region 131d, disposed to provide distinct corrections or enhancements to vision in a region where the wearer is looking at a mid-range object, or a distant vision region 131e, disposed to provide distinct corrections or enhancements to vision in a region where the wearer is looking at a distant object.

In one embodiment, each lens region 131 can be individually controlled, such as by the computing device 121, or otherwise. This can have the effect that the wearer's vision can be corrected or enhanced in each region where the wearer might look. For example, the close-vision region 131c can be disposed with a distinct prescription from the mid-range vision region 131d. This can have the effect that when the wearer looks at a close object, their vision can be corrected or enhanced with respect to the prescription assigned to the close-vision region 131c, or when the wearer looks at a mid-range object, vision can be corrected or enhanced with respect to the prescription assigned to the mid-range vision region 131d. For another example, the central vision region 131a can be disposed with a distinct prescription from the peripheral vision region 131b. This can have the effect that when the wearer looks directly at an object, their vision can be corrected or enhanced with respect to the prescription assigned to the central vision region 131a, or when the wearer uses their peripheral vision, their vision can be corrected or enhanced with respect to the prescription assigned to the peripheral vision region 131b.

In one embodiment, when the wearer moves their head, the computing device 121 can determine, such as using an accelerometer or a gyroscope (which can be included with the sensors 123), a wearer's head movement. The computing device 121 can also determine, such as using a dynamic eye gaze tracker (which can be included with the sensors 123), a gaze direction. This information can allow the computing device 121 to determine whether the wearer is intending to look at a close object, a mid-range object, or a distant object; similarly, this information can allow the computing device 121 to determine whether the wearer is using their central vision or peripheral vision. In response thereto, the computing device 121 can control the correction or enhancement associated with one or more of the lens regions 131. This can have the effect that the eyewear 100 adjusts its correction or enhancement to match the wearer's intended use thereof.

In another embodiment, when the wearer shifts their gaze, the computing device 121 can determine, such as using a focal length detector (which can be included with the sensors 123), a distance to an object being viewed by the wearer. This information can allow the computing device 121 to determine whether the wearer is intending to look at a close object, a mid-range object, or a distant object. In response thereto, the computing device 121 can control the correction or enhancement associated with one or more of the lens regions 131. This can have the effect that the eyewear 100 adjusts its correction or enhancement to match the wearer's intended use thereof.

In one embodiment, the lens regions 131 can overlap, such as shown in the figure. An example might occur when close-range overlaps with both central/peripheral vision. In such cases, the intersection of multiple lens regions 131, or the union of multiple lens regions 131, as appropriate, can be invoked by the computing device 121, so as to provide the wearer with the correction or enhancement to match the wearer's intended use of the eyewear 100.

Active Correction or Enhancement—Pixels

FIG. 1B shows a conceptual drawing of example glasses having multiple active pixels related to individual wearer view.

In one embodiment, an example eyewear 100 can include glasses 110 disposed for use by the wearer (not shown), including elements shown in the figure, such as one or more of:

a frame 111, such as possibly including earpieces 111a, a nosepiece 111b, or lens holders 111c;

at least one lens 112, such as possibly a right lens 112a (shown in FIG. 1A), or a left lens 112b (shown in FIG. 1B).

The lenses 112 can include multiple lens pixels 141, each disposed to correct vision or enhance vision on behalf of the wearer. In one embodiment, each lens pixel 141 can include an individual region (such as the multiple lens regions 131, only typically smaller), disposed to provide distinct corrections or enhancements to vision in the region where the wearer's gaze direction intersects the lens pixel. Similar to the lens regions 131 described with respect to FIG. 1A, each lens pixel 141 can be individually controlled, such as by the computing device 121, or otherwise. This can have the effect that the wearer's vision can be corrected or enhanced for each direction where the wearer might look.

In one embodiment, the computing device 121 can associate a distinct set of lens pixels 141 for use as a separate one of the multiple lens regions 131. The computing device 121 can control the prescription with respect to each such lens region 131 by controlling each of the lens pixels 141 associated with that particular lens region. Similar to the possibility of overlap of lens regions 131, a set of lens pixels 141 can be associated with more than one such lens region. This can have the effect that when the computing device 121 determines that the wearer is using a particular lens region 131, it can select the set of lens pixels associated with that lens region, even if those lens pixels are also associated with another lens region. Similar to overlap of lens regions 131, the intersection of multiple sets of lens pixels 141, or the union of multiple sets of lens pixels 141, as appropriate, can be invoked by the computing device 121, so as to provide the wearer with the correction or enhancement to match the wearer's intended user of the eyewear 100. When the computing device 121 can determine the wearer's intended user of the eyewear 100 and can determine the particular lens pixel 141 that the wearer's gaze direction passes through, the computing device can invoke only that one lens pixel, possibly updating the particular lens pixel to invoke as the wearer's gaze direction might change.

The set of lens pixels 141 associated with each such lens region 131 can be adjusted by the computing device 121. This can have the effect that the set of lens pixels 141 associated with each such lens region 131 can be altered from time to time.

In alternative embodiments, the lenses 112 can include one or more layers or alternative regions that can have their shading, or other effects, separately adjusted. Thus, in addition or in lieu of lens pixels 141, the lenses 112 can use separate regions that are adjusted as a whole, rather than being adjusted as a collective of lens pixels 141. When a region is adjusted, this can have the effect that the eye can be drawn toward or away a particular adjusted region. For example, when it is desired to encourage the user to look through a short-range focusing region, other regions can be shaded to decrease visibility, thus encouraging the user to look in a particular direction or through a particular region of the lenses.

For example, a selected lens 112a or 112b can include a first region for a first degree of vision correction, such as using refraction, such as for close-range viewing and a second region for a second degree of vision correction, such as for longer-range viewing. A second lens can be overlaid on the first lens, so that the second lens can shade one or more regions of the first lens. This can have the effect that the user is prompted to look in a selected direction, or through a particular region of the first lens. Thus, the second lens can shade so as to prompt the user to view through the selected lens 112a or 112b, thus looking at a field of view (FOV) through either a selected close-range lens (e.g., lens 112a) or a selected more longer-range lens (e.g., lens 112b).

Predictive Techniques

In one embodiment, the computing device 121 can maintain a record of wearer activity with respect to use of the lens regions 131, so as to identify which portions of the lenses 112 should be associated with which lens regions 131 to provide the wearer with the best possible experience with using the eyewear 100. For example, when the computing device 121 determines that the wearer is most likely to need a particular prescription for a selected portion of the lenses 112, the computing device can adjust the prescription for that particular portion of the lenses so as to provide the wearer with that prescription when the wearer is using that portion of the lenses.

In one embodiment, the computing device 121 can determine the wearer's most likely prescription in response to a predictive technique, such as using artificial intelligence (AI) or machine learning (ML). For example, the computing device 121 can train a recurrent neural network (RNN) to predict the wearer's most likely prescription in response to each lens region 131 and each other set of circumstances, such as information obtained from the sensors 123. Alternatively, the computing device 121 can determine a set of regression parameters to predict the wearer's most likely prescription in response to each lens region 131 and each other set of circumstances. The computing device 121 can use other and further AI or ML techniques, or other techniques, or otherwise, to make the desired prediction.

Similar to predictive techniques with respect to the lens regions 131, the computing device 121 can determine the wearer's most likely prescription in response to one or more predictive techniques, such as using artificial intelligence (AI) or machine learning (ML) with respect to each lens pixel 141, with respect to association of lens pixels 141 with particular lens regions 131, or otherwise. In such cases, the computing device 121 can assign individual lens pixels 141 to selected lens regions 131, in response to one or more predictive techniques. Also similarly, the computing device 121 can adjust the set of lens pixels 141 associated with each lens region 131 in response to a predictive technique in response to wearer actions, such as the wearer moving their head when their gaze direction should be reassociated with a different lens region 131.

In one embodiment, the computing device 121 can determine the wearer's most likely medical condition, such as in response to the sensors 123. For example, blink rate and other parameters with respect to the wearer's eye activity can be used to determine whether the wearer is excessively anxious, depressed, sleep-deprived, or otherwise needs to rest. In such cases, the eyewear 100 can be disposed to urge the wearer to take a break and rest. This can have the effect that safety is improved, such as for commercial pilots and other pilots, long-haul truckers and other long-distance drivers, police officers, military personnel, firefighters, emergency responders, medical personnel, and other personnel often subject to long hours or stressful circumstances. Alternatively, the eyewear 100 can be disposed to urge the wearer to take a break or to obtain a stimulant, such as caffeine, sugar, a meal, or otherwise.

Environment Features

In one embodiment, an example eyewear 100 can be responsive to environment features, such as: features of wearer's field of view (FOV), features of objects or scenes within the wearer's FOV, other features of the ambient environment, or otherwise.

For example, features of the wearer's field of view can include one or more of: ambient light, such as total luminance, luminance in a particular region thereof (such as in a region of peripheral vision), prominence of particular colors (such as excessive or inadequate red, green, or blue), glare, ultraviolet (UV), or otherwise. For another example, features of the wearer's field of view can include the presence of infrared (IR) frequencies, such as for use with "night vision" eyewear. For another example, features of the wearer's field of view can include particular frequency mixtures, such as: sunlight, indoor lighting, excessive UV, particularly when inappropriate for the time of day.

For example, features of the wearer's field of view can include identifying particular objects, such as weapons (guns, knives, or otherwise), possibly using object recognition. For another example, features of the wearer's field of view can include identifying particular people, such as friends, teammates, co-workers, search/rescue targets, criminal suspects, accident victims or medical patients, or otherwise.

For example, features of the wearer's ambient environment can include the wearer's location (including whether the wearer is within a particular area (such as within a known geofence), or whether the wearer is within a selected distance of a known object); the absence or presence of known electromagnetic signals, such as identify-friend-or-foe (IFF) signals for particular persons or equipment; atmospheric conditions, such as weather, pollution conditions, or allergens.

Electromagnetic Signals and Predictive Actions

When the wearer's ambient environment includes an IFF signal, the eyewear 100 can determine whether to adjust features of the wearer's field of view (FOV) in response to the IFF signal. For example, when the IFF signal indicates a warning that a stun grenade (sometimes called a "flashbang grenade") is about to be triggered in the local area, the eyewear 100 can adjust the wearer's FOV to (A) heavily shade infalling light so as to protect the wearer eyes against the extreme light emitted by the flashbang grenade, and (B) heavily protect the wearer's ears against the extreme sound emitted by the flashbang grenade.

When the wearer's ambient environment includes a signal describing an object, the eyewear 100 can determine whether to adjust feature of the wearer's field of view (FOV) in response to the object. Alternatively, the eyewear 100 does not need to explicitly wait for an explicit signal indicating describing the object; the eyewear can use a predictive technique, such as an artificial intelligence (AI) or machine learning (ML) technique to, in response to the ambient environment or other factors, to determine that the object is about to enter the wearer's FOV, so as to prepare itself accordingly to adjust the wearer's FOV.

(Dark Tunnel)

For example, the signal can indicate that the wearer is about to enter or to exit a dark tunnel, particularly when driving at relatively high speed. In such cases, the signal with respect to entering or exiting a dark tunnel can be emitted by a transmitter at or near the entrance or exit of the tunnel, or can be received with respect to a general location detector, such as a GPS device.

When the signal indicates that the wearer is a driver of a vehicle and is about to enter a dark tunnel, particularly when driving at relatively high speed, the eyewear 100 can adjust the wearer's FOV to (A) remove any shading against sunlight so as to allow the driver to see within the dark tunnel, and (B) enhance the wearer's vision within the dark tunnel, such as by enhancing any lighting within the tunnel, adjusting for any visual blur or noise due to the vehicle moving quickly within the dark tunnel, (C) adjust the wearer's prescription so as to account for the relative closeness of the walls of the dark tunnel, and (D) enhance the wearer's vision within the dark tunnel by adding to the light (by injecting light) in areas of the wearer's FOV where the dark tunnel is in shadow. The eyewear 100 can make similar adjustments to account for entering any similar darkened region, such as a canyon shadowed against sunlight.

Similarly, when the wearer's vehicle exits the tunnel (or other darkened region such as a canyon shadowed against sunlight), the eyewear 100 can adjust the wearer's FOV to (A) replace shading against sunlight so as to allow the driver to see when exiting the dark tunnel, and especially to remove glare from sudden sunlight from exiting the dark tunnel, (B) remove any enhancement of lighting so as to not exacerbate the effect of sudden sunlight, (C) adjust the wearer's prescription so as to account for the relative distance of roadway outside the dark tunnel (or other darkened region), and (D) remove any light injection so as to not overload the wearer's vision.

(Sudden Lighting Changes)

The eyewear 100 can similarly alert the wearer and adjust the wearer's field of view (FOV) in response to sudden changes in lighting condition, whether those sudden changes are due to known objects, known terrain features, or other known effects. For example, when the eyewear 100 detects a sudden change in lighting condition, the eyewear can adjust the wearer's FOV in response to that sudden change. Since the eyewear 100 can operate electronically, while the wearer's eye operates using the pupil and iris, this can have the effect that that the wearer's FOV can be adjusted much faster by the eyewear than by the wearer's eye muscles. The eyewear 100 can operate to respond to sudden changes in lighting condition in approximately 1.5 milliseconds, while the pupil and iris might take as long as 300 to 400 milliseconds to respond. Accordingly, the eyewear can protect the wearer against sudden changes in lighting more effectively than the wearer's eye itself. In such cases, the eyewear 100 does not need to explicitly wait for a sudden change in lighting condition; the eyewear can use a predictive technique, such as an artificial intelligence (AI) or machine learning (ML) technique to, in response to the ambient environment or other factors, to determine that a sudden change in lighting condition is imminent, so as to prepare itself accordingly to adjust the wearer's FOV.

For another example, the signal can indicate that the wearer is about to view a display, such as a display described with respect to FIG. 7. In such cases, the signal with respect to viewing a display can be emitted by a transmitter on or near the display, or can be received with respect to a general location detector such as a GPS device.

(Viewing a Display)

When the signal indicates that the wearer is about to view a display, such as when the wearer is driving, and the display includes a billboard or surface that enters the wearer's field of view (FOV), the eyewear 100 can adjust the wearer's FOV to augment the wearer's vision to inject an image at the location of the display. For example, the image injected onto the display can include information with respect to news, road conditions or weather; one or more advertisements, such as in response to demographic or social information about the wearer, or information about which the wearer has expressed interest, or otherwise.

When the signal indicates that the wearer is viewing a display, such as a display associated with a smartphone or other mobile device, or another selected background, the eyewear 100 can adjust the wearer's field of view (FOV) to include a three-dimensional (3D) display on the display superposed on the selected background. For example, the eyewear 100 can adjust the wearer's FOV to present a 3D display on the smartphone's display when the wearer looks at the smartphone. For another example, the eyewear 100 can adjust the wearer's FOV to present a 3D display on another selected background, such as a billboard, a movie theater screen, a theme-park display or other interactive display, an outdoor background, a region of the sky or other natural background, or another region of the wearer's field of view appropriate for a 3D display.

In one embodiment, the eyewear can be disposed to adjust shading, or other effects, with respect to an object or with respect to a portion of the user's field of view (FOV) at which the user is looking. In such cases, when the user is looking in a particular direction, the eyewear can be disposed to shade only portions of the user's FOV in that direction. Similarly, in such cases, when the user is looking at a particular object, such as when looking in a particular direction and at a particular depth of focus so as to distinguish a selected object, the eyewear can be disposed to shade only that selected object. An outbound camera, such as a camera mounted behind one or more of the lenses and disposed to view a location or region at which the user is looking, can be disposed to determine an amount of shading that optimizes the user's view, or to determine an amount of shading that optimizes a clarity of the location or region at which the user is looking.

For example, when the eyewear detects that the user is looking at a display, such as a smartphone or other mobile device, the eyewear can detect whether shading is necessary or appropriate, in response to the relative brightness of the display and of the ambient environment. For example, if the display is much brighter than the ambient environment (such as when the display is bright and is being viewed in relative darkness), the eyewear can be disposed to shade the region of the user's field of view (FOV) occupied by the display, and not those areas of the user's FOV occupied by other, less bright, objects. For another example, if the display is less bright than the ambient environment (such as when the display is not especially bright, when the ambient environment is quite bright, or when the ambient environment is substantial brighter than the display), the eyewear can be disposed to shade the region of the user's FOV occupied by the display, so as to allow the display to be viewed even in the bright ambient environment.

For another example, when the user is piloting a vehicle (such as an aircraft, a racing car, a sailboat or speedboat, or another controllable moving object), the eyewear can be disposed to detect the locations of the displays associated with that vehicle. For example, the eyewear can be disposed specifically for use with that vehicle, or the eyewear can be disposed to receive information from that vehicle when the user enters the vehicle. When the eyewear detects the locations of the displays associated with that vehicle, the eyewear can determine which displays are excessively bright or are over-brightly lit by the ambient environment. In such cases, the eyewear can be disposed to shade exactly those regions in the user's field of view (FOV), or those regions in the user's FOV and also depth of focus, where those displays are located with respect to the user's position when piloting the vehicle. Similarly, the eyewear can be disposed to shade exactly those regions in the user's FOV, or those regions in the user's FOV and depth of focus, where those displays are located with respect to the user's position when co-piloting the vehicle.

In such cases, the eyewear can be disposed to detect the particular type of vehicle in response to a signal from the vehicle, such as an electromagnetic signal when the user opens or closes a door to the vehicle, or when the user buckles a harness in the vehicle, or triggers an engine for the vehicle, or otherwise indicates their readiness to pilot the vehicle. It other such cases, the eyewear can be disposed to operate with respect to a particular type of vehicle; the eyewear can be pre-loaded with information about the vehicle, including positions of the vehicle's displays when in operation. The eyewear can be pre-loaded by one or more of: (A) being designed for use with a particular vehicle; (B) having information about distinct types of vehicle and setting itself for use with one type of vehicle in response to one or more signals indicating the user's starting to pilot that type of vehicle; (C) having information about locations of displays for distinct types of vehicle and setting itself for use with one type of vehicle in response to identifying displays associated with one type of vehicle; or (D) otherwise identifying locations of displays in response to information about the vehicle.

Viewing an Object

When the signal indicates that the wearer is about to view an object, such as when the wearer is moving in a theme-park ride or other entertainment attraction, and the object is about to enter the wearer's field of view (FOV), the eyewear 100 can adjust the wearer's FOV to augment the wearer's vision to inject an image at the location of the object. For example, the image injected at the location of the object can replace the wearer's view of the object with a different object. This can have the effect that the viewable entertainment attraction can be replaced with a different attraction without substantial physical change. For another example, the image injected at the location of the object can augment the wearer's view of the object with an additional texture, such as a seasonal decoration. This can have the effect that the viewable entertainment attraction can be modified in response to a time of day, day of the week, or season of the year, without substantial physical change.

For another example, the signal can indicate that the wearer is about to view an object, such as when the wearer is moving in a store, shopping mall, or other commercial area, and such as when the object is a product (or a display with respect to a service) in which wearer might be interested. In such cases, the signal with respect to the object can be emitted by a transmitter on or near the object, or can be received with respect to a general location detector such as a GPS device.

When the signal indicates that a product (or a display with respect to a service), in which the wearer might be interested, is about to enter the wearer's field of view (FOV), the eyewear 100 can adjust the wearer's FOV to augment the wearer's vision to inject an image at or near the location of the object. For example, the image can include (A) information about the product or service, such as a price or sale price, a product specification, a comparison with another product, a set of multiple views of the object, a view of the object in another color or style, or otherwise; (B) information about customer reviews of the product or services, such as positive or negative reviews that have been deemed helpful by other customers, or otherwise; (C) information about example uses, other products or services that can be used together, other products or services that have been purchased together, or otherwise; (D) an advertisement, such as one targeted to the wearer or related to topics in which the wearer is interested. In such cases, the eyewear 100 can adjust the wearer's FOV at such times when the wearer is directing their gaze or focus at the object itself, rather than the generalized area in which the object can be seen.

When the signal indicates that a product (or a display with respect to a service), in which the wearer might be interested, is being viewed by the wearer, the eyewear 100 can adjust the wearer's view of the object to augment the wearer's vision in response to input from the wearer. For example, the wearer can indicate a particular use in which the wearer is interested, in response to which the eyewear 100 can adjust the wearer's view of the object to show the object in the context of that particular use. For example, when the wearer is viewing a product or service for which ordinary store lighting is not the best suited, the eyewear 100 can adjust the wearer's view of the object to show the context in which the wearer intends to use the object.

Examples can include:
when the object includes sportswear or swimwear, or similar clothing, the eyewear 100 can adjust the wearer's view to show how the object might look in full sunlight at a beach or pool, or otherwise;
when the object includes club wear or party clothing, or similar clothing, the eyewear 100 can adjust the wearer's view to show how the object might look in a bar or club, a party environment, or otherwise;
when the object includes makeup or other beauty accessories, the eyewear 100 can adjust the wearer's view to show how the object might look in a context with respect to one or more intended uses, such as in daytime or night time, indoors or outdoors, in bright or dark environments, or otherwise.

Augmented Reality and Virtual Reality

In one embodiment, an example eyewear 100 can enhance the wearer's vision using augmented reality or virtual reality. For example, the eyewear 100 can be disposed to provide one or more images in lieu of or in place of images that would otherwise be available to the wearer's eye from the ambient environment. This can include one or more of:
shading/inverse-shading light from the ambient environment incoming to the wearer's eye and replacing that incoming light with other light so as to can form an alternative image not otherwise available in the wearer's field of view, and replacing the image available to the wearer with an altered field of view;
overlaying additional light on light from the ambient environment incoming to the wearer's eye, while also possibly shading/inverse-shading and light from the ambient environment so as to form an additional image not otherwise available in the wearer's field of view, while still allowing the wearer to see their otherwise-unaltered field of view.

For example, when presenting an augmented reality or virtual reality view to the wearer, the eyewear 100 can provide one or more of: text, still pictures, moving pictures, lines (such as scrimmage lines or trajectories in sporting events, whether the wearer is a participant or a spectator), highlighting or outlines of objects (such as the wearer's friends, or such as suspects or weapons when the wearer is a law enforcement officer), information presented in false-coloring or isobars, or otherwise.

For another example, when presenting an augmented reality or virtual reality view to the wearer, the eyewear 100 can provide one or more of: an image of an object or person not otherwise present in the wearer's field of view, such as an object being presented to the wearer as an advertisement or for an informational purpose, an object in a game, an object being presented to the wearer using remote communication; or such as a person whom the wearer is interacting or observing or searching for, with whom the wearer is communicating.

For another example, the wearer can control or invoke augmented reality or virtual reality functions, such as
- to add or remove additional images or information with respect to the wearer's field of view;
- to adjust the use of augmented reality or virtual reality with respect to the wearer's field of view;
- to provide selected enhancements to the wearer's field of view that the wearer might desire (such as to improve audio/visual acuity, to treat audio/visual disorders such as glare or migraines, to treat problematic effects of the ambient environment such as inadequate light or contrast, to preserve the wearer's night vision, or otherwise to correct or enhance the wearer's audio/visual senses);
- to select between unaltered-reality images and augmented reality or virtual reality images;
- or otherwise.

For another example, the wearer can control or invoke augmented reality or virtual reality functions to shade/inverse-shade an amount of incoming light from the ambient environment, such as to mitigate glare or excessive brightness, to mitigate excessively bright lighting, to preserve the wearer's night vision, to inject selected electromagnetic frequencies (such as amber or green light for a calming effect, or such as blue light to a stimulating or waking effect), or otherwise.

For another example, the wearer can trigger augmented reality or virtual reality features, such as by proximity to a selected object or by looking in a selected direction. Proximity to a selected object can include approaching an object in a store that is for sale, whereupon the object can trigger the augmented reality or virtual reality feature to present an advertisement or other information to the wearer. Similarly, looking in a selected direction can include looking at a menu in a restaurant whereupon the menu can trigger the augmented reality or virtual reality feature to present a description or a picture of the selected menu item, or looking at an object associated with an audio/video presentation to present that presentation, or to present an augmented reality or virtual reality presentation associated with that object.

Medical Parameters

In one embodiment, an example eyewear 100 can be responsive to medical conditions of the wearer, such as whether the wearer is subject to allergies, "dry eyes" and related conditions, migraines/photophobia or related conditions, sleep deprivation, epilepsy or other seizure concerns, being under the influence of alcohol or other substances, or otherwise.

For example, the eyewear 100 can determine whether the wearer is subject to allergies in response to whether there is any mucus buildup on the wearer's eyes or tear ducts, or other parameters with respect to allergies.

For another example, the eyewear 100 can determine whether the wearer is subject to "dry eyes" in response to to whether the wearer exhibits red sclera (such as from display of blood vessels at the sclera), short tear film breakup time, thin tear films, or other parameters with respect to dry eyes, and features described with respect to the Incorporated Disclosures, particularly including application Ser. No. 16/138,941, filed Sep. 21, 2018, naming the same inventor, titled "Digital eyewear procedures related to dry eyes", currently pending.

For another example, the eyewear 100 can determine whether the wearer is subject to migraines/photophobia or related conditions in response to features described with respect to the Incorporated Disclosures, particularly including application Ser. No. 15/942,951, filed Apr. 2, 2018, naming the same inventor, titled "Digital Eyewear System and Method for the Treatment and Prevention of Migraines and Photophobia", currently pending.

For another example, the eyewear 100 can determine whether the wearer is subject to epilepsy or other seizure concerns, stroke or transient ischemia, traumatic brain injury (TBI), or being under the influence of alcohol or other substances, in response to the wearer's eye activity, such as pupil or iris size, blink rate, eye twitching or nystagmus, saccade rates and distances, eye rotation, other measurable features of the wearer's eye activity or facial activity, or otherwise. The eyewear 100 can determine the actual values of these or other measures, comparison with a baseline "normal" rate for the wearer or for ordinary patients, comparison with a baseline "normal" rate for the wearer under ordinary conditions (such as with respect to blink rate and related measures), or otherwise. The eyewear 100 can also determine first and other derivatives of those values, first order and other statistical measures of those values, correlations of pairs of those values, medical information with respect to those values, or otherwise.

For another example, the eyewear 100 can determine medical parameters with respect to the wearer's retina, such as whether the wearer's rods or cones are activated; whether the wearer's eyes are operating in photopic, mesopic, scotopic modes; a measure of activity of the wearer's fovea; or otherwise.

In one embodiment, the eyewear 100 can, with respect to one or more medical conditions, attempt to predict those medical conditions, prevent those medical conditions, diagnose those medical conditions (such as when they are beginning, occurring, or ending), monitor those medical conditions (as they begin, proceed, finish, end, or recur), treat those medical conditions (possibly with the assistance of the wearer), or otherwise.

For example, the eyewear 100 can perform prediction, prevention, diagnosis, treatment, or otherwise, using one or more artificial intelligence (AI) or machine learning (ML) techniques, such as those described with respect to the Incorporated Disclosures, particularly including application Ser. No. 15/942,951, filed Apr. 2, 2018, naming the same inventor, titled "Digital Eyewear System and Method for the Treatment and Prevention of Migraines and Photophobia", currently pending. In such cases, the eyewear 100 can perform prediction, prevention, diagnosis, treatment, or otherwise, with respect to medical conditions other than migraines or photophobia; for example, the eyewear 100 can perform these functions with respect to ADD or ADHD, Alzheimer's disease, autism spectrum disorder, bipolar disorder, cancer, cardiovascular risk, dementia, depression, "dry eyes", epilepsy or seizure disorders, eye fasciculations, hallucinations, Parkinson's disease, PTSD, schizophrenia, sleep disorders or circadian disorders (including "night shift" and "jet lag"), stroke or transient ischemia, traumatic brain injury (TBI), other medical conditions, or otherwise.

In such cases, the eyewear 100 can obtain, such as from a medical database or other remote source, a set of high-resolution longitudinal data with respect to a relatively large population. The high-resolution data can be used to generate an AI or ML model that the computing device 121 can apply to relatively low-resolution data obtained from the eyewear 100. The computing device 121 can apply the AI or ML model to the relatively low-resolution data obtained from the eyewear 100, so as to provide an in-the-field on-the-fly diagnosis with respect to the wearer.

For another example, the eyewear 100 can perform prediction, prevention, diagnosis, treatment, or otherwise, using one or more AI or ML techniques, such as those described with respect to the Incorporated Disclosures, particularly including application Ser. No. 16/264,553, filed Jan. 31, 2019, naming inventor Scott LEWIS, titled "Digital eyewear integrated with medical and other services", currently pending.

User Feedback

In one embodiment, an example eyewear 100 can include glasses 110 disposed for use by the wearer (not shown) and can be responsive to user input. User input can provide information to the computing device 121, such as indicating that the user is attempting a particular viewing activity, as user input indicating that the user accepts/rejects a selected prescription for a particular gaze direction, or as a command directing the computing device to perform a selected action. For example, user input can include one or more of:

- eye activity, such as possibly including eye gestures, facial gestures;
- manual activity, such as possibly including manual gestures, touch controls;
- external device activity, such as possibly including external device screens, mobile devices, smartphones, smart watches, or computing devices (such as mice or keyboards, trackpads or computer styluses, or capacitive touch devices);
- other bodily activity, such as voice control, or possibly measurable by a wearable or implantable device;
- or otherwise.

(Eye Gestures)

In one embodiment, eye gestures can include one or more of: blinking one or more times, blinking rapidly with respect to an ordinary blink rate, glancing in a particular direction (such as glancing up/down, right/left, or doing so repeatedly), squinting one or more times, squinting rapidly with respect to an ordinary squint rate, or otherwise. Facial gestures can include movement of the ears (such as wiggling the ears), eyebrows (such as raising or lowering one or more eyebrows), mouth (such as opening or closing the mouth), teeth, tongue (such as touching controls coupled to the teeth), use of the wearer's voice, or other facial features, or otherwise. Eye gestures and other movements can also include deliberately looking at particular objects, such as directing one's eyes at a camera, scope, target, bar code or QR code, menu item or purchasable object, or another identifiable location in the user's field of view or in three-dimensional space that can be given a particular eye gesture meaning.

In one embodiment, one or more eye gestures or movements can be combined. Eye gestures or movements can also be supplemented with one or more other gestures or movements, such as facial or mouth gestures or other movements (as described above), head gestures or other movements, hand/finger gestures or other movements, or other bodily gestures or movements. For example, as described herein, the user can move their face, mouth, or head in defined ways that can be give a particular meaning. The user can also (as otherwise and further described herein) move their hands/fingers or body in gestures or other movements within the user's field of view or in the field of view of a camera, so as to indicate a particular meaning.

("Shade where You Look")

As described herein, this can have the effect that the eyewear 100 is disposed to "shade where the user is looking". When the user adjusts where they are looking, whether by moving their eyes or head, tilting their head or moving their facial direction, squinting, or otherwise altering their field of view (FOV), such as by an external force (such as a centrifugal/centripetal force that pushes or turns the user's body), the eyewear 100 can, notwithstanding that alteration, shade where the user looks.

In one embodiment, the user's eye can look in a selected direction with respect to an object being viewed. In such cases, the eyewear 100 can be disposed to "shade where the user is looking" (as otherwise and further described herein). More specifically, the eyewear 100 can be disposed to determine an object in the direction at which the user is looking and at a distance at which the user is focusing. In response to the selection of the object at which the user is looking, the eyewear 100 can be disposed to shade/inverse-shade that particular object. This can have the effect that when the object is subject to excessive light, the user can see the object more clearly when shaded.

In such cases, the eyewear can be disposed to detect where the user is looking in response to one or more of: a dynamic eye tracking system, or in response to one or more "outbound" cameras disposed to review the user's field of view (FOV) from inside one or more lenses. For example, the dynamic eye tracking system can be disposed to determine in what direction, and at what depth of focus, the user is looking. This can have the effect that the dynamic eye tracking system can determine a location in three-dimensional (3D) space at which the user is looking. For another example, the outbound camera can be disposed to examine the user's FOV from inside one or more of the lenses. Either of these techniques can have the effect that when the user moves their head or otherwise alters their FOV, the eyewear can adjust the 3D location that is shaded. More precisely, the eyewear can adjust a location on each lens so that the joint focus of the user's eyes at that 3D location is shaded.

The dynamic eye tracking system can be disposed to determine in what direction, and at what focal length, the user is looking. This can have the effect that of identifying a particular object, at a particular location in three-dimensional (3D) space at which the user is looking. Similarly, the outward-facing camera can be disposed to examine the user's field of view (FOV) from inside one or more of the lenses.

This can have the effect that the eyewear shades "where the user is looking". When the user adjust the direction they are looking, adjusts the depth of field at which they are looking, tilts their head, squints, otherwise moves due to an external force, the eyewear can shade where the user looks, and if so desired, only where the user looks. For example, if the user might be in a vehicle, such as an aircraft, racecar, or sailboat or speedboat, and the user might be looking at a dashboard or instrument, or user might be looking at an external object. The eyewear can shade where the user is looking, notwithstanding the user's head or eye movement, the vehicle's movement, or other movement that might affect where the user is looking.

Similarly, this can have the effect that the eyewear 100 can be disposed to shade where the user is looking even when the user moves their head or gaze direction, when the user is in a moving vehicle (so that objects change direction relative to the user as the vehicle moves), or when the vehicle changes direction, or due to any other movement that might affect where the user is looking.

When the user moves their head or otherwise alters their field of view (FOV), the eyewear 100 can be disposed to adjust the three-dimensional (3D) location that it shades. More specifically, the eyewear 100 can identify one or more lens pixels associated with that three-dimensional (3D) location, as perceived within the user's FOV on one or more of the lenses, should be shaded so as to shade the particular object at which the user is looking. When the eyewear 100 determines that lens pixels on both lenses should be shaded, the eyewear 100 can be disposed to select one or more lens pixels for each lens (although not necessarily the same lens pixels on each lens), so as to cause the joint focus with respect to the user's eyes to be shaded at that 3D location.

For example, when the user is operating a vehicle, such as an aircraft, racecar, sailboat or speedboat, or another type of vehicle, it might frequently occur that the user directs their gaze to different locations, either inside the vehicle, outside the vehicle, or between inside and outside the vehicle. The user might find themselves changing their direction of view, and thus their field of view (FOV), between two distinct instruments within the vehicle, or between an instrument within the vehicle and an object external to the vehicle (such as another vehicle, an airport or airstrip, a buoy or other marker, or a set of clouds or terrain), or between two objects outside the vehicle (such as between an cloud cover and ground terrain, or such as between a moving vehicle and a stationary object). In such cases, the light environment can be quite different between inside the vehicle and outside the vehicle, and the user might desire a distinct degree of shading for each such light environment.

This can have the effect that the eyewear 100 can be disposed to provide the user with an enhanced degree of perceptual acuity in the direction where the user is looking. When the user changes their gaze direction to look at a different object, the eyewear 100 can be disposed to provide the user with enhanced visual acuity with respect to the object at which the user is newly looking. This can have the effect that the user is provided enhanced visual acuity in all directions (since the user can look in any direction at any time) without having to enhance the user's view in all directions at once.

Inside the Vehicle

The light environment inside the vehicle might be relatively dark (such as when shaded by parts of the vehicle) relatively bright (such as when the sun directly shines on the instruments or control elements), or subject to another effect (such as when the objects the user is looking at are lit by vehicle cabin lights, or otherwise). Thus, the amount of ambient light can be substantially different depending on where the user is looking.

When the user changes their direction of view between two distinct instruments, it might occur that one instrument is shaded, while another instrument is lit by external (or internal) lighting. This can have the effect that the amount of shading desired to optimize the user's view of the instrument depends on the selected instrument and on the relative brightness of the instrument with respect to an amount of light from the ambient environment.

In one embodiment, the eyewear can be disposed with locations of particular instruments or control elements pre-selected. Each individual eyewear can be pre-loaded with locations for instruments or control elements for a particular aircraft or other vehicle, so that it is not necessary for the eyewear to determine which type of aircraft or other vehicle is being flown. This can have the effect that the user can switch between looking at selected instruments or control elements without the eyewear having to determine which instruments or control elements the user is actually looking at or focusing upon. This can have the effect that the user can look at the approximately area where their selected instrument or control element is found, and that the eyewear need not attempt to determine whether the user is actually looking at that selected instrument or control element.

Similarly, it might be useful to inverse-shade when the user is looking at an object within the vehicle, such as an instrument or control element. For example, when the user looks at instrument that is relatively dark in a relatively bright environment, the eyewear 100 can shade regions surrounding (or otherwise near) the object so as to allow the object to appear brighter and more readable with respect to its surroundings.

Inside/Outside the Vehicle

When the user changes their direction of view between a direction internal to the vehicle and a direction external to the vehicle, it might occur that an instrument internal to the vehicle is lit differently (either more/less brightly) than an object external to the vehicle. For just one example, an instrument internal to the vehicle might be relatively shaded, while a set of clouds or terrain might be brightly lit by the sun.

In such cases, the eyewear can be disposed to shade a different amount in response to a relative change in brightness between a first and a second direction in which the user looks. When the user looks from a relatively bright instrument to a relatively dark external scene, the eyewear can reduce an amount of shading, so as to allow the user to see Outside the Vehicle The light environment outside the vehicle can be quite bright with respect to some objects, such as when the sun is reflected from cloud cover, when the objects the user is looking at are brightly lit by the sun or by other vehicle lights, when the user's vision is possibly dazzled by back-lighting from the sun or by other vehicle lights, or by other visual effects. Alternatively, the light environment outside the vehicle can be significantly less bright with respect to other objects, such as when the objects the user is looking at are less brightly lit, are in shade, or are not substantial reflectors (such as certain types of ground terrain).

Accordingly, it might be useful to polarize or shade when the user is looking at bright objects. The eyewear 100 can be disposed to determine whether the user is looking at bright objects in response to both the direction at which the user is looking and the distance at which the user is focusing. For example, a dynamic eye tracking system can be disposed to determine a direction of each of the user's eyes and to determine a focal length in response to a pupil size or a stereoscopic distance. The dynamic eye tracking system can also be disposed to determine when the user moves or tilts their head, or otherwise alters their gaze direction by a bodily movement.

In General

In an environment in which there is a substantial amount of excessive lighting from one or more sources, it can matter (A) whether any particular light source exceeds an amount of ambient light, and if so, by how much; (B) whether the user is looking in the direction of, or focusing on, any particular light source, and if so, how directly; and (C) whether the object the user is looking at is bright or not, has contrast or not, is reflective or not, or other factors that might have an effect on the user's eyesight. In such cases, it can be desirable to adjust an amount of shading in response to lighting conditions and in response to the nature of the object at which the user is looking.

For example, one such environment can be when the user is controlling an aircraft. A pilot's eyes might need to look at instruments within the aircraft, and those instruments might be positioned (A) in shadow, (B) where they reflect sunlight, (C) where they are illuminated by cabin lights, or some combination thereof. A pilot's eyes might alternatively need to look at objects outside the aircraft, and those objects might be positioned (A) in shadow, such as under cloud cover, (B) where they reflect sunlight, such as when the cloud cover itself is brightly lit, (C) where they are backlit by sunlight, such as when transiting the sun or approaching from sunward, or some combination thereof.

Accordingly, it can be desirable to adjust shading in response to whether the user is looking at an object outside the aircraft or whether the user is looking at an instrument inside the aircraft. The eyewear can be disposed to shade in response to (A) a direction at which the user is looking or (B) a distance at which the user is focusing, such as in response to a dynamic eye tracking system, (C) whether the user tilts their head or otherwise gestures in response to a change in attitude concurrent with looking inside or outside the aircraft.

(Manual Activity)

In one embodiment, the eyewear 100 can be disposed to allow the user to set a shading level by manual activity, such as by touching a control element, performing hand or finger gestures, or otherwise manipulating one or more control elements. For example, the eyewear 100 can be disposed to allow a user to set a shading level by one or more of the following:

The user can set a shading level by moving a body part (such as a finger or the back of a hand) on a slider, such as a slider attached to a frame of the eyewear 100. For another example, longer/shorter slides can indicate more/less shading.

The user can set a shading level by tapping a body part (such as a finger or the back of a hand) repeatedly on a touchable element, such as a button or a capacitive sensing element. For example, more/fewer repeated taps can indicate more/less shading.

The user can set a shading level by gesturing with a body part (such as a finger, the back or palm of a hand) near a touchable element, such as an outward-facing camera, a capacitive sensor, or an element having an electromagnetic field. For example, waving a hand more/fewer times can indicate more/less shading. In such cases, the user can indicate an end to the count of more/fewer waves using a secondary gesture, such as a closed fist, a movement in another direction, or otherwise.

In such cases, the eyewear 100 can be responsive to user gestures either inside the user's field of view (FOV), such as (A) in response to an outward facing camera in the user's FOV or in response to a dynamic eye tracking mechanism; or such as (B) in response to an outward facing camera outside the user's FOV.

For another example, manual activity can include hand gestures (possibly aided by a glove or other sensor), hand gestures conducted within the wearer's field of view (FOV), other bodily movement within the wearer's FOV (such as movement by the wearer's wrist, arm, elbow, leg, knee, or otherwise). Manual activity can include touch controls 151 (such as on the eyewear 100 or on an external device). In such cases, the touch controls 151 can include one or more buttons, sliders, switches, or capacitive sensors, and can be mounted on or near the eyewear frame 111. Alternatively, touch controls 151 can be mounted on an external device, such as an external screen, a mobile device, a smartphone, a smart watch, another wearable, a control panel for another device (such as a computing device or a vehicle), or otherwise.

In such cases, when a touch control 151 is mounted on a vehicle, it can be disposed on a steering wheel for a racing car, a tiller for a sailboat, a control yoke for a speedboat, a control stick for an aircraft, a set of ski poles when skiing or a set of buttons when snowboarding, a controller for a gaming system, or otherwise. The eyewear 100 can be disposed to allow the wearer to use a touch control or other control disposed on the steering wheel, control yoke, control stick, ski poles, snowboard buttons, gaming system controller, or otherwise. The eyewear 100 can also be disposed to allow the wearer to use an eye gesture, hand gesture, or other gesture, to control the eyewear 100 itself, such as for shading/inverse-shading, or to control the vehicle or gaming system, such as to increase or decrease speed, alter direction, or control other functions thereof. The eyewear 100 can also be disposed to use one or more artificial intelligence (AI) or machine learning (ML) techniques to identify circumstances when shading/inverse-shading is desirable for the wearer, or when the wearer is subject to a medical condition or other debilitating circumstance, such as "dry eyes", migraine/photophobia or related conditions, epilepsy or seizures, or otherwise.

(Medical Conditions)

For another example, a wearable or implantable device can be disposed to measure a bodily function, such as heart rate, movement, walking distance, or otherwise. In such cases, the wearable or implantable device can use the measure of the bodily function to provide feedback to the eyewear 100. Feedback to the eyewear 100 can indicate that the wearer is in medical distress or is otherwise subject to a medical condition, including whether the wearer is subject to a cardiac or stroke event, whether the wearer is subject to excessive stress, whether the wearer is subject to a migraine, whether the wearer is subject to a seizure, or otherwise. In such cases, the eyewear 100 can use the communication device 122 to alert emergency responders, medical personnel, search and rescue personnel, or volunteers who are nearby and able to help. Moreover, the eyewear 100 can be disposed to respond to medical conditions such as stress, migraine, or otherwise, by adjusting the wearer's prescription to assist in treatment of eyestrain, headache or migraine, "dry eye" conditions, or otherwise.

(Voice Commands)

For another example, the eyewear 100 can be disposed to respond to the wearer's voice commands, such as by using one or more artificial intelligence (AI) or machine learning (ML) techniques to recognize voice commands, parse those commands, and perform the actions requested by the wearer. In such cases, the eyewear 100 can be disposed to respond to a wakeup word, so as to only respond to voice commands when the wearer deliberately intends the eyewear 100 to respond, and not to respond to voice commands when the wearer is merely talking to another person (or themselves).
(Gaze Direction)

In one embodiment, an example eyewear 100 can be responsive to the wearer's gaze direction, so as to illuminate a location, an object, or a person, at which the wearer is looking. For example, the eyewear 100 can include sensors 123 including a gaze detector (not shown), disposed to determine a direction at which the wearer is directing their gaze, and a pupillometer (not shown), disposed to determine a size of the pupil and accordingly a focal length.

In one embodiment, the gaze detector can be coupled to a lamp (not shown), disposed to illuminate in an outward direction at a region of the wearer's field of view where the wearer is looking. For example, when the wearer moves their gaze across their field of view, the lamp can move an illumination effect with the wearer's gaze direction. This can have the effect that the wearer's field of view is illuminated where the wearer is looking, without the wearer having to move their hand (when holding a lamp) or their head (when wearing a lamp) to point the lamp toward an object of interest.

Moreover, the lamp can be disposed to present its illumination effect in only the portion of the wearer's field of view at which the wearer's gaze is directed, such as to illuminate the location, object, or person, of interest to the wearer, without having to illuminate a larger region that includes the region of interest to the wearer.

In one embodiment, the pupillometer, or another focal length detector, can be disposed to determine a distance at which the wearer is looking. This can have the effect that the eyewear 100 can determine a specific location, object, or person, of interest to the wearer, rather than a solid angle within the wearer's field of view. For example, when a specific object of interest to the wearer is nearby, the lamp can be disposed to focus on that nearby object. This can have the effect that that only that nearby object would be illuminated, not objects about which the wearer is not interested.

In one embodiment, the illumination effect can be disposed (A) to enhance context sensitivity when viewing the object of interest, such as when the object has better contrast with respect to its background; (B) to enhance visual acuity when viewing the object of interest, such as when the object is subject to less visual blur or noise, motion blur, peripheral blur, or other effects that debilitate visual acuity; (C) to enhance visibility of a feature of the object, such as an edge thereof, a face thereof, writing on the object, or otherwise.

In one embodiment, the illumination from the lamp can be polarized. This can have the effect that the illuminated object does not present glare to the wearer, even when the object is highly reflective or otherwise shiny. In another embodiment, the illumination from the lamp can be a blinking light or a strobe light. This can have the effect that the wearer can view the object of interest without debilitating their night vision, or while identifying the object to another viewer.

In one embodiment, the illumination from the lamp can include a color effect, such as having a color distinct from the object or its background. For example, the illumination can emphasize the object by altering its color with respect to its background, or by altering the color of the background in the region of the object. For another example, the illumination can emphasize the object by altering the contrast of its color with respect to its background, or by altering the color contrast of the portion of the background in the region of the object.

In one embodiment, the illumination from the lamp can include an augmented reality or virtual reality effect, such as a heads-up display (HUD) in which the object of interest is highlighted, or such as a virtual reality pointer directed at the object of interest.

In one embodiment, the lamp can be directed at the wearer's eye, such as at the wearer's pupil or retina. This can have the effect of adjusting the wearer's pupil or retina, such as to cause the wearer to see the object of interest more brightly or darkened. For example, the lamp can be directed at the wearer's pupil, such as to cause the pupil to contract and the object to be darkened. This can have the effect of emphasizing the object when otherwise presented against a brightly lit background. For another example, the lamp can be directed at another portion of the wearer's eye, such as to cause the pupil to expand and the object to be brightened.

In one embodiment, the lamp can be directed at the wearer's eye, such as at the wearer's pupil or retina, with the purpose of activating a particular mode of the wearer's vision. For example, the wearer's vision can be activated in a mesopic, photopic, or scotopic mode. In another embodiment, the lamp can be directed at the wearer's eye, such as at the wearer's pupil or retina, with the purpose of adjusting the size of the wearer's pupil (A) to ameliorate visual aberration, such as when visual aberration occurs after LASIK surgery or other eye surgery, or (B) to promote night adaptation of the wearer's vision, such as by adjusting the wearer's pupil to become narrower even when the wearer enters a darkened region.

User feedback can also include combinations of multiple user inputs, such as multiple eye gestures, multiple manual inputs, multiple external device inputs, combinations of different types of user inputs, or otherwise. For example, combinations of eye gestures can include activity such as "blink twice and glance left".
Action by Eyewear In one embodiment, an example eyewear 100 can be disposed to correct vision or enhance vision on behalf of the wearer. The eyewear 100 can be disposed to alter refraction, polarization/shading, color, prismatic angles/functions, or otherwise.

For example, the eyewear 100 can be disposed to correct or enhance the wearer's vision by altering the amount of refraction (such as an optometry prescription) in response to factors described herein. The eyewear 100 can be disposed to alter the amount of refraction in response to whether the wearer's gaze direction or focal length, or whether the wearer's field of view (FOV) includes a recognized object, with a particular distance. In such cases, the eyewear 100 can be disposed to alter the amount of refraction to correct or enhance the wearer's vision to optimize the wearer's ability to clearly see at the particular distance or to clearly see the recognized object.

As further described herein with respect to predictive techniques, such as artificial intelligence (AI) or machine learning (ML) techniques, the eyewear 100 can be disposed to alter the amount of refraction in response to a predicted distance at which the wearer is most likely to be focusing when their gaze direction intersects a particular lens region 131 or lens pixel 141 of the lenses 112. Having learned the wearer's behavior, the eyewear 100 can be disposed to select the amount of refraction statically, thus, without regard to the nature of the objects or scene in the wearer's field of view (FOV). Alternatively, having learned the wearer's behavior, the eyewear 100 can be disposed to select the amount of refraction dynamically in response to a focus distance determined with respect to the wearer, such as by measurement of the wearer's pupil or iris size, contraction, or widening.

For another example, the eyewear 100 can be disposed to correct or enhance the wearer's vision by altering the amount of polarization/shading of light entering the wearer's eyes through the lenses 112. In such cases, the eyewear 100 can alter the amount of polarization/shading in a particular gaze direction to alleviate glare, can alter the amount of polarization/shading in a particular vision region to alleviate excess luminance or UV light, or otherwise. When the wearer changes their gaze direction or focal length so as to view an object with a different amount of brightness, the eyewear 100 can alter the amount of polarization/shading in response thereto, so as to match the amount of polarization/shading to the brightness of the object being viewed by the wearer. When the wearer exhibits features associated with medical conditions or other conditions, such as in response to blink rate, pupil or iris size, squinting, redness or showing blood vessels on the sclera, inadequate tear films or tear film breakup time, other eye features (or significant changes therein), or otherwise, the eyewear 100 can respond to those conditions by altering the amount of polarization/shading of light entering the wearer's eyes through the lenses 112. Similarly, the eyewear can adjust infalling light so as to induce photopic, mesopic, or scotopic activity of the eye's rods and cones.

For another example, in addition to, or in lieu of, responding to the wearer's eye activity, the eyewear 100 can be disposed to alter the amount of polarization/shading of light entering the wearer's eyes in response to a prediction of an amount of infalling light likely to enter the wearer's eyes. In such cases, the eyewear 100 can determine its prediction in response to one or more artificial intelligence (AI) or machine learning (ML) techniques, possibly in response to a direction the wearer is facing, a location the wearer is positioned, a time of day, a season of the year, a measure of ambient lighting or detection of a number of ambient artificial lights, or otherwise. When performing shading, the eyewear 100 can electronically control the lenses 112, such as particular lens regions 131 or lens pixels 141.

For another example, the eyewear 100 can be disposed to correct or enhance the wearer's vision by altering the amount of color filtering, color injection, false coloring, or color changes. In such cases, when the eyewear 100 determines that the amount of infalling ambient light is excessive, or is excessive for a particular color or in a particular frequency range, or is unbalanced with respect to color, the eyewear 100 can adjust the amount of filtering for that color or frequency range to limit the amount of infalling light to a reasonable amount. In such cases, the eyewear 100 can reduce an amount of blue just before sleep. Similarly, the eyewear 100 can also detect infalling ultraviolet (UV) light, absorb that UV, and inject a false color in lieu thereof, using one or more electromagnetic or photochromatic techniques. In such cases, the eyewear 100 can alter the color balance of infalling light so as to allow artists, such as graphic designers or web developers, to generate color schema that are accurate when viewed in their intended environment.

When the eyewear 100 determines that the amount of infalling light is inadequate for a particular color, or in the case of migraines, attempts to treat the migraine effect by injecting some amount of that color (such as green), the eyewear 100 can adjust the amount of filtering, or can directly inject that color into the wearer's field of view (FOV), such as by using color LEDs to directly inject selected colors. For example, red LEDs can be used to inject red pixels, green LEDs can be used to inject green pixels, blue LEDs can be used to inject blue pixels, or white LEDs can be used to inject white pixels. When the amount of infalling light is inadequate for the wearer to clearly see color (such as when the wearer's rods are activated but their cones are not), the eyewear 100 can provide a false-coloring of the FOV to show features of interest to the wearer, such as when the eyewear 100 is operated using or in lieu of "night vision" goggles that detect infrared (IR), or when false coloring is used with object recognition, or otherwise. Similarly, the eyewear 100 can alter the color balance of infalling light to prompt the wearer's eye to operate in a photopic, mesopic, or scotopic mode.

When the eyewear 100 determines that the wearer is subject to an inadequate blink rate, or an excessive blink rate, the eyewear 100 can adjust the amount of color at selected frequencies injected into the wearer's field of view (FOV). For example, color injection can be used to control an amount of melatonin produced by the brain. Blue light decreases an amount of melatonin produced by the brain, which is why blue light can interfere with sleep. Melatonin causes the eye to decrease blink rate, so an excessive blink rate can be controlled by color injection, at least in part. For another example, color injection can be used to control an amount of dopamine produced by the brain. Blue light increases an amount of dopamine produced by the brain. Dopamine causes the eye to increase blink rate, so an inadequate blink rate can be controlled by color injection, at least in part.

For another example, the eyewear 100 can be disposed to correct or enhance the wearer's vision by altering the amount of prismatic angle imposed by the lenses 112. In such cases, when the wearer's activity indicates that the wearer intends to look down, such as at a keyboard or smartphone, the eyewear 100 can be disposed to alter the amount of prismatic angle imposed by the lenses 112 so as to allow the wearer to see the keyboard or smartphone without any unnecessary head movement. Similarly, when the wearer's activity indicates that the wearer intends to look up, such as at a screen, presentation, window, or distant object, the eyewear 100 can be disposed to alter the amount of prismatic angle imposed by the lenses 112 so as to allow the wearer to see that object without any unnecessary head movement.

Active Color Change by Eyewear—Frame

For another example, the eyewear 100 can be disposed to change a color of its frame, such as from a relatively clear color to a relatively opaque color, or the reverse, or from a relatively cool color (blue) to a relatively warm color (red or orange), or the reverse. For example, the color change can be responsive to a wearer condition; to a color determined in response to an electromagnetic signal, such as a signal from the computing device 121 or from a wearer input; to a color determined in response to an environmental condition; or otherwise.

For another example, the eyewear 100 can be disposed to change a color texture of its frame, thus from a relatively solid color to a non-solid color scheme. In such cases, the non-solid color scheme can include a spotted or striped color scheme including more than one color (or including one color with differing amounts of grey or saturation), an leopard-print or other animal-like scheme, another pattern (whether recognizable as a natural pattern or otherwise), a modern art pattern, a picture or moving picture mapped onto at least a portion of the frame, or another pattern to the liking of the user.

For another example, the eyewear 100 can be disposed to change the color texture of its frame in response to time, such as a color texture that cycles through multiple patterns. In such cases, the color texture can cycle through multiple patterns in a rotating order, in a random or pseudorandom order, in an order responsive to a personal condition of the user (such as a medical condition, an emotional state, or another condition responsive to a user status), an ambient condition (such as an environmental condition, an attempt to match other objects, or another condition external to the user.

For another example, the eyewear 100 can be disposed to change the color texture of its frame in response to an input message, such as a user command, an electromagnetic message from another device, or another message received from outside the eyewear. In such cases, the eyewear 100 can receive and decode the message (which might be encrypted and have to be decrypted), determine a color texture or sequence of color textures to provide, and alter its color texture or sequence of color textures in response thereto.

Color Textures

In addition to color change, the eyewear can be disposed to provide a color texture, which can include a combination of multiple colors. The combination of multiple colors can include a distinct color in each one of a plurality of regions, whether those regions cover the whole of the eyewear frame or the contact lens, or otherwise. Alternatively, the combination of multiple colors can include a distinct color in each one of a plurality of individual pixels, whether those pixels cover the whole of the eyewear frame or the contact lens. When pixels are used, each individual pixel might be individually substantially similar to its neighbors, but the whole of the eyewear frame or the contact lens can exhibit substantial color variation.

For example, a color texture can include a color gradient, such as a gradient between a blue color and a red color; a color pattern, such as a set of orange polka-dots on a purple background, or a faux-snakeskin or other imitative pattern; a picture, such as a corporate logo or a religious symbol; or another combination in which more than one color is disposed on the eyewear frame or on a contact lens. In such cases, the color texture can be selected so as to present an image of a three-dimensional (3D) object, such as by presenting a different color texture to viewers in response to an angle at which the color texture is viewed.

In one embodiment, the color texture can be disposed over a flat portion of an eyewear earpiece, thus, to the sides of the user's head; over a non-pupillary portion of a contact lens, thus, to the sides of the user's pupil; or otherwise in a location where the color texture does not disturb the user's vision. Alternatively, the color texture can be disposed over a pupillary portion of a contact lens, so as to affect the color balance of the user's vision, as otherwise and further described herein.

Color Variation

The color change or color texture can also be disposed to itself vary in response to one or more factors: a passage of time, a random element, a change in a parameter with respect to the user, or another measurable feature that can be expressed as a color variation. A processor can be disposed to receive information with respect to one or more such measurable features, to determine a new color change or color texture in response thereto, and to direct the eyewear to adopt a new color change or color texture in response thereto.

For example, the processor can, in response to a measure of time, vary the color change or color texture from a starting point to an ending point and back, or from a starting point in a loop back to the same starting point, or otherwise in a selected time-varying pattern, such as a color texture that cycles from a first to a second color and back to the first color, or a color texture that cycles through a selected color wheel. Similarly, the processor can vary the color change or color texture in response to a random element, in response to one or more objects in the user's field of view, in response to one or more user parameters, such as the user's skin temperature or the eyewear's prediction of whether the user is about to be affected by a migraine.

For another example, the processor can be disposed to present a color texture including a moving picture, such as a picture displaying a movie of the user's children or pets. In such cases, the moving picture can be presented on the side of the eyewear frame, on the iris portion of a contact lens, where the user can see the moving picture, or where persons other than the user can see the moving picture.

(Medical Condition)

For example, the wearer condition can include one or more of: a medical condition, such as the wearer suffering from a dry eye condition, a migraine/photophobia or a neurological condition in response thereto, or otherwise. In such cases, the wearer condition can be determined in response to a computing device processing outputs from sensors coupled to the wearer, from an input from the wearer, or otherwise.

In one embodiment, when the wearer is undergoing a medical condition for which the wearer needs assistance, medical or otherwise, the eyewear 100 can be disposed to change color to alert the wearer, and nearby persons, about the medical condition. For example, when the wearer is undergoing a coronary attack or a stroke, it can be desirable to alert emergency responders and medical personnel, and it can be desirable for volunteers to assist the wearer in being transported to an ambulance or hospital with haste. In such cases, the eyewear 100 can change color to alert the wearer and nearby persons to do so.

In such cases, the eyewear 100 can emit an electromagnetic signal, thus changing "color" to a frequency outside normal human vision. The electromagnetic signal can include a coded message which can be received by another device, such as another set of eyewear 100, a smartphone or other mobile device, or another type of device, which can be disposed to receive the electromagnetic signal and send a message to alert emergency responders and medical personnel that the wearer needs assistance and is in transit to an ambulance or hospital.

(Wearer Emotional State)

In one embodiment, the eyewear 100 can change color to indicate the wearer's emotional state or mood, such as when the wearer is (A) excessively tired, (B) under the influence of alcohol or other substances, (C) subject to a diabetic complication or other issue, (D) an unexpected lack of energy, or an emotional state or mood otherwise indicating that the wearer needs assistance or should not be operating heavy machinery. In such cases, the wearer or nearby persons can take appropriate action to assist the wearer, such as by calling for a taxi or otherwise bringing them home.

(Ambient Condition)

For example, the wearer's field of view (FOV) can include one or more of: an amount of luminance (whether excessive or inadequate), an amount of glare, an amount of sensory noise or cognitive stimulation (whether excessive or inadequate), or otherwise. In such cases, the effect of the wearer's FOV can be determined in response to one or more of: a computing device processing inputs from the wearer's field of view FOV, a computing device processing the wearer's response to the wearer's FOV, an input from the wearer with respect to the wearer's FOV, or otherwise.
(Matching Other Objects)

For example, the eyewear 100 can be disposed to make itself brighter or dimmer in response to the ambient environment. This can have the effect that the eyewear 100 can adjust its color with respect to the ambient environment, either by reducing/increasing its contrast with the ambient environment to become less/more prominent. Similarly, the eyewear 100 can be disposed to make itself less/more prominent with respect to an external device, such as (A) the wearer's clothing or accessories, or (B) another person's eyewear, clothing or accessories.

This can have the effect that multiple persons can intentionally match the colors of their eyewear 100, so as to easily identify members of a group, such as a tour group. In such cases, the eyewear 100 can communicate with other eyewear so as to determine whether all members of the tour group are present, or whether some statistical measure, such as whether members of the tour group are within a localized area. Similarly, one or more eyewear 100 can change color in a time-varying manner, such as by cycling among two or more different colors, such as (A) to improve the visibility of the eyewear, (B) to send a coded message to an electronic device, or otherwise.

For another example, the eyewear 100 can be disposed to change color in response to an external signal, such as an electromagnetic signal from another eyewear, a smartphone or other mobile device, or another type of device.
(Environmental Condition)

For example, the environmental condition can include one or more of: a weather condition, an amount or severity of allergens or pollutants; or another environmental condition (such as a presence of smoke inhalation or soot, a presence of absorbable/inhalable hazards, a presence of hazardous biological/chemical substances, a presence of an ambient drug hazard, a presence of a pathogen, or otherwise). In such cases, the environmental condition can be determined in response to a computing device processing inputs from the wearer's field of view (FOV), a computing device processing the wearer's response to the wearer's FOV, an input from the wearer with respect to the wearer's FOV, or otherwise. In such cases, the weather condition (or the amount or severity of allergens or pollutants) can be determined in response to a sensor disposed to detect those conditions, in response to a GPS or other location device disposed to identify the wearer's location and obtain a report of those conditions for that location, an input from the wearer with respect to those conditions, or otherwise.

For example, the environmental condition can include one or more of: a wearer's field of view (FOV), a weather condition, an amount or severity of allergens or pollutants; or another environmental condition. In such cases, the environmental condition can be determined in response to a computing device processing inputs from the wearer's FOV, a computing device processing the wearer's response to the wearer's FOV, an input from the wearer with respect to the wearer's FOV, or otherwise. In such cases, the weather condition (or the amount or severity of allergens or pollutants) can be determined in response to a sensor disposed to detect those conditions, in response to a GPS or other location device disposed to identify the wearer's location and obtain a report of those conditions for that location, an input from the wearer with respect to those conditions, or otherwise.

For example, the frame 111 can be coated with an LCD material, an LED material, an OLED material, a PLED (polarized LED) material, a phosphorescent material, or a related material responsive to an electromagnetic signal or an electronic signal, in response to an environmental factor such as temperature or pollutants, or otherwise. The electromagnetic signal or electronic signal can be received from the computing device, from a wearer condition sensor, from an environmental sensor (including a sensor disposed to detect a color balance or other condition of a scene, an object or person identified in the scene, or otherwise), from a wearer input sensor, or otherwise.

For example, the eyewear 100 can be disposed to have the new frame color set at the time of sale; this can have the effect that a smaller number of stock keeping units (SKUs) can be maintained by a seller while maintaining a degree of flexibility for sales. For another example, the eyewear 100 can be disposed to have the new frame color set at a time when the eyewear is lent or issued to the wearer, such as when 3D glasses are provided to the wearer at a show; in such cases, it can be advantageous for clerks issuing eyewear to wearers to be able to easily identify which eyewear is associated with which wearer's tickets to see the show. Similarly, in such cases, it can be advantageous for clerks issuing eyewear to wearers to be able to easily set parameters for the eyewear, while concurrently setting the color of the eyewear to identify that the eyewear has been set with those parameters.

For another example, when a display is disposed so as to allow viewers with different eyewear 100 to view different presentations, it can be convenient for clerks to present eyewear to viewers that have external colors associated with the presentation the viewer will see. This can have the effect that clerks can easily determine whether eyewear 100 for an adult presentation is being worn by a child, or whether the eyewear is otherwise improperly associated with the viewer.

For another example, the eyewear 100 can be disposed to change its frame color in response to the wearer's control, in response to an amount or color balance of ambient light (such as sunlight, indoor light, an amount of UV light, or otherwise), in response to a time of day or day of the week, in response to a change in the wearer's appearance, in response to the wearer's emotional affect or mood, or otherwise. In such cases, when the wearer desires to use the eyewear 100 in a particular context, the wearer can adjust the eyewear so as to match the context, such as by making the eyewear lighter when the wearer desires to emphasize their eyes and darker when the wearer desires the opposite.

For example, the wearer's emotional affect or mood can be determined in response to the wearer's body temperature or skin temperature, in response to the wearer's pupil size or eye motions (or frequency thereof), in response to the wearer's heart rate or blood pressure (or stability thereof), in response to the wearer's galvanic skin response, in response to other medical conditions, in response to one or more inputs from the wearer, or otherwise.

For example, the wearer's appearance can be determined in response to the wearer's hair color (such as when it is dyed or gelled or otherwise styled, bleached by sunlight or stage-lit or otherwise altered, or subject to different lighting conditions, or otherwise); in response to the wearer's eye color or skin color; in response to a color of the wearer's outfit (such as clothing or jewelry); in response to whether the wearer is wearing cosplay/costuming or face paint, makeup or broadcast makeup, or suntan lotion; or otherwise.

In one embodiment, the eyewear can be disposed to provide an active color change in response to one or more factors, so as to signal to observers that the wearer has a particular condition, such as a medical condition, a wearer activity, or a wearer focus on a particular portion of their field of view. For example, a glasses frame can be disposed to change color without interfering with the wearer's field of view (FOV), while communicating to the wearer or to others a wearer's emotional affect or mood, medical condition, or to match an environment in which the wearer is participating. For example, the glasses frame can match the wearer's hair color or eye color (even if one or more of those has been altered to match a social occasion), to match the wearer's outfit, or to match ambient lighting.

In one embodiment, the eyewear can be disposed to provide an active color change when disposed in one or more distinct form factors: a glasses frame; a facemask or helmet; a heads-up display (HUD), a window screen, a vehicle window or windshield, or otherwise. For example, the glasses frame, facemask, or helmet, can be disposed to change color without interfering with the wearer's field of vision (FOV). For another example, the facemask or helmet, HUD, window screen, or vehicle window or windshield, can be disposed to change color so as to alter the wearer's FOV, such as to alter the color balance of ambient light.

Active Color Change by Eyewear—Lens

For another example, the eyewear 100 can be disposed to change a color of its lens, thus altering an external view of the lens and of the user's eye in response to the change in color. In such cases, the lens can include an e-chromatic material, defined herein as a material that can change color responsive to an electromagnetic signal. In such cases, the lens can change color in response to one or more of:
  a user input;
  a medical condition of the user;
  a medical condition observed by the user, such as a medical condition of a person within the user's field of view;
  an emotional state of the user;
  an emotional state observed by the user, such as an emotional state of a person within the user's field of view;
  an ambient condition, such as an effect within the user's field of view, a local weather condition, pollution measure, pollen count, or another ambient condition capable of affecting the user, prompting a migraine, or prompting another medical condition with respect to the user or a person within the user's field of view;
  an object recognized within the user's field of view, such as described herein;
  or otherwise as described herein with respect to color change of the eyewear frame.

Similar to the eyewear frame, the eyewear 100 can be disposed to change a color texture of its lens, thus altering an external view of the lens to other than a solid color. The color texture of the lens can be disposed in one or more color textures, such as those described with respect to color texture of the frame. The color texture of the lens can also be disposed to change with respect to time, such as described with respect to color texture of the frame.

In one embodiment, the color (and color texture) of the lens can be disposed so that the color (and color texture) of the portion of the lens disposed before the pupil differs from that disposed before the iris. For example, the user might desire to show blue irises, but not to alter their field of view (FOV) to show their entire FOV in blue. Accordingly, the color (and color texture) of the lens can be disposed in a first portion before the pupil and a second portion before the iris. This can have the effect that the pupil looks naturally black, while the iris can have its color (or color texture) altered.

For example, the color (and color texture) of the first portion of the lens, before the pupil, can be generally disposed to be clear. In some cases, it might be appropriate to dispose the first portion of the lens to have a color (or color texture) to adjust the color balance of the user's field of view (FOV). In one case, it might be desirable to adjust the color balance of the user's FOV to increase the proportion of green or decrease the proportion of blue available for view by the user. In one case, it might be desirable to adjust the shading/inverse-shading of the user's FOV; explicit shading/inverse-shading can be limited to the pupil.

In such cases, the first portion of the lens, whether clear or color-balance adjusted, can be restricted to the user's pupil. When the user's pupil changes in size, such as in response to changes in ambient brightness, the first portion of the lens can be adjusted in response to changes in the size of the pupil, so as to maintain the first portion of the lens to cover substantially only the pupil and no substantial portion of the iris.

In one embodiment, when the eyewear is disposed to adjust the color or color texture of the portion of the lens before the pupil, the eyewear can be disposed to adjust that color or color texture during a time period while the user blinks. As described herein, a blink takes a finite amount of time, so the eyewear can adjust the color or color texture of the portion of the lens before the pupil while the user is blinking (and the pupil is covered by the eyelid). This can have the effect that the user sees a different amount of color or color texture before the blink and after the blink. The eye integrates the amount of color or color texture into its received image. This can have the effect that the user does not notice the change when the eyewear adjusts the color or color texture.

For example, the color (and color texture) of the second portion of the lens, before the iris, can be generally disposed to have a color that alters others' view of the user's iris. In such cases, the use's iris might be naturally brown, but the user might desire to have their iris appear blue. The second portion of the lens can be disposed to show the iris as blue.

In such cases, the second portion of the lens, regardless of color or color texture, can be restricted to the user's iris. When the user's pupil changes in size, such as in response to changes in ambient brightness, the second portion of the lens can be adjusted in response to changes in the size of the pupil, so as to maintain the second portion of the lens to cover substantially the iris and no substantial portion of the pupil.

Similar to frame color, the eyewear 100 can be disposed to include one or more contact lenses 300, one or more of which can be disposed to change color, such as described with respect to the frame 111. The eyewear 100 can also be disposed to include photochromatic lenses 112, which can be disposed to change color, as described with respect to the frame 111. The lenses 112 can also be disposed to change color in response to a gaze direction or focal length, so as to not to impose an artificial color on the wearer's view through the pupil. The lenses 112 can also be disposed with a color that is adjustable in response to the wearer's iris color, so as to combine the iris color with the lenses' color to form a selected color.

For another example, the eyewear 100 can be disposed to change color or shading in response to a gaze direction or size of the wearer's pupil, so as to not to interfere with the wearer's vision. In such cases, when the wearer's pupil increases/decreases in size, the eyewear 100 can alter the portions in which it provides color or shading so as to avoid obscuring the width of the wearer's pupil. Similarly, when the wearer's pupil moves to change gaze direction, the eyewear 100 can alter the portions in which it provides color or shading so as to avoid obscuring the direction of the wearer's pupil.

For another example, the eyewear 100 can be disposed to deliberately alter the color balance of the wearer's field of view (FOV), so as to alter the color balance seen by the wearer. In such cases, the eyewear 100 can alter the color it provides in the region (or for the set of pixels) associated with the wearer's pupil, so as to alter the color balance of the wearer's FOV when the eyewear includes a lens 112 disposed in a glasses frame, a facemask, or helmet; when the eyewear includes contact lenses, an intra-ocular lens or other implantable device; or otherwise.

For another example, the eyewear 100 can be disposed to deliberately alter an amount of shading or inverse-shading of the wearer's field of view (FOV), so as to alter an amount of luminance of light infalling to the wearer's pupil or onto the wearer's retina. In such cases, the eyewear 100 can alter the amount of shading/inverse-shading it provides in the region (or for the set of pixels) associated with the wearer's pupil, so as to alter the amount of luminance or light contrast with respect to the wearer's FOV. Similarly, the eyewear 100 can alter the amount of shading/inverse-shading it provides so as to assure that the wearer obtains sufficient contrast between objects that the wearer can identify those objects even in relatively dim lighting (such as at night) or excessively bright lighting (such as in bright ambient light, when the object is brightly backlit, or when the object is subject to glare).

Visual Acuity

In one embodiment, the eyewear can include a first camera disposed to capture the field of view available to the user using the eyewear and a second camera disposed to capture the same field of view available to the user, only without using the eyewear. The eyewear can determine a comparison between (A) a first view available to the user using the eyewear, such as available using the first camera, and (B) a second view available to the user without using the eyewear, such as available using the second camera. In response to the comparison, the eyewear can determine a measurement of visual acuity available to the user.

The first camera can be disposed to view through a lens of the eyewear; the second camera can be disposed to view outside any lens of the eyewear. The eyewear can determine the measure of visual acuity both in response to the difference between information from the first camera and information from the second camera, and in response to an examination of a digital image from one or more of the two cameras. For example, if there is no difference between the images from the two cameras, it might still occur that the eyewear can improve the user's visual acuity by altering a visual effect on the user's field of view, such as using one or more lenses to alter that visual effect. In such cases, the eyewear can adjust one or more lenses so as to adjust that visual effect.

The eyewear can also include a sensor disposed to determine the user's best currently available visual acuity, thus, whether that is using the eyewear's lenses or not. The sensor can identify one or more pixels in an image from the user's field of view and determine whether like pixels present like images to the user. If not, the eyewear can determine that the user's visual acuity could be improved, similar to the concept of autofocus. However, while autofocus generally measures a distance to a target and alters a focal length of a camera to match that distance, the method and system described herein is not that.

In response to the measure of visual acuity, the eyewear can adjust one or more parameters, such as color balance, polarization, shading, or other parameters affecting the user's field of view. For example, the eyewear can adjust shading of the object being looked at or focused upon by the user. After adjusting the one or more parameters, the eyewear can re-measure the user's visual acuity, so as to determine whether the user's visual acuity has been improved by the adjustment of the one or more parameters. The eyewear can, in response to whether the user's visual acuity has been improved, reverse the adjustment, extend the adjustment, try an adjustment of one or more different parameters, try a combination of two or more adjustments, or otherwise attempt to improve the user's visual acuity.

For example, if the user's view of a selected object is relatively washed out, such as due to excessive brightness or glare, the eyewear can determine that the user's visual acuity is inadequate due to that excessive brightness or glare. In such cases, the eyewear can determine that it should shade those regions of the user's field of view that are subject to the excessive brightness or glare. Once the eyewear has done so, the user's visual acuity should be sufficiently improved that the eyewear can wait until conditions change.

Similarly, the eyewear can adjust the amount of shading so as to prompt the user's eye to operate in a mesopic range. This can have the effect that the eyewear can optimize the user's view so as to operate with a best degree of black-and-white vision and color vision. When the amount of brightness in the ambient environment is too little for mesopic vision, the eyewear can brighten the image available to the user, so as to allow the user's eye to see using both black-and-white vision and color vision. When the amount of brightness in the ambient environment is too much for mesopic vision, the eyewear can shade the image available to the user, so as to allow the user's eye to see using mesopic vision.

In response to the re-measurement of the user's visual acuity, the eyewear can determine whether the user's visual acuity has reached a satisfactory measure, thus, whether the eyewear has successfully improved the user's visual acuity to a satisfactory degree. If not, the eyewear can continue to adjust the one or more parameters, or combinations or conjunctions thereof, so as to reach a satisfactory measure of user visual acuity.

The eyewear can periodically, or otherwise in response to changing conditions, re-measure the user's visual acuity, so as to obtain a degree of visual acuity that is continually satisfactory. For example, whenever the user changes the direction in which they are looking or the distance at which they are focusing, the eyewear might determine that it should re-adjust the one or more parameters. This can have the effect that the user's visual acuity can be maintained substantially constantly satisfactory.

Possible Use Cases

In one embodiment, the eyewear 100 can be disposed to perform shading using the lenses 112 by one or more of: (A) darkening one or more lens regions 131 or lens pixels 141 through which the wearer is viewing a light source; (B) urging the wearer's pupil or iris to contract, such as by injecting light into the pupil, by triggering an electronic signal to prompt the iris muscle to contract, by inducing a puff of air to prompt the iris muscle to contract, or otherwise; (C) or by darkening one or more concentric rings of lens regions 131 or lens pixels 141, with the effect that the wearer's pupil is artificially restricted in width, thus effectively contracted; or otherwise. This can have the effect that the wearer receives less infalling light on their retina, thus darkening their view.

In one embodiment, the eyewear 100 can be disposed to perform shading in response to detecting epilepsy or seizure, measuring a rate of oscillation with respect to a seizure event, and fully shading away all infalling light in synchrony with the seizure event, so as to effectively remove any further trigger of the seizure event. This can have the effect that a seizure event can be treated, at least in part.

Similarly, the eyewear 100 can be disposed to combine restriction of light injected into the pupil or iris, so as to focus infalling light on the center of the retina (the macula), with a disc or ring of light being allowed to flow through to the retina's rods. This can have the effect that the wearer's night vision can be improved, as the wearer's rods would be activated, while also allowing the wearer's color vision to be used, as the wearer's cones would be activated. This can also have the effect of providing a treatment for Parkinson's disease, at least in part. Allowing color into the eye can also have the effect of providing a treatment for autism or dementia, at least in part.

In one embodiment, the eyewear 100 can be disposed to specifically urge the wearer's pupil or iris to contract by either (A) urging the wearer's pupil or iris muscle to contract, as described just above; (B) or by darkening one or more concentric rings of lens regions 131 or lens pixels 141, with the effect that the wearer's pupil is artificially restricted in width, thus effectively contracted, as described just above; (C) applying an electromagnetic field to the optic nerve, as further described herein with respect to FIG. 6; or otherwise. This can have the effect that that the wearer's pupil or iris is urged to contract, which can be useful when conducting LASIK eye surgery or for adjusting pupil size after LASIK surgery.

In one embodiment, the eyewear 100 can be disposed to perform inverse-shading using the lenses 112 by one or more of: (A) darkening one or more lens regions 131 or lens pixels 141 through which the wearer is viewing their field of view (FOV), with the exception of an object, display or screen that is being inverse-shaded; (B) injecting light into the wearer's eye where their gaze would be directed at the selected inverse-shaded object, display or screen, similar to when the inverse-shaded object is glowing or phosphorescent; or otherwise. This can have the effect that the selected inverse-shaded object, display or screen is brighter than its background in the wearer's FOV.

In one embodiment, the eyewear 100 can be disposed to promote the wearer reading by one or more of: (A) performing enhanced refraction in one or more lens regions 131 or sets of lens pixels 141 in areas of the wearer's field of view (FOV) through which the wearer would read a book or other readable object, causing a horizontal line to be available for viewing at a higher magnification; (B) performing a prismatic effect using the lenses 112 to alter the angle through which light is bent when passing through the lenses, with the effect that the wearer sees objects as if "looking down" even when the wearer's gaze direction is straight ahead; (C) darkening one or more lens regions 131 or sets of lens pixels 141 in areas of the wearer's field of view other than in a region through which the wearer would read a book, leaving a horizontal line available for viewing; or otherwise. This can have the effect that the wearer is urged to alter their gaze direction toward the book, thus performing a similar function as "reading glasses". Similarly, the eyewear 100 can be disposed to promote the wearer reading by darkening one or more lens regions 131 or lens pixels 141 in areas of the wearer's FOV, leaving a vertical line available for viewing. This can have the effect that that the wearer is urged to alter their gaze direction along the line they are reading, selecting each word in turn.

In one embodiment, the eyewear 100 can be disposed to provide an augmented reality (AR) or virtual reality (VR) display of an eye chart, a peripheral vision test, or another eye test. Using the eyewear 100, an optometrist or other medical personnel can conduct an eye exam to determine a prescription for the wearer, such as whether the wearer needs a prescription to address myopia, presbyopia, astigmatism, or otherwise. The eyewear 100 can also be disposed with a camera directed at the wearer's retina, so as to determine whether the image provided by the AR or VR display is in focus on the wearer's retina. This can have the effect that the optometrist or other medical personnel can conduct the eye exam without requiring the wearer to select which image is best in focus.

In one embodiment, the eyewear 100 can be disposed to provide an augmented reality (AR) or virtual reality (VR) display of the wearer's field of view (FOV), such as when the wearer is a police officer or military personnel, a firefighter or other emergency responder, search/rescue personnel, a physician or other medical personnel, or a volunteer assisting a nearby person in need of aid.

For example, when the wearer is a police officer or military personnel, the eyewear 100 can be disposed to use one or more artificial intelligence (AI) or machine learning (ML) techniques to recognize selected types of objects, such as weapons (guns, knives, or otherwise), that might be dangerous to the wearer. In such cases, the eyewear 100 can (A) inverse-shade the dangerous object, so as to emphasize its location to the wearer; (B) provide an augmented reality (AR) or virtual reality (VR) display of information with respect to the dangerous object, so as to urge the wearer not to fail to recognize that object. Similarly, the eyewear 100 can be disposed to use an AI or ML technique to recognize when the object is moving, or is within reach of a person's hand, or otherwise becomes significantly more dangerous.

For another example, when the wearer is a police officer or military personnel, the eyewear 100 can be disposed to receive electromagnetic signals from a flashbang grenade when the grenade is triggered. At or just before the grenade is set to emit light and sound, the eyewear 100 can completely shade that light and sound, thus protecting the police or military from effects of the grenade. This can have the effect that police and military can use flashbang grenades to stun any opposition, without having to assure that they are not subject to their effects. Similarly, police and military can use light or sound as offensive devices and tactics against persons they seek to subdue. In a related example, police vehicle lights can reach 500 lux in brightness, sufficient to temporarily blind suspects. In such cases, the police vehicle lights can emit an electromagnetic signal when turned on, which can be received by the eyewear 100 so as to completely shade that light, thus protecting the police or military from effects of the extreme light. This can have the effect that the police or military can use vehicle lights against persons they seek to subdue, without having to temporarily blind themselves while so doing.

For another example, when the wearer is a police officer or is military personnel, the eyewear 100 can be disposed to exchange electromagnetic signals with firearms, such as police pistols or military pistols or rifles. Firearms can be set with a "safety" mechanism on or off. In such cases, police or military firearms can be disposed to send electromagnetic signals to the eyewear 100 so as to indicate whether the safety is on or off, and to receive electromagnetic signals from the eyewear 100 so as to set the safety on or off. The eyewear 100 can be disposed so as to allow police or military personnel to identify whether the safety is on or off using an augmented reality (AR) indicator in their field of view (FOV), and to set the safety to be on or off using an eye gesture, hand gesture, or other action. This can have the effect that police or military personnel can both (A) be assured when the safety is on or off with respect to their firearms, and (B) be assured that they can set the safety on or off without having to actually touch the firearm.

For another example, when the wearer is a police officer or is military personnel, the eyewear 100 can be disposed to exchange electromagnetic signals with firearms, so as to identify in what direction and at what target the firearm is directed. In such cases, firearms can be disposed to send electromagnetic signals to the eyewear 100, so as to indicate in what direction the firearm is pointed. The computing device 121 can use this information to determine a line of sight and a current target for the firearm, and can inject this information using an augmented reality (AR) indicator in their field of view (FOV). This can have the effect that police or military personnel can identify at whom they are aiming without revealing that information to an opponent with a laser pointer. The computing device 121 can inject an AR indicator into their FOV to show what would be seen through the firearm's gun sights, even if the officer is not actually so positioned. This can also have the effect that police or military personnel can identify when they are inopportunely aiming at another officer or at an innocent civilian. In such cases, the police or military can inform the computing device 121, such as using an eye gesture, which persons are not proper targets, and the computing device 121 can control the firearm so as to prevent accidents.

For another example, when the wearer is a police officer or is search/rescue personnel, the eyewear 100 can be disposed to use one or more artificial intelligence (AI) or machine learning (ML) techniques to identify one or more persons (such as suspects or rescuees), such as in response to one or more facial recognition techniques, or otherwise. In such cases, the eyewear 100 can, in response to identifying those persons, can (A) inverse-shade the dangerous object, so as to emphasize its location to the wearer; (B) provide an provide an augmented reality (AR) or virtual reality (VR) display of information with respect to the recognized person; (C) apply an electromagnetic field to the optic nerve, as further described herein with respect to FIG. 6; or otherwise.

For another example, when the wearer is a firefighter or other emergency responder, the eyewear 100 can be disposed to use one or more artificial intelligence (AI) or machine learning (ML) techniques to recognize selected types of events. In such cases, the selected types of events can include (for firefighters) objects that are significantly hotter than expected, such as in response to an infrared (IR) sensor, areas that have dangerous gases or other toxins, such as in response to a chemical sensor, or otherwise. In such cases, the selected types of events can include (for emergency responders) patients whose vital signs are abnormal, such as in response to a blood oxygen sensor, a blood pressure or pulse rate sensor, or otherwise.

For another example, the eyewear 100 can identify one or more persons in need of aid by a volunteer, such as using one or more artificial intelligence (AI) or machine learning (ML) techniques, such as those described with respect to the Incorporated Disclosures, particularly application Ser. No. 16/264,553, filed Jan. 31, 2019, naming inventor Scott LEWIS, titled "Digital eyewear integrated with medical and other services", currently pending.

FIG. 2—Retinal Image Display

FIG. 2 shows a conceptual drawing of example eyewear including a retinal image display (RID).

In one embodiment, an example eyewear 100 can include elements shown in the figure, such as one or more of:
- a frame 201, such as possibly including one or more earpieces 201a, a nosepiece 201b, or a RID holder 201c;
- at least one RID 202, such as possibly for a right eye or a left eye.

In one embodiment, the RID 202 can provide an alternative image, to replace the image available to the wearer's eye, or a supplemental image to add to the image available to the wearer's eye.

To replace the image available to the wearer's eye, the lens 112 (shown in FIG. 1) in front of the wearer's eye can be opaqued, and the RID 202 can provide the alternative image directly to the wearer's retina. To opaque the lens 112 in front of the wearer's eye, the computing device 121 can adjust, with respect to the lens, one or more of: shading, polarization, color filtering, prismatic adjustment, or otherwise.

For example, the lens 112 can be adjusted by changing
- an amount of shading sufficient to make the lens opaque to a natural field of view (FOV) but not sufficient to prevent the wearer from seeing the retinal image;
- an amount of polarization sufficient to make the lens opaque to a natural FOV, while adjusting the RID 202 with an inverse amount of polarization;
- an selected set of color frequencies sufficient to filter out most of the natural FOV, while adjusting the RID 202 to inject those color frequencies into the retina;
- an amount or function of prismatic adjustment sufficient to cause the eye to not see the natural FOV, while adjusting the RID 202 with an inverse amount of prismatic adjustment;
- or otherwise.

To supplement the image available to the wearer's eye, the lens 112 in front of the wearer's eye can be allowed to remain clear, and the RID 202 can provide the supplemental image directly to the wearer's retina.

FIG. 3—Contact Lenses or Intra-Ocular Lenses

FIG. 3 (collectively including FIGS. 3A and 3B) shows a conceptual drawing of example eyewear including contact lenses or intra-ocular lenses. FIG. 3A shows a conceptual drawing of example contact lenses having multiple active regions related to wearer view. FIG. 3B shows a conceptual drawing of example contact lenses having multiple individual pixels related to wearer view.

Contact Lenses

Similar to FIG. 1A or 1B (FIG. 1), an example eyewear 100 can include one or more contact lenses 300 disposed for use by the wearer (not shown) by affixing the contact lenses to the wearer's eyes. The contact lenses 300 can include one or more lenses 300, such as possibly a right lens 300a or a left lens 300b. The contact lenses 300 can include elements shown in the figure, such as one or more of:

- a power harvester 301, such as possibly an antenna disposed to receive ambient electromagnetic energy. In one embodiment, the power harvester 301 can include an antenna tuned to receive electromagnetic energy from a cellular phone network, a Wi-Fi network, a 60 Hz power system, or otherwise;
- a communication device 302, such as possibly including a wireless antenna disposed to transmit or receive information using the power harvester 301, a clock circuit, or other elements used with communication devices;
- a computing device 303, such as possibly coupled wirelessly to the communication device 302, and possibly including a processor, memory or mass storage, a second power supply, or other elements used with computing devices;
- one or more sensors 304, such as possibly embedded in the contact lenses 300 or coupled to the computing device 303, and possibly including one or more of: wearer sensors 304a disposed to receive information about the wearer (or their current condition), ambient sensors 304b disposed to receive information about an environment near the wearer (or its current condition), or other sensors.

In one embodiment, the one or more sensors 304 can also include a magnetic (or magnetizable) ring, or a set of magnetic (or magnetizable) elements at the edge of the contact lenses 300. This can have the effect that when the wearer's gaze direction changes, the position of the contact lenses 300 also changes to match a vector from the retina through the pupil and iris. The computing device 303 can be disposed to detect the position of the contact lenses 300, such as using a capacitive sensor, a magnetometer, another electromagnetic device, or otherwise.

In one embodiment, the one or more sensors 304 can also include one or more outward-facing photovoltaic cells, or similar electronic elements, such as affixed to the contact lenses 300 or elsewhere on the eye, so as to become covered by the eyelid when the wearer blinks. Similarly, the one or more sensors 304 can also include one or more inward-facing photovoltaic cells, or similar electronic elements, such as affixed to the contact lenses 300 or elsewhere on the eye, so as to obtain an image of the retina, which will be blanked out when the wearer blinks. This can have the effect that the sensors 304 can determine a blink rate for the wearer without any complex elements selected to identify when a blink occurs or whether the blink is a complete blink (thus, not a partial blink).

Similar to FIG. 1A or 1B (as described herein), the one or more sensors 304 can also include sensors such as those described with respect to the sensors 123 coupled to the frame 111 (FIG. 1). Where practical, and such as described with respect to FIG. 1A or 1B, these can include one or more of:

- one or more visually evoked potential (VEP) elements disposed to measure a potential of the wearer's visual region of the brain;
- one or more devices disposed to perform electroencephalography (EEG), electrooculography (EOG), electroretinography (ERG), optical computed tomography (OCT), or other measures with respect to eye function;
- an electric field element disposed to measure a dipole moment of the eye;
- a gaze direction sensor (not shown), such as an element disposed to measure a reflection of an electromagnetic signal, such as infrared (IR) light directed at the eye and reflected in response to a direction of the pupil or the lens thereof. In such cases, the gaze direction sensor can use reflections or srefraction from the lenses to provide a signal indicating a direction at which the wearer is looking, as described with respect to FIGS. 1A and 1B.
- one or more devices mounted on a vehicle or otherwise remote devices, such as described with respect to FIGS. 1A and 1B, and disposed to provide information to the communication device 302 or the computing device 303.

Intra-Ocular Lenses

Similar to FIG. 3A or 3B (as described below), an intra-ocular lens (not shown) can be implanted in the wearer's eye, such as by replacing or augmenting the natural lens of the wearer's eye.

For example, the intra-ocular lens can be disposed to be static, such as by determining its shape at the time of implantation, or by causing the amount of refraction by the intra-ocular lens to be set by one or more fuses or other electronic components, the values of which can be set at the time of implantation.

For another example, the intra-ocular lens can be disposed to be alterable by the computing device 121, such as by causing the amount of refraction by the intra-ocular lens to be set by one or more fuses or other electronic components, the values of which can be altered by an electromagnetic signal from the computing device 121 or another device. Similar to the contact lenses 300, the intra-ocular lens can be powered by electromagnetic harvesting, or a related technique.

Multiple Active Regions

FIG. 3A shows a conceptual drawing of example contact lenses having multiple active regions related to wearer view.

Similar to FIG. 1A (as shown in FIG. 1), the contact lenses 300 can be used to correct vision on behalf of the wearer, enhance vision on behalf of the wearer, or otherwise. For example, similarly, the contact lenses 300 can correct for myopia, presbyopia, astigmatism, or other wearer vision artifacts. Also similarly, the contact lenses 300 can enhance vision can include a zoom feature disposed to present the wearer with a zoomed-in or zoomed-out view of the wearer's field of view (FOV), or can include other features disposed to present the wearer with other vision enhancements described in the Incorporated Disclosures, or otherwise.

Similar to FIG. 1A (as shown in FIG. 1), the contact lenses 300 can include multiple lens regions 310, each disposed to correct vision or enhance vision on behalf of the wearer. For example, the multiple lens regions 310 can include a close-vision region 311, a mid-range vision region 312, a distant vision region 313, or otherwise. Also similarly, each lens region 310 can be individually controlled, such as by the computing device 303, or otherwise. This can have the effect that the wearer's vision can be corrected or enhanced in each region where the wearer might look.

Similar to FIG. 1A (FIG. 1), each lens region 310 can be individually controlled, such as by the computing device 303, or otherwise. This can have the effect that the wearer's vision can be corrected or enhanced in each region where the wearer might look. For example, the close-vision region 311 can be disposed with a distinct prescription from the mid-range vision region 312. This can have the effect that when the wearer looks at a close object, their vision can be corrected or enhanced with respect to the prescription assigned to the close-vision region 311, or when the wearer looks at a mid-range object, vision can be corrected or enhanced with respect to the prescription assigned to the mid-range vision region 312. For another example, the central vision region can be disposed with a distinct prescription from the peripheral vision region. This can have the effect that when the wearer looks directly at an object, their vision can be corrected or enhanced with respect to the prescription assigned to the central vision region, or when the wearer uses their peripheral vision, their vision can be corrected or enhanced with respect to the prescription assigned to the peripheral vision region.

As described with respect to FIG. 1A (FIG. 1), when the wearer moves their head, the computing device 303 can determine, such as using an accelerometer or a gyroscope (which can be included with the sensors 304), a wearer's head movement. Similarly, the computing device 303 can also determine, such as using a dynamic eye gaze tracker (which can be included with the sensors 304), a gaze direction. Also similarly, this information can allow the computing device 303 to determine a distance of the object at which the wearer is intending to look; similarly, this information can allow the computing device 303 to determine whether the wearer is using their central vision or peripheral vision, and to control the correction or enhancement associated with one or more of the lens regions 310.

As described with respect to FIG. 1A (FIG. 1), when the wearer shifts their gaze, the computing device 303 can determine, such as using a focal length detector (which can be included with the sensors 304), a distance to an object being viewed by the wearer. Similarly, this information can allow the computing device 303 to determine a distance of the object at which the wearer is intending to look. Also similarly, the computing device 303 can control the correction or enhancement associated with one or more of the lens regions 310. This can have the effect that the eyewear 100 adjusts its correction or enhancement to match the wearer's intended use thereof.

As described with respect to FIG. 1A (FIG. 1), the lens regions 310 can overlap, such as shown in the figure. An example might occur when close-range overlaps with both central/peripheral vision. In such cases, the intersection of multiple lens regions 310, or the union of multiple lens regions 310, as appropriate, can be invoked by the computing device 303, so as to provide the wearer with the correction or enhancement to match the wearer's intended use of the contact lens 300.

Multiple Active Pixels

FIG. 3B shows a conceptual drawing of example contact lenses having multiple individual pixels related to wearer view.

Similar to FIG. 1B (as shown in FIG. 1), the contact lenses 300 can include multiple lens pixels 320, each disposed to correct vision or enhance vision on behalf of the wearer. For example, similarly, each lens pixel 320 can include an individual region (such as the multiple lens regions 310, only typically smaller), disposed to provide distinct corrections or enhancements to vision in the region where the wearer's gaze direction intersects the lens pixel. Also similarly to the lens regions 310, each lens pixel 320 can be individually controlled, such as by the computing device 303, or otherwise. This can have the effect that the wearer's vision can be corrected or enhanced for each direction where the wearer might look.

Similar to FIG. 1B (as shown in FIG. 1), the computing device 303 can associate a distinct set of lens pixels 320 for use as a separate one of the multiple lens regions 310. For example, the computing device 303 can control the prescription with respect to each such lens region 310 by controlling each of the lens pixels 320 associated with that particular lens region. Also similarly to the possibility of overlap of lens regions 310, a set of lens pixels 320 can be associated with more than one such lens region. This can have the effect that when the computing device 303 determines that the wearer is using a particular lens region 310, it can select the set of lens pixels associated with that lens region, even if those lens pixels are also associated with another lens region. Similar to overlap of lens regions 310, the intersection of multiple sets of lens pixels 320, or the union of multiple sets of lens pixels 320, as appropriate, can be invoked by the computing device 303, so as to provide the wearer with the correction or enhancement to match the wearer's intended user of the eyewear 100.

As described with respect to FIG. 1B (FIG. 1), when the computing device 303 can determine the wearer's intended user of the eyewear 100, and can determine the particular lens pixel 320 that the wearer's gaze direction passes through, the computing device can invoke only that one lens pixel, possibly updating the particular lens pixel to invoke as the wearer's gaze direction might change.

Similar to FIG. 1B (as shown in FIG. 1), in alternative embodiments, the contact lenses 300 can include one or more layers or alternative regions that can have their shading, or other effects, separately adjusted. Thus, in addition or in lieu of lens pixels 320, the contact lenses 300 can use separate regions that are adjusted as a whole, rather than being adjusted as a collection of lens pixels 310. When a region is adjusted, this can have the effect that the eye can be drawn toward or away a particular adjusted region. For example, when it is desired to encourage the user to look through a short-range focusing region, other regions can be shaded to decrease visibility, thus encouraging the user to look in a particular direction or through a particular region of the lenses.

Similar to FIG. 1B (FIG. 1), the set of lens pixels 320 associated with each such lens region 310 can be adjusted by the computing device 303. This can have the effect that the set of lens pixels 320 associated with each such lens region 310 can be altered from time to time.

For example, a selected contact lens 300 can include a first region for a first degree of vision correction, such as using refraction, such as for close-range viewing and a second region for a second degree of vision correction, such as for longer-range viewing. A second contact lens layer (not shown) can be overlaid on the contact lens 300, so that the second lens layer can shade one or more regions of the contact lens 300. This can have the effect that the user is prompted to look in a selected direction, or through a particular region of the contact lens 300. Thus, the second lens layer can shade so as to prompt the user to view through the selected portion of the contact lens 300, thus looking at a field of view (FOV) through either a selected close-range region or a selected more longer-range lens region.

Predictive Techniques

Similar to FIGS. 3A and 3B, in one embodiment, the computing device 303 can maintain a record of wearer activity with respect to use of the contact lens 300 and its lens regions 311 or 312, so as to identify which portions of the contact lens 300 should be associated with which lens regions 311 or 312 to provide the wearer with the best possible experience with using the contact lens 300. For example, when the computing device 303 determines that the wearer is most likely to need a particular prescription for a selected portion of the contact lens 300, the computing device 303 can adjust the prescription for that particular portion of the contact lens 300 so as to provide the wearer with that prescription when the wearer is using that portion of the contact lens 300.

In one embodiment, the computing device 303 can determine the wearer's most likely prescription in response to a predictive technique, such as using artificial intelligence (AI) or machine learning (ML). For example, the computing device 303 can train a recurrent neural network (RNN) to predict the wearer's most likely prescription in response to each lens region 311 or 312 and each other set of circumstances, such as information obtained from the sensors 304. Alternatively, the computing device 303 can determine a set of regression parameters to predict the wearer's most likely prescription in response to each lens region 311 or 312 and each other set of circumstances. The computing device 303 can use other and further AI or ML techniques, or other techniques, or otherwise, to make the desired prediction.

Similar to predictive techniques with respect to the lens regions 311 or 312, the computing device 303 can determine the wearer's most likely prescription in response to one or more predictive techniques, such as using artificial intelligence (AI) or machine learning (ML) with respect to each lens pixel, with respect to association of lens pixels with particular lens regions 311 or 312, or otherwise. In such cases, the computing device 303 can assign individual lens pixels to selected lens regions 311 or 312, in response to one or more predictive techniques. Also similarly, the computing device 303 can adjust the set of lens pixels associated with each lens region 311 or 312 in response to a predictive technique in response to wearer actions, such as the wearer moving their head when their gaze direction should be reassociated with a different lens region 311 or 312.

In one embodiment, the computing device 303 can determine the wearer's most likely medical condition, such as in response to the sensors 304. For example, blink rate and other parameters with respect to the wearer's eye activity can be used to determine whether the wearer is excessively anxious, depressed, sleep-deprived, or otherwise needs to rest. In such cases, the contact lens 300 can be disposed to urge the wearer to take a break and rest. This can have the effect that safety is improved, such as for commercial pilots and other pilots, long-haul truckers and other long-distance drivers, police officers, military personnel, firefighters, emergency responders, medical personnel, and other personnel often subject to long hours or stressful circumstances. Alternatively, the contact lens 300 can be disposed to urge the wearer to take a break or to obtain a stimulant, such as caffeine, sugar, a meal, or otherwise.

FIG. 4—Facemask or Helmet

Figure 4B:
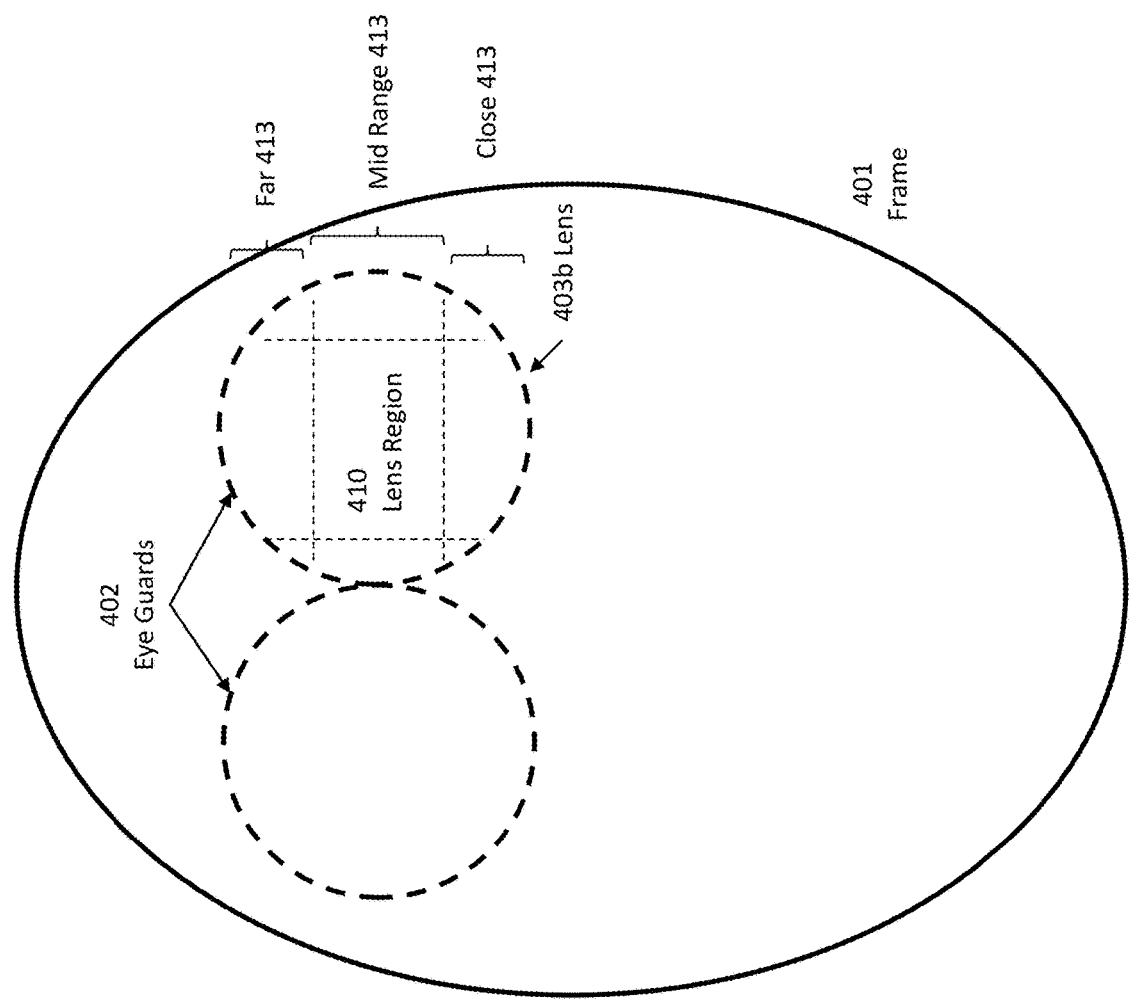
FIG. 4B shows a conceptual drawing of an example facemask or helmet having multiple individual pixels related to wearer view.
Figure 4D:
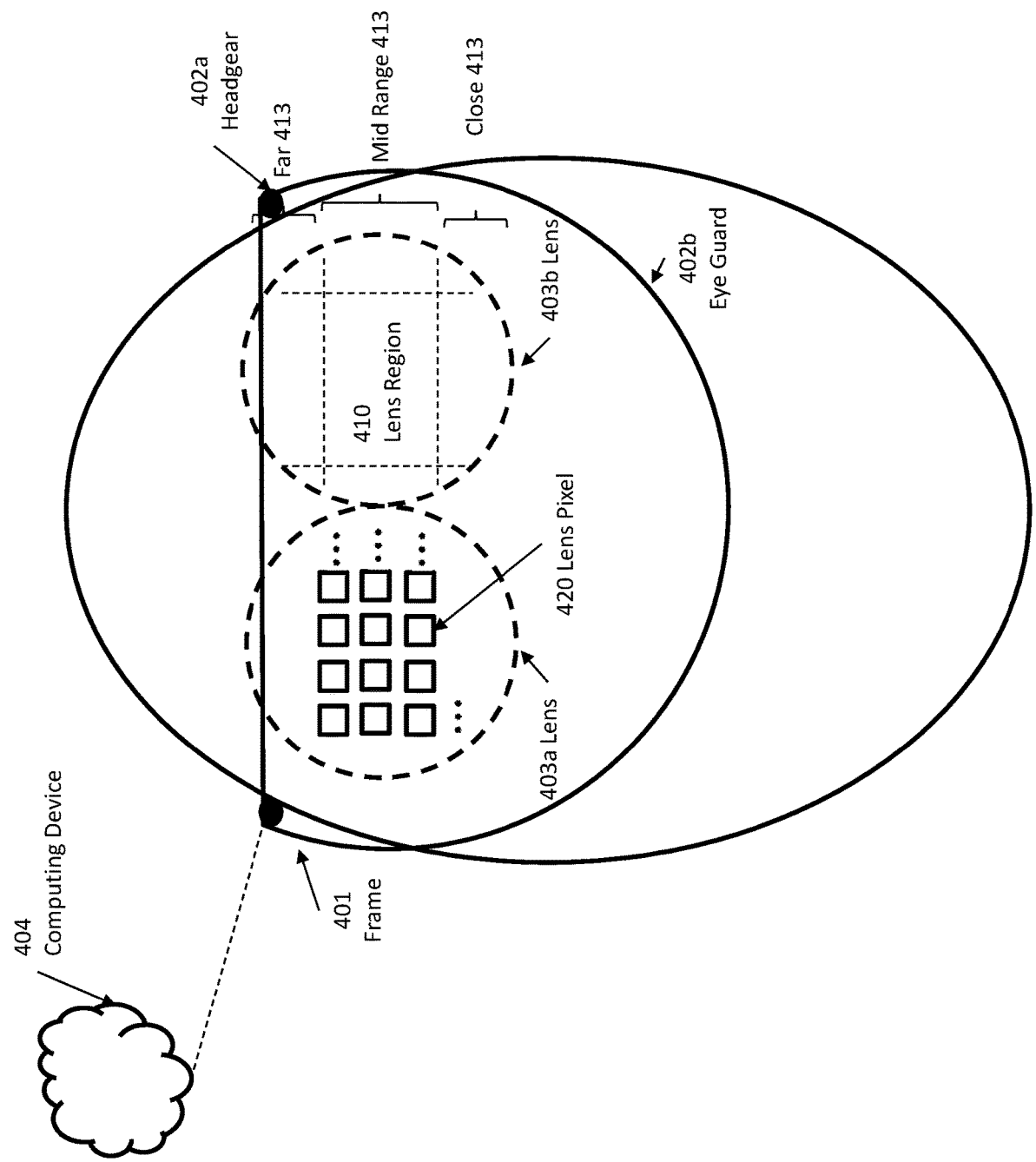
FIG. 4D shows a conceptual drawing of an example goggles or visor having multiple individual pixels related to wearer view.

FIG. 4 (collectively including FIGS. 4A-4D) shows a conceptual drawing of example eyewear including a facemask or helmet. FIG. 4A shows a conceptual drawing of an example facemask or helmet having multiple active regions related to wearer view. FIG. 4B shows a conceptual drawing of an example facemask or helmet having multiple individual pixels related to wearer view. FIG. 4C shows a conceptual drawing of an example goggles or visor having multiple active regions related to wearer view. FIG. 4D shows a conceptual drawing of an example goggles or visor having multiple individual pixels related to wearer view.

In one embodiment, an example eyewear 100 can include a facemask or helmet 400 disposed for use by the wearer (not shown), including elements shown in the figure, such as one or more of:

a frame 401, such as possibly including a headgear 402a (such as a front piece for a facemask, or a head guard for a helmet) or an eye guard 402b;

at least one lens 403, such as possibly a right lens 403a (shown in FIG. 4A), or a left lens 403b (shown in FIG. 4B), such as disposed in the eye guard 402b or integrated into the eye guard 402 as part of its solid form.

Similar to the eyewear 100 described with respect to FIG. 1, the frame 401 can enclose, or hold, one or more electronic elements shown in the figure, such as one or more of:

a computing device 121 (as shown in FIG. 1), such as possibly including a processor, memory or mass storage, a power supply, a clock circuit, or other elements used with computing devices;

a communication device 122 (as shown in FIG. 1), such as possibly including a wireless or wired communicate element, a communication protocol stack, or other elements used with communication devices;

one or more sensors 123 (as shown in FIG. 1), such as possibly including one or more of: wearer sensors 123a (as shown in FIG. 1) disposed to receive information about the wearer (or their current condition), ambient sensors 123b (as shown in FIG. 1) disposed to receive information about an environment near the wearer (or its current condition), or other sensors.

For example, similar to FIG. 1A or 1B (as described herein), the one or more sensors 123 can also include sensors such as those described with respect to the sensors 123 coupled to the frame 111 (as shown in FIG. 1). Where practical, and such as described with respect to FIG. 1A or 1B, these can include one or more of:

one or more visually evoked potential (VEP) elements disposed to measure a potential of the wearer's visual region of the brain;

one or more devices disposed to perform electroencephalography (EEG), electrooculography (EOG), electroretinography (ERG), optical computed tomography (OCT), or other measures with respect to eye function;

an electric field element disposed to measure a dipole moment of the eye;

a gaze direction sensor (not shown), such as an element disposed to measure a reflection of an electromagnetic signal, such as infrared (IR) light directed at the eye and reflected in response to a direction of the pupil or the lens thereof. In such cases, the gaze direction sensor can use reflections or srefraction from the lenses to provide a signal indicating a direction at which the wearer is looking, as described with respect to FIGS. 1A and 1B.

one or more devices mounted on a vehicle or otherwise remote devices, such as described with respect to FIGS. 1A and 1B, and disposed to provide information to the computing device 121 or the communication device 122.

In the facemask or helmet 400, or goggles or visor 450, similar described with respect to the glasses 110 (as shown in FIG. 1) the one or more lenses 403 can be used to correct or enhance vision on behalf of the wearer, or otherwise. For example, the lenses 403 can be used to correct vision using one or more lens prescriptions associated therewith, disposed to correct for myopia, presbyopia, astigmatism, or other wearer vision artifacts. For another example, the lenses 403 can be used to enhance vision can include a zoom feature disposed to present the wearer with a zoomed-in or zoomed-out view of the wearer's field of view (FOV), or can include other features disposed to present the wearer with other vision enhancements described in the Incorporated Disclosures, or otherwise.

Multiple Active Regions

FIG. 4A shows a conceptual drawing of an example facemask or helmet having multiple active regions related to wearer view.

Similar to FIG. 1A (as shown in FIG. 1), the lenses 403 can be used to correct vision on behalf of the wearer, enhance vision on behalf of the wearer, or otherwise. For example, similarly, the lenses 403 can correct for myopia, presbyopia, astigmatism, or other wearer vision artifacts. Also similarly, the lenses 403 can enhance vision can include a zoom feature disposed to present the wearer with a zoomed-in or zoomed-out view of the wearer's field of view (FOV), or can include other features disposed to present the wearer with other vision enhancements described in the Incorporated Disclosures, or otherwise.

Similar to FIG. 1A (as shown in FIG. 1), the lenses 403 can include multiple lens regions 410, each disposed to correct vision or enhance vision on behalf of the wearer. For example, the multiple lens regions 410 can include a close-vision region 411, a mid-range vision region 412, a distant vision region 413, or otherwise. Also similarly, each lens region 410 can be individually controlled, such as by the computing device 121, or otherwise. This can have the effect that the wearer's vision can be corrected or enhanced in each region where the wearer might look.

As described with respect to FIG. 1A (FIG. 1), when the wearer moves their head, the computing device 121 can determine, such as using an accelerometer or a gyroscope (which can be included with the sensors 123), a wearer's head movement. Similarly, the computing device 121 can also determine, such as using a dynamic eye gaze tracker (which can be included with the sensors 123), a gaze direction. Also similarly, this information can allow the computing device 121 to determine a distance of the object at which the wearer is intending to look; similarly, this information can allow the computing device 121 to determine whether the wearer is using their central vision or peripheral vision, and to control the correction or enhancement associated with one or more of the lens regions 410.

As described with respect to FIG. 1A (FIG. 1), when the wearer shifts their gaze, the computing device 121 can determine, such as using a focal length detector (which can be included with the sensors 123), a distance to an object being viewed by the wearer. Similarly, this information can allow the computing device 121 to determine a distance of the object at which the wearer is intending to look. Also similarly, the computing device 121 can control the correction or enhancement associated with one or more of the lens regions 410. This can have the effect that the facemask 400a or helmet 400b adjusts its correction or enhancement to match the wearer's intended use thereof.

Similar to FIG. 1A (FIG. 1), the lenses 403 can each include multiple lens regions 410, each disposed to correct vision or enhance vision on behalf of the wearer. For example, the lens regions 401 can each include a central vision region, disposed to provide distinct corrections or enhancements to vision in a region where the wearer is looking at objects using their central vision, or one or more peripheral vision regions, disposed to provide distinct corrections or enhancements to vision in a region where the wearer is looking at objects using their peripheral vision. For another example, the lens regions 410 can each include a close-vision region, disposed to provide distinct corrections or enhancements to vision in a region where the wearer is looking at a close object, a mid-range vision region, disposed to provide distinct corrections or enhancements to vision in a region where the wearer is looking at a mid-range object, or a distant vision region, disposed to provide distinct corrections or enhancements to vision in a region where the wearer is looking at a distant object.

Similar to FIG. 1A (FIG. 1), each lens region 410 can be individually controlled, such as by the computing device 403, or otherwise. This can have the effect that the wearer's vision can be corrected or enhanced in each region where the wearer might look. For example, the close-vision region 411 can be disposed with a distinct prescription from the mid-range vision region 412. This can have the effect that when the wearer looks at a close object, their vision can be corrected or enhanced with respect to the prescription assigned to the close-vision region 411, or when the wearer looks at a mid-range object, vision can be corrected or enhanced with respect to the prescription assigned to the mid-range vision region 412. For another example, the central vision region can be disposed with a distinct prescription from the peripheral vision region. This can have the effect that when the wearer looks directly at an object, their vision can be corrected or enhanced with respect to the prescription assigned to the central vision region, or when the wearer uses their peripheral vision, their vision can be corrected or enhanced with respect to the prescription assigned to the peripheral vision region.

As described with respect to FIG. 1A, in one embodiment, when the wearer moves their head, the computing device can determine a wearer's head movement, such as using an accelerometer or a gyroscope (which can be included with the sensors). The computing device can also determine a gaze direction, such as using a dynamic eye gaze tracker (which can be included with the sensors). This information can allow the computing device to determine whether the wearer is intending to look at a close object, a mid-range object, or a distant object; similarly, this information can allow the computing device to determine whether the wearer is using their central vision or peripheral vision. In response thereto, the computing device can control the correction or enhancement associated with one or more of the lens regions. This can have the effect that the eyewear 400 can adjust its correction or enhancement to match the wearer's intended use thereof.

As described with respect to FIG. 1A, in another embodiment, when the wearer shifts their gaze, the computing device can determine a distance to an object being viewed by the wearer, such as using a focal length detector (which can be included with the sensors). This information can allow the computing device 121 to determine whether the wearer is intending to look at a close object, a mid-range object, or a distant object. In response thereto, the computing device can control the correction or enhancement associated with one or more of the lens regions. This can have the effect that the eyewear 400 can adjust its correction or enhancement to match the wearer's intended use thereof.

In one embodiment, the lens regions can overlap, such as shown in the figure. An example might occur when close-range overlaps with both central/peripheral vision. In such cases, the intersection of multiple lens regions, or the union of multiple lens regions, as appropriate, can be invoked by the computing device, so as to provide the wearer with the correction or enhancement to match the wearer's intended use of the eyewear 400.

Multiple Active Pixels

FIG. 4B shows a conceptual drawing of an example facemask or helmet having multiple individual pixels related to wearer view.

Similar to FIG. 1B (as shown in FIG. 1), the lenses 403 can include multiple lens pixels 420, each disposed to correct vision or enhance vision on behalf of the wearer. For example, similarly, each lens pixel 420 can include an individual region (such as the multiple lens regions 410, only typically smaller), disposed to provide distinct corrections or enhancements to vision in the region where the wearer's gaze direction intersects the lens pixel. Also similarly to the lens regions 410, each lens pixel 420 can be individually controlled, such as by the computing device 121, or otherwise. This can have the effect that the wearer's vision can be corrected or enhanced for each direction where the wearer might look.

Similar to FIG. 1B (as shown in FIG. 1), the computing device 121 can associate a distinct set of lens pixels 420 for use as a separate one of the multiple lens regions 410. For example, the computing device 121 can control the prescription with respect to each such lens region 410 by controlling each of the lens pixels 420 associated with that particular lens region. Also similarly to the possibility of overlap of lens regions 410, a set of lens pixels 420 can be associated with more than one such lens region. This can have the effect that when the computing device 121 determines that the wearer is using a particular lens region 410, it can select the set of lens pixels associated with that lens region, even if those lens pixels are also associated with another lens region. Similar to overlap of lens regions 410, the intersection of multiple sets of lens pixels 420, or the union of multiple sets of lens pixels 420, as appropriate, can be invoked by the computing device 121, so as to provide the wearer with the correction or enhancement to match the wearer's intended user of the eyewear 100. As described with respect to FIG. 1B (FIG. 1), when the computing device 121 can determine the wearer's intended user of the eyewear 100, and can determine the particular lens pixel 420 that the wearer's gaze direction passes through, the computing device can invoke only that one lens pixel, possibly updating the particular lens pixel to invoke as the wearer's gaze direction might change.

Similar to FIG. 1B (as shown in FIG. 1), the set of lens pixels 420 associated with each such lens region 410 can be adjusted by the computing device 121. This can have the effect that the set of lens pixels 420 associated with each such lens region 410 can be altered from time to time.

Similar to FIG. 1B (as shown in FIG. 1), the lenses 403 can each include one or more layers or alternative regions that can have their shading/inverse-shading, or other effects, separately adjusted. Thus, in addition to or in lieu of lens pixels 420, one or more of the lenses 403 can use separate regions that are adjusted as a whole, rather than being adjusted as a collection of individual lens pixels 420. When one such region is adjusted, this can have the effect that the eye can be drawn toward or away from a particular adjusted region. For example, when it is desirable to encourage the user to look through a particular focusing region (such as a short-range focusing region or a longer-range focusing region), other regions can be shaded/inverse-shaded to decrease visibility, thus encouraging the user to look in a particular direction or through a particular region of the lenses 403.

For example, a selected lens 403 can include a first region having a first degree of vision correction, such as using refraction (such as for close-range viewing), and a second region for a second degree of vision correction, such as using a different amount of refraction (such as for longer-range viewing). A second lens layer can be overlaid on the first lens 403, so that the second lens layer can shade/inverse-shade one or more of the regions of the first lens 403. This can have the effect that the wearer is prompted to look in a selected direction, or through a particular region of the first lens 403. Thus, the second lens layer can shade/inverse-shade the first lens 403 so as to prompt the wearer to look through the selected portion of the first lens 403. can have the effect of prompting the wearer to look at a field of view (FOV) through either a selected close-range portion of the first lens 403 or a selected more longer-range portion the first lens 403.

Predictive Techniques

Similar to FIGS. 4A and 4B, in one embodiment, the computing device 404 can maintain a record of wearer activity with respect to use of one or more of the lenses 403 and its associated lens regions, so as to identify which portions of the particular lens 403 should be associated with which lens regions to provide the wearer with the best possible experience with using the eyewear 400. For example, when the computing device 403 determines that the wearer is most likely to need a particular prescription for a selected portion of the eyewear 400, the computing device 404 can adjust the prescription for that particular portion of the eyewear 400 so as to provide the wearer with that prescription when the wearer is using that portion of the eyewear 400.

Similar to FIGS. 4A and 4B, in one embodiment, the computing device can determine the wearer's most likely prescription in response to a predictive technique, such as using artificial intelligence (AI) or machine learning (ML). For example, the computing device can train a recurrent neural network (RNN) to predict the wearer's most likely prescription in response to each lens region and each other set of circumstances, such as information obtained from the sensors. Alternatively, the computing device can determine a set of regression parameters to predict the wearer's most likely prescription in response to each lens region and each other set of circumstances. The computing device can use other and further AI or ML techniques, or other techniques, or otherwise, to make the desired prediction.

Similar to predictive techniques with respect to the lens regions, the computing device 404 can determine the wearer's most likely prescription in response to one or more predictive techniques, such as using artificial intelligence (AI) or machine learning (ML) with respect to each lens pixel, with respect to association of lens pixels with particular lens regions, or otherwise. In such cases, the computing device can assign individual lens pixels to selected lens regions, in response to one or more predictive techniques. Also similarly, the computing device can adjust the set of lens pixels associated with each lens region in response to a predictive technique in response to wearer actions, such as the wearer moving their head when their gaze direction should be reassociated with a different lens region.

In one embodiment, the computing device can determine the wearer's most likely medical condition, such as in response to the sensors. For example, blink rate and other parameters with respect to the wearer's eye activity can be used to determine whether the wearer is excessively anxious, depressed, sleep-deprived, or otherwise needs to rest. In such cases, the eyewear 400 can be disposed to urge the wearer to take a break and rest. This can have the effect that safety is improved, such as for commercial pilots and other pilots, long-haul truckers and other long-distance drivers, police officers, military personnel, firefighters, emergency responders, medical personnel, and other personnel often subject to long hours or stressful circumstances. Alternatively, the eyewear 400 can be disposed to urge the wearer to take a break or to obtain a stimulant, such as caffeine, sugar, a meal, or otherwise.

FIGS. 4C and 4D—Goggles or Visor

FIGS. 4C-4D show a conceptual drawing of an example goggles or visor having multiple active regions related to wearer view. FIG. 4C shows a conceptual drawing of an example goggles or visors having multiple individual lens regions related to wearer view. FIG. 4D shows a conceptual drawing of an example goggles or visors having multiple individual lens pixels related to wearer view.

Similar to FIGS. 4C-4D, in one embodiment, an example eyewear 400 can include a set of goggles or a visor 400 disposed for use by the wearer (not shown), including elements shown in the figure, such as one or more of:
  a frame 401, such as possibly including a headgear 402a (such as a front piece for a facemask, or a head guard for a helmet) or an eye guard 402b;
  at least one lens 403, such as possibly a right lens 403a or a left lens 403b, such as disposed in the eye guard 402b or integrated into the eye guard 402b as part of its solid form.

Similar to the eyewear 100 described with respect to FIG. 1, the frame 401 can enclose, or hold, one or more electronic elements shown in the figure, such as one or more of:
  a computing device 411 (as shown in FIG. 1), such as possibly including a processor, memory or mass storage, a power supply, a clock circuit, or other elements used with computing devices;
  a communication device 412 (as shown in FIG. 1), such as possibly including a wireless or wired communicate element, a communication protocol stack, or other elements used with communication devices;
  one or more sensors 413 (as shown in FIG. 1), such as possibly including one or more of: wearer sensors 413a (as shown in FIG. 1) disposed to receive information about the wearer (or their current condition), ambient sensors 413b (as shown in FIG. 1) disposed to receive information about an environment near the wearer (or its current condition), or other sensors.

Similar to FIG. 1A (as shown in FIG. 1), the lenses 403 can include multiple lens regions 420, each disposed to correct vision or enhance vision on behalf of the wearer. For example, similarly, each lens region 420 can include an individual region, disposed to provide distinct corrections or enhancements to vision in the region where the wearer's gaze direction intersects the lens region. Also similarly to the lens regions described with respect to FIG. 1A, each lens region 420 can be individually controlled, such as by the computing device 411, or otherwise. This can have the effect that the wearer's vision can be corrected or enhanced for each direction where the wearer might look.

Similar to the FIGS. 4A-4B, as described with respect to the eyewear 400, the one or more lenses 403 can be used to correct or enhance vision on behalf of the wearer, or otherwise. For example, the one or more lenses 403 can be used to correct vision using one or more lens prescriptions associated therewith, disposed to correct for myopia, presbyopia, astigmatism, or other wearer vision artifacts. For another example, the one or more lenses 403 can be used to enhance vision can include a zoom feature disposed to present the wearer with a zoomed-in or zoomed-out view of the wearer's field of view (FOV), or can include other features disposed to present the wearer with other vision enhancements described in the Incorporated Disclosures, or otherwise.

FIG. 4D shows a conceptual drawing of an example facemask or helmet having multiple individual pixels related to wearer view.

Similar to FIG. 1B (as shown in FIG. 1), the lenses 403 can include multiple lens pixels 430, each disposed to correct vision or enhance vision on behalf of the wearer. For example, similarly, each lens pixel 430 can include an individual region (such as the multiple lens regions 420, only typically smaller), disposed to provide distinct corrections or enhancements to vision in the region where the wearer's gaze direction intersects the lens pixel. Also similarly to the lens regions 420, each lens pixel 430 can be individually controlled, such as by the computing device 411, or otherwise. This can have the effect that the wearer's vision can be corrected or enhanced for each direction where the wearer might look.

Similar to FIG. 1B (FIG. 1), the computing device 411 can associate a distinct set of lens pixels 430 for use as a separate one of the multiple lens regions 420. For example, the computing device 411 can control the prescription with respect to each such lens region 420 by controlling each of the lens pixels 430 associated with that particular lens region. Also similarly to the possibility of overlap of lens regions 420, a set of lens pixels 430 can be associated with more than one such lens region. This can have the effect that when the computing device 411 determines that the wearer is using a particular lens region 420, it can select the set of lens pixels 430 associated with that lens region, even if those lens pixels are also associated with another lens region. Similar to overlap of lens regions 420, the intersection of multiple sets of lens pixels 430, or the union of multiple sets of lens pixels, as appropriate, can be invoked by the computing device 411, so as to provide the wearer with the correction or enhancement to match the wearer's intended user of the eyewear 400.

As described with respect to FIG. 1B (FIG. 1), when the computing device 411 can determine the wearer's intended use of the eyewear 400, and can determine the particular lens pixel 430 that the wearer's gaze direction passes through, the computing device 411 can invoke only that one lens pixel, possibly updating the particular lens pixel to invoke as the wearer's gaze direction might change.

Similar to FIG. 1B (FIG. 1), the set of lens pixels 430 associated with each such lens region 420 can be adjusted by the computing device 411. This can have the effect that the set of lens pixels 430 associated with each such lens region 420 can be altered from time to time.

FIG. 5—Scopes or Sights

FIG. 5 shows a conceptual drawing of example eyewear including one or more scopes or sights, including binoculars, microscopes, rifle scopes, spotting scopes, telescopes, analog or digital cameras, rangefinders, or otherwise.

In one embodiment, an example eyewear 100 can include elements shown in the figure, such as one or more scopes or sights, including binoculars, microscopes, rifle scopes, spotting scopes, telescopes, analog or digital cameras, rangefinders, or otherwise. In such cases, each scope or sight can include a frame 501 disposed to maintain at least one lens 502 in position for sighting, such as in a frame holding lenses suitable for long-distance magnification (such as when used with binoculars, microscopes, rifle scopes, spotting scopes, telescopes, or otherwise), or other functions.

Similar to the eyewear 100 described with respect to FIG. 1, the frame 501 can enclose, or hold, one or more electronic elements shown in the figure, such as one or more of: a computing device, a communication device, one or more sensors, or otherwise.

Also similar to the eyewear 100 described with respect to FIG. 1, the one or more lenses 502, can be used to correct or enhance vision on behalf of the wearer, or otherwise.

Also similar to the eyewear 100 described with respect to FIG. 1, the one or more lenses 502, can include multiple active regions (not shown), such as close-vision regions, mid-range vision regions, distant vision regions, central vision regions, peripheral vision regions, or otherwise. Also similarly, each lens region (not shown) can be individually controlled, such as by the computing device, or otherwise. This can have the effect that the wearer's vision can be corrected or enhanced in each region where the wearer might look.

Also similar to the eyewear 100 described with respect to FIG. 1, the one or more lenses 502, can include multiple active pixels (not shown), each possibly associated with one or more of the multiple active regions. Also similarly, the set of lens pixels associated with each such lens region can be adjusted by the computing device. This can have the effect that the set of lens pixels associated with each such lens region can be altered from time to time.

In one embodiment, an example eyewear 100 can include one or more scopes or sights, analog or digital cameras, or otherwise, disposed to view a scene from a distant location or from a different angle as would be seen by the wearer. For example, a motion picture camera can be mounted on a vehicle, such as a racing car or an aerobatic aircraft, with an output electromagnetic signal from the camera being transmitted to the eyewear 100 or injected into the wearer's field of vision (FOV). This can have the effect that the wearer would be able to use the eyewear 100 to see the image as provided by the scopes, cameras, or otherwise. In such cases, the wearer would be able to use the eyewear 100 to see an event, such as a sporting event, a dangerous event, or another event, without having to have line-of-sight on the objects or scene of the event.

FIG. 6—Nerve Sensors/Stimulators

FIG. 6 shows a conceptual drawing of example eyewear including one or more nerve sensors or stimulators.

In one embodiment, an example eyewear 600 can include one or more nerve sensors or stimulators, disposed to affect nerve signals on the optic nerve 601, in a vision section 602 of the brain, in another section of the brain, or otherwise. The nerve sensors or stimulators can include elements shown in the figure, such as one or more of:
- one or more electromagnetic sensors 610, disposed to receive electromagnetic signals from the optic nerve 601, the vision section 602 of the brain, another section of the brain, or otherwise;
- one or more electromagnetic stimulators 620, disposed to provide and insert electromagnetic signals into the optic nerve 601, into the vision section 602 of the brain, into another section of the brain, or otherwise;
- or otherwise.

For example, the electromagnetic sensors 610 can be disposed to receive electromagnetic signals from the optic nerve 601, to couple those electromagnetic signals, or processed variants thereof, to a computing device (not shown).

In such cases, the electromagnetic sensors 610 can determine which signals from the optic nerve 601 are associated with which portions of an image viewed by the wearer. Similarly, the electromagnetic sensors 610 can be disposed to receive electromagnetic signals from the vision section of the brain, another section of the brain, or otherwise.

In such cases, a computing device (not shown) can compare electromagnetic signals from particular portions (not shown) of the optic nerve 601 with the wearer's experience of a viewed image (not shown). With information gleaned from the comparison, the computing device can determine an image viewed by the wearer in response to the electromagnetic signals from the optic nerve 601. Similarly, the computing device can compare reception of electromagnetic signals from particular portions of the vision section of the brain, from particular portions of another section of the brain, or otherwise.

In such cases, a computing device can compare electromagnetic signals injected into particular portions of the optic nerve 601 with the wearer's experience of a viewed image, such as an alteration of a natural viewed image. With information gleaned from the comparison, the computing device can determine how to make adjustments to a natural viewed image, such as in response to an augmented reality (AR) image or signal. Similarly, the computing device can compare injection of electromagnetic signals into particular portions of the vision section of the brain, into particular portions of another section of the brain, or otherwise.

It might occur that the electromagnetic signals associated with particular portions of the optic nerve 601, the vision section 602 of the brain, or another section of the brain, could be different for distinct wearers. In such cases, the computing device can determine an association of portions of the viewed image with portions of the optic nerve 601, the vision section 602 of the brain, or another section of the brain, or otherwise, for each individual wearer.

For another example, the electromagnetic sensors 610 can apply an electromagnetic field to the optic nerve 601, or to a visual portion of the brain, to encourage the wearer's eye to gaze in a selected direction. This can have the effect of ameliorating amblyopia ("lazy eye"), exotropia (misaligned eye or "wall eye"), and possibly other directional issues with respect to the eyes. This can also have the effect of encouraging the wearer to look at a particular area or object, such as a target; this can be useful with respect to police officers, military personnel, and in advertising.

Similarly, the electromagnetic sensors 610 can apply an electromagnetic field to the optic nerve 601, or to a visual portion of the brain, to encourage the wearer's pupil or iris to contract or to expand. This can have the effect that the wearer's eye is protected against excessive infalling light (such as sudden brightness or glare), or excessive infalling light of a particular color or frequency range (such as excessive blue or UV).

FIG. 7—Used with Display

Figure 7B:
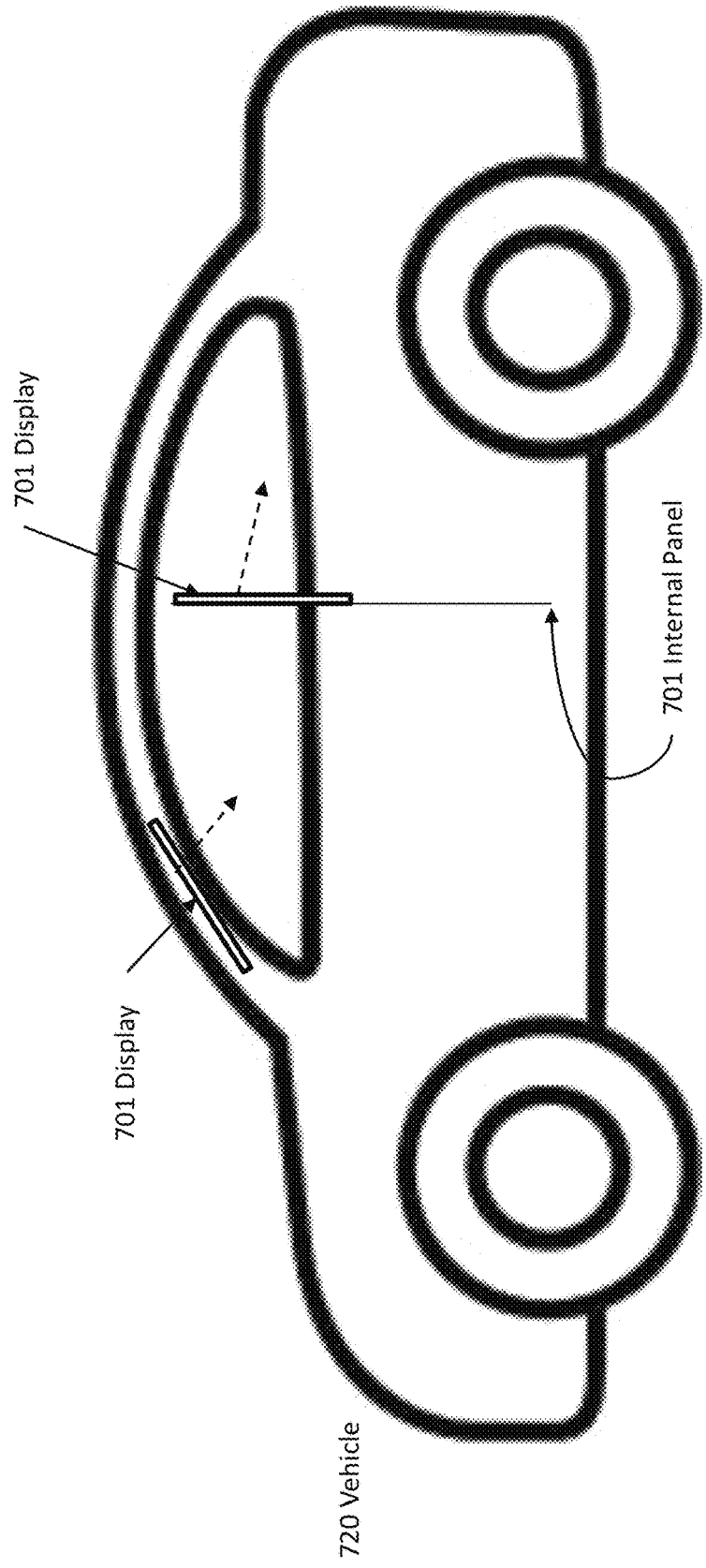
FIG. 7B shows a conceptual drawing of the example display disposed in a vehicle.

FIG. 7 (collectively including FIGS. 7A and 7B) shows a conceptual drawing of eyewear used with an example display. FIG. 7A shows a conceptual drawing of the example display disposed on or in a building or structure. FIG. 7B shows a conceptual drawing of the example display disposed in a vehicle.

Eyewear Used with a Display

In one embodiment, multiple sets of eyewear 700 can be used with a display 701, such as an stationary display 701a (in or on a building or structure) or a moving display 701b (in or on a vehicle). For example, the display 701 can be disposed so as to be viewable by an audience, such as in a public arena. The display 701 can be operated at a refresh rate (frames per second or fields per second) higher than a rate desirable by viewers (such as a refresh rate of 120 Hz, 170 Hz, 240 Hz, 360 Hz, or otherwise), while each set of eyewear 700 can present to its wearer only a selected subset of the frames being presented by the display 701. This can have the effect that each wearer of a separate set of eyewear 700 can receive a separate subset of the frames being presented by the display 701, thus a separate (motion picture) presentation.

For example, the display 701 can be operated at a refresh rate four times (4×) or eight times (8×) an ordinary refresh rate for a motion picture presentation, thus providing a possibility of four separate motion picture presentations being displayed concurrently. In such cases,

- one such presentation can be associated with an ordinary motion picture, for which eyewear 700 is available to viewers at no extra cost or only a nominal extra cost;
- one such presentation can be associated with a motion picture that is reserved for children or other sensitive viewers, such as a presentation that has been edited to remove one or more of: sex, violence, conflict, frightening images, other adult themes, or otherwise (such as a non-conflict version, a non-violent version, a "G"-rated version, a "PG"-rated version, an "R"-rated version, an "X"-rated version, of substantially the same motion picture);
- one such presentation can be associated with a motion picture that has been edited to remove "triggering" images or scenes, such as images or scenes that have a substantial effect on wearers with epilepsy, PTSD, psychological sensitivities, images offensive to particular social groups, other triggering images or scenes, or otherwise;
- one such presentation can be associated with a motion picture that is a "premium" version of the motion picture, such as a "director's cut", a version having additional story elements, a version having superior special effects, or otherwise;
- or otherwise.

For example, the display 701 can be operated with two, three, or more different presentations, such as those different possibilities described above. A first presentation can include a "G"-rated version, having only "G"-rated scenes; a second "R"-rated presentation can include all the "G"-rated scenes plus other more explicit scenes; a third presentation can include all the "G"-rated scenes plus other more explicit scenes distinct from the "R"-rated presentation or in addition thereto. In such cases, wearers using "G"-rated eyewear 100 would see only the "G"-rated presentation, wearers using "R"-rated eyewear would see only the "R"-rated presentation, and wearers using "X"-rated eyewear would see only the "X"-rated presentation. However, at least some scenes can be shared between pairs of those presentations, and possibly some scenes can be shared among all those presentations.

After reading this Application, those skilled in the art would recognize that the display 701 can present a wide variety of different types of presentations, both including the possible presentations described above, as well as other possibilities. For example, the display 701 can be disposed to present a first version of a motion picture image in ordinary circumstances, or an alternative second version of the motion picture image in circumstances where legal restrictions limit the motion picture images allowed to be shown. This can have the effect that multiple versions of a motion picture image can be distributed, even when the unrestricted version would be banned or otherwise restricted in particular jurisdictions.

For another example, the display 701 can be operated at a refresh rate two times (λ×) or four times (4×) an ordinary refresh rate for a motion picture presentation, thus providing a possibility of a three-dimensional (3D) motion picture image being displayed. In such cases, a set of eyewear 700 can be disposed to present selected frames to different ones of the wearer's eyes. The selected frames can differ slightly, such as with respect to point of view (POV). This can have the effect that that the wearer's brain can integrate the selected frames, with the wearer seeing a 3D image. For example, a 3D motion picture image can be presented to the wearer by interlacing whether the right lens is open, the left lens is open, both lenses are open, or neither lens is open. This also can have the effect that multiple separate 3D images can be provided to different wearers concurrently.

To present a 3D image, the selected frames can be distinguished by one or more of:

- time division multiple access, with a portion of the selected frames, such as about half of them, are presented for a POV for the wearer's right eye and a portion are presented for a POV for the wearer's left eye;
- color division multiple access, with the portion presented for the wearer's right eye being saturated by a first color (which is filtered by the eyewear's right lens) and the portion presented for the wearer's left eye being saturated by a second color (which is filtered by the eyewear's left lens);
- polarization division multiple access, with the portion presented for the wearer's right eye being polarized in a first manner (such as polarized vertically or right-circularly polarized), which is filtered by the eyewear's right lens, and the portion presented for the wearer's left eye being polarized in a second manner (such as polarized horizontally or left-circularly polarized), which is filtered by the eyewear's left lens;
- or otherwise.

Each of these techniques can have the effect that the wearer's brain integrates the selected frames into a 3D motion picture image.

For another example, the display 701 can be operated in response to movement by the wearer, such as with respect to a theme-park entertainment event or ride. In such cases, when the wearer enters a designated zone, such as within a tunnel or other location without natural light, the display 701 can switch from presenting an ordinary two-dimensional (2D) motion picture image to presenting a 3D motion picture image. Similarly, the display 701 can be operated in response to an ambient light level experienced by the wearer, such as with respect to a daytime or night-time event. In such cases, when the time changes from a daytime event to a night-time event, the display 701 can switch from presenting an ordinary two-dimensional (2D) motion picture image to presenting a 3D motion picture image.

Stationary Display

FIG. 7A shows a conceptual drawing of the example display disposed in or on a building or structure.

As shown in the figure, the display 701 can be mounted or projected in or on a surface of a building or structure 710, such as a movie theatre screen, an external or internal wall 711 of a building, on a temporary backdrop, on a fog for laser shows or other picture shows, onto a water surface, or otherwise. In such cases, an audience disposed to view the presentation can use eyewear 700 to obtain an enhanced, or otherwise edited, motion picture image.

Moving Display

FIG. 7B shows a conceptual drawing of the example display disposed in or on a vehicle.

As shown in the figure, the display 701 can be mounted or projected in or on a surface of a vehicle 720, such as an external window (which could possibly be used for advertising), an internal display (which could possibly be used for entertainment), a windshield (which could possibly be used for a heads-up display, or "HUD", for a driver or navigator). In such cases, a driver or navigator can obtain information with respect to manipulating the vehicle, passengers can obtain information with respect to entertainment or travel, or otherwise.

Alternatively, an audience disposed to view the vehicle can use eyewear 700 to obtain an enhanced, or otherwise edited, motion picture image. This can have the effect that the vehicle can provide advertising or other information to the audience. For example, the vehicle can include a blimp or other lighter-than-air aircraft, onto which a motion picture image is displayed, similar to the display 701 described with respect to FIG. 7A. An audience, such as a set of people attending a sports event, can view the vehicle 720 and each obtain information selected by their individual eyewear.

The vehicle can include an internal panel 702, such as (for an automobile) a divider between the driver's and the passengers' compartment, onto which a motion picture image is displayed, similar to the display 701 described with respect to FIG. 7A. The passengers can view the display 701 and each see a motion picture selected by their individual eyewear. This can have the effect that multiple passengers can different motion pictures at full size, even though only one such display 701 is available for viewing.

FIG. 8—Hybrid Personalization

FIG. 8 shows a conceptual drawing of an example eyewear used to provide hybrid personalization.

An example eyewear 800 can include one or more elements as shown in the figure, including at least
- one or more lenses 810a, 810b, such as lenses mounted on a frame, or such as contact lenses disposed for wearing by a user (not shown);
- one or more regions 820 disposed on at least one first lens 810a, such as a close-vision region 821, disposed to provide distinct corrections or enhancements to vision in a region where the wearer is looking at a close object, or a distant vision region 822, disposed to provide distinct corrections or enhancements to vision in a region where the wearer is looking at a distant object;
- one or more regions 830 disposed on at least one second lens 810b, such as a close-vision shading region 831 aligned with the close-vision region 821, or a distant-vision shading region 832 aligned with the distant vision region 822.

For example, the one or more regions 820 can be disposed to include regions composable into a bifocal, trifocal, progressive, or otherwise multi-focal lens. In such cases, a bifocal lens can include a close-vision region 821 and a distant vision region 822. A trifocal lens can include a close-vision region 821, a distant vision region 822, and a mid-range vision region. A progressive lens can include multiple regions 820 having distinct corrections, either distinguished at borders between regions or smoothly progressing from a first to a second correction. A multi-focal lens can include regions 820 disposed at upper/lower ranges of the user's field of view (FOV), regions disposed at right/left ranges of the user's FOV, or otherwise disposed in response to the user's gaze direction and/or focal length.

As shown in the figure, the close-vision region 821 can occupy a location through which the user will look when the user is gazing at a relatively close object, such as a book, a computer monitor, a smartphone or other mobile device, or otherwise. Similarly, the distant vision region 822 can occupy a location through which the user will look when the user is gazing at a relatively distant object, such as across or down a street, through a window, or otherwise.

Alternatively, the lenses 810 can include regions in addition to or in lieu of the close-vision region 821 or the distant vision region 822, such as a mid-range region (not shown) disposed to provide distinct corrections or enhancements to vision in a region where the wearer is looking at a mid-range object. For example, the mid-range region can be disposed to occupy a location through which the user would look when the user is gazing at a relatively mid-range object, such as an object in the same indoor room, a person with whom the user is speaking, or otherwise.

Triggering Selection of an Appropriate Region

In one embodiment, an appropriate region can be selected in response to a focal length or a gaze direction, such as might be determined by a dynamic eye movement sensor. When the dynamic eye movement sensor detects the particular focal length, gaze direction, or other reason for selecting a particular region, the identified region can be selected in response to (A) an action by the user, such as a gesture; (B) a timer or time duration; (C) an external event; (D) a communication from another device; or another triggering activity, such as further described herein.

(Action by the User)

For example, a dynamic eye movement sensor can be disposed to identify eye movements, pupil direction, pupil width, interpupillary distance, blinking, blink rate, "dry eye" symptoms, or other features with respect to the eye, so as to identify a direction/distance at which the user is looking, or a time during which the user has been doing so. When the user is looking at a relatively close object, such as when reading a book, or smartphone or other mobile device, a close-vision region 821 can be selected. Alternatively, when the user is looking at a relatively distant object, such as when scanning a field of view (FOV) of an aircraft, car/truck, or other vehicle, a distant vision region 822 can be selected.

In one embodiment, an appropriate region can be selected in response to another prompt, such as an eye gesture, facial gesture, head movement, or mouth gesture. For example, the user can select a particular region 820 by directing their eye at that region and concurrently blinking/squinting. A sensor can be coupled to the dynamic eye tracking sensor and can detect the blink/squint (or one after the other, or both concurrently). In response thereto, the eyewear can select the particular region 820 at which the eye was directed when the eye gesture (or another gesture) occurred.

For example, the eye gesture can include a blink or squint, a glance toward a selected direction, an eyeroll, a selected eye movement (such as a deliberate gaze at a particular object), or another activity by the user's eyes. The eye gesture can include multiple ones of such gestures or combinations thereof.

For example, the facial gesture can include a smile, half-smile, smirk, sneer, spasm, twitch, wince, wink, frown, grimace, grin, pucker, cheek movement, lip movement, nose movement, tongue movement, or another activity by the user's facial muscles. The facial gesture can include multiple ones of such gestures or combinations thereof.

For example, the hand gesture can include touching a button or surface, sliding a finger or other part of the hand along the button or surface, touching a first and second part of the hand, bringing one or more fingers or other parts of the hand within the user's field of view (FOV), moving one or more fingers or other parts of the hand in a selected manner, or another activity by the user's fingers/hands or related anatomy. The hand gesture can include multiple ones of such gestures or combinations thereof.

For example, the head movement can include a hair flip, a nod, jerk, rattle, roll, shake, tilt, turn, twist, or another up/down or right/left movement, or another activity by the user's head or related anatomy. The head movement can include multiple ones of such movements or combinations thereof. Examples can include multiple successive nods, tilts, turns, or other up/down or right/left head movements by the wearer, possibly in combination with other gestures (as further described herein).

For example, the mouth gesture can include clenching/grinding of teeth, or another activity by the user's mouth or related anatomy. The mouth gesture can include multiple ones of such gestures or combinations thereof, possibly in combination with other gestures (as further described herein).

In one embodiment, the sensor can be disposed to detect combinations of first and second eye gestures, facial gestures, hand gestures/movements, head movements, mouth gestures, combinations or sequences of first and second types of gestures, or any other detectable action by the user.

For example, the sensor can be disposed to detect when the user glances up and to the left, followed by blinking. For another example, the sensor can be disposed to detect when the user blinks while tilting their head to the right. Those of ordinary skill in the art would readily recognize the wide variety of possible distinct or alternative combinations, orders, or other varieties of user gestures that can be identified to trigger selection of one or more particular regions.

(Timer or Time Duration)

In one embodiment, the eyewear can be disposed to detect when a selected time duration has occurred. For example, the eyewear can detect when the user has been looking at a particular region of their field of view for longer than a selected duration and can trigger an action in response to that duration.

If the user has been looking at a close-range object for longer than a threshold duration (perhaps 10 minutes, although longer or shorter durations might be called for), the eyewear can trigger shading on a portion of the lens to encourage the user to look away, such as at a longer-range region of their field of view.

If the user has been looking at a relatively small portion (perhaps 10 degrees square, although larger or smaller portions might be called for) of their field of view for longer than a threshold duration, the eyewear can trigger shading on a portion of the lens to encourage the user to look away, such as at a larger or wider region of their field of view.

If the user has been looking at a relatively bright region of their field of view (or a region having relatively high contrast, or a region having a relatively high amount of glare), or a region with a flashing light (such as a strobe light) for longer than a threshold duration, the eyewear can trigger shading on a portion of the lens to encourage the user to look away, such as at a region of their field of view that is less bright, has less contrast, or has less glare.

If the user has been looking at a portion of their field of view having a relatively high saturation of a particular hue (such as bright blue, bright white, bright red, or another color having an effect on the eyes, on the user's emotional state, or correlated with migraines or other medical issues), the eyewear can trigger shading on a portion of the lens to encourage the user to look away, such as at a region of their field of view that is less colorful or otherwise less likely to trigger a migraine or another medical issue. Alternatively, in such cases, the eyewear can adjust the color balance available to the wearer's eye, such as by electronically or otherwise altering the chromatic filtering of the lens.

In these examples, or otherwise when the sensor detects that the user would benefit from looking in another direction for some time, the sensor can act to encourage or urge the user to look at another distance, at another object, in another direction, or otherwise ameliorate the issue detected by the sensor.

(External Event)

In one embodiment, the eyewear can be disposed to detect when an external event occurs that might have an adverse effect on the wearer's vision. Examples can include: the rapid onset of a change in relative brightness in the wearer's field of view (FOV), such as a sudden bright light or a sudden removal of light and onset of relative darkness, the rapid onset of a change in glare or flashing, color balance, or other visual effects that might have an adverse effect on the wearer's vision, prompt migraine, or otherwise affect a wearer medical condition.

In such cases, the eyewear can include a sensor disposed to detect when the external event occurs (or is occurring, or is about to occur, such as responsive to known initial states of the external event or know precursors of the external event. For example, the eyewear can detect a sudden bright light in response to a derivative in a measure of luminance in the wearer's field of view (FOV), or in response to detecting an object likely to product a sudden bright light, such as a floodlight.

When the eyewear, or a sensor disposed thereon, detects an onset of an external event such as a sudden bright light, the eyewear can be disposed to react rapidly, such as by electronically shading one or more regions of the lenses. Electronic shading can be much faster than chemical shading. This can have the effect that, after an initial detection time (of about 50 msec, more or less), nearly all of the incoming bright light can be shaded, and the wearer can be protected from the sudden bright light.

In one embodiment, law enforcement personnel, military personnel, or other personnel using sudden bright light as a nonlethal area effect weapon (such as when using a flashbang grenade or a bright floodlight), can be shaded from the effects of that sudden bright light. This can have the effect that law enforcement personnel, military personnel, or other related personnel can deploy sudden bright light as a nonlethal area effect weapon without being subject to ill effects therefrom.

In one embodiment, personnel piloting a vehicle, such as an aircraft, racing car, sailboat or speedboat, or another vehicle involving attention to operation, can be shaded from the effects of sudden bright light, such as when a bright light (e.g., the sun) is revealed after an obstacle is passed. For example, when the wearer is driving a racing car through a tunnel, the ambient environment as viewed by the wearer can change from relative dark in the tunnel to quite bright as the wearer exits the tunnel. This can have the effect that the driver can drive out of the tunnel at relative high speed without having to wait for their eyes to adjust to the ambient environmental change in brightness.

(Communication from Another Device)

In one embodiment, the eyewear can be disposed to detect when a signal is received from a second device. For example, the second device can be a flashbang grenade, floodlight, or another device disposed to generate a sudden bright light. When the eyewear detects the signal from the second device, the eyewear can be alerted that a change is about to occur in the wearer's ambient environment, that might affect the wearer's eyesight, prompt a migraine, or affect another medical condition. This can have the effect that law enforcement personnel, military personnel, or other personnel in the presence of a device that can generate a sudden bright light, will be alerted ahead of time to the onset of the sudden bright light. Accordingly, their eyewear can shade against the sudden bright light, allowing them to continue without substantial debilitating effect from the sudden bright light.

For example, a flashbang grenade or a floodlight can transmit a (possibly encrypted) message to the eyewear before triggering a sudden bright light. The eyewear can receive the message and initiate shading of the lenses before the sudden bright light hits the wearer's eyes. This can have the effect that the law enforcement personnel, the military personnel, or other personnel can be present when nonlethal visual weapons are used, without having to coordinate with the users of those weapons.

For example, a racing car can receive a message from a device disposed near the exit of a tunnel, informing the driver's eyewear that there will be a sudden bright light when the vehicle exits the tunnel. The eyewear can receive the message and shade the lenses just as the vehicle exits the tunnel, improving visibility and reducing strain on the wearer's eyes. Similarly, for another example, the racing car can receive a message from a second device disposed near the entrance of the tunnel, informing the driver's eyewear that there will be a sudden reduction in light when the vehicle enters the tunne. The eyewear can receive the message and reduce shading on the lenses just as the vehicle enters the tunnel, improving visibility and clarity for the driver while maneuvering in the tunnel. This can have the effect that the driver is not debilitated by light changes when entering or exiting the tunnel.

Urging the User to Use an Appropriate Region

The one or more regions 820 can combine distinct corrections or enhancements to vision, in combination with one or more other techniques to urge the user to direct their gaze in a direction through those locations when gazing at an object at an associated distance. For example, the eyewear 800 can be disposed to shade a portion of the lens so as to urge the user to look through a portion of their field of view that does not involve looking through that portion of the lens.

If the user gazes at an object at a close distance, the one or more regions 820 can be disposed to urge the user to look through the close-vision region 821. Similarly, when the user gazes at an object at a close distance, the one or more regions 820 can be disposed to urge the user to look through the close-vision region 821. This can occur when the user is looking through a portion of the lens, such as when the lens includes a bifocal, trifocal, multifocal, or progressive lens (e.g., with differing degrees of vision correction). In such cases, the eyewear can encourage the user, such as using shading of portions of the lens, to look through a correct portion of the lens.

Similarly, if the user is looking through a portion of the lens that is receiving light that is very bright, has substantial glare, or is flashing, the eyewear can urge the user to look away from that portion, such as through a portion of the lens that is not subject to those effects.

Similarly, if the user is looking through a portion of the lens that is receiving light that is chromatically imbalanced, such as having a substantial excess of bright blue or bright red, or another color having an eyestrain effect, an emotional effect, or prompting a medical condition with respect to the user, the eyewear can urge the user to look away from that portion, such as through a portion of the lens that is not subject to those effects.

(Viewing Distance)

In one embodiment, the one or more regions 820 can each include one or more techniques to urge the user to direct their gaze appropriately. For example, the eyewear 800 can determine when the user's gaze is directed at a close distance, (A) such as by determining the user's gaze direction, and using object recognition to determine an object at which the user is looking; (B) such as by using pupil width or stereoscopy to determine a distance at which the user's eyes are focusing; or otherwise.

Having determined a distance at which the user's gaze is focused, the eyewear 800 can determine which one of the one or more regions 820 is best suited for the correction or enhancement of the user's vision when focusing at that distance. For example, when the user gazes at an object at a close distance, the one or more regions 820 can be disposed to urge the user to look through the close-vision region 821.

In one embodiment, the eyewear 800 can be disposed to urge the user, such as under the control of a computing device, an electronic circuit, or otherwise, to look through a selected region 820 by one or more of:

- shading other unselected regions 820, so as to discourage the user from looking through the unselected regions 820, or inverse-shading the selected region 820, so as to encourage the user to look through the selected region 820;
- altering one or more chromatic responses of the unselected regions 820, so as to discourage the user from looking through the unselected regions 820, or so as to emphasize to the user that the unselected regions 820 are discouraged, or altering one or more chromatic responses of the selected region 820, so as to encourage the user to look through the selected region 820, or so as to emphasize to the user that the selected region 820 is encouraged;
- altering one or more polarization responses of the unselected regions 820, so as to discourage the user from looking through the unselected regions 820, or so as to emphasize to the user that the unselected regions 820 are discouraged, or altering one or more polarization responses of the selected region 820, so as to encourage the user to look through the selected region 820, or so as to emphasize to the user that the selected region 820 is encouraged;
- altering one or more prismatic responses of the unselected regions 820, so as to alter the field of view (FOV) of the user when looking through the unselected regions 820, such as to direct that FOV to one or more objects appropriate to the selected region 820, or altering one or more prismatic responses of the selected region 820, so as to alter the FOV of the user when looking through the selected region 820, such as to direct that FOV to one or more objects appropriate to the selected region 820;

or otherwise altering the user's view through the selected region 820 or one or more unselected regions 820, so as to direct the user's viewpoint through the selected region 820 or away from one or more unselected regions 820.

For example, the eyewear can include multiple lenses with distinct vision correction elements on a first lens and with distinct shading components on a second lens. The first lens can include a region for vision correction (e.g., using refraction) for close-range viewing and a region for vision correction for longer-range viewing. The second lens can be aligned with the first lens, such as by coupling the second lens in alignment with the first lens, so as to allow the second lens to affect the user's vision at the same time as the first lens.

For example, when the first lens includes multiple regions for vision correction, the second lens can include multiple regions for shading in response to a desired amount of vision correction. When the user focuses on an object at relatively close range, the first lens can include a region disposed for use at that relatively close range. When the user focuses on an object at relatively more distant range, the first lens can include a region disposed for use at that relatively more distant range.

In such cases, when the user looks at an object at the relatively close range, the second lens can be disposed to urge the user to look through the portion of the first lens associated with that relatively close range. The second lens can be disposed to shade those portions of the user's field of view (FOV) that are not associated with that relatively close range, so as to urge the user to look through the "correct" portion of the first lens, i.e., the portion of the first lens associated with that relatively close range. This can have the effect that the second lens urges the user to look through the "correct" portion of the first lens.

Similarly, when the user looks at an object at the relatively more distant range, the second lens can be disposed to urge the user to look through the portion of the first lens associated with that relatively more distant range. The second lens can be disposed to shade those portions of the user's field of view (FOV) that are not associated with that relatively more distant range, so as to (similarly) urge the user to look through the "correct" portion of the first lens, i.e., the portion of the first lens associated with that relatively more distant range.

The eyewear can be disposed to control the second lens in response to features of the wearer's eye, such as when the wearer's eyes become strained or excessively dry in response to too much close-range viewing. This can have the effect that the eyewear can notice when the user is excessively focused on close-range vision. The eyewear can then encourage the user to relax their vision and look away toward one or more objects at a relatively more distant range.

In one embodiment, the eyewear 800 can include one or more regions 820 disposed for close-order vision, such as a close-vision region that provides +1 diopter (or another adjustment for correction of close-order vision) when the user is gazing at an object disposed at a relatively close location. Such a close-vision region 821 is sometimes disposed for reading or otherwise examining close-order objects and is typically disposed to correct for the user's ability to view objects at close range. Similarly, the eyewear 800 can include one or more regions 820 disposed for relatively distant vision, such as a distant region that provides +0 diopters (or another adjustment, or lack thereof, for correction of relatively distant vision) when the user is gazing at an object disposed at a relatively distant location. Such a distant region 822 is sometimes disposed for examining distant objects (that is, other than close-order objects) and is typically disposed to correct for the user's ability to view objects at ranges other than close range.

As described herein, the first lens 810*a* can include at least one region 821, such as a close-vision region, with which the second lens 810*b* can include at least one region 831 aligned therewith. Similarly, the first lens 810*a* can include at least one region 822, such as a distant vision region, with which the second lens 810*b* can include at least one region 832 aligned therewith. When the eyewear 800 urges the user to look away from the close-vision region 821 on the first lens 810*a*, the eyewear can shade the aligned region 831 on the second lens 810*b* so as to discourage the user from looking through the region 821. Similarly, when the eyewear 800 urges the user to look away from the distant vision region 822 on the first lens 810*a*, the eyewear can shade the aligned region 832 on the second lens 810*b* so as to discourage the user from looking through the region 822.

In another embodiment, when the eyewear 800 urges the user to look away from the close-vision region 821 on the first lens 810*a*, the eyewear can adjust the color (or color texture) of the aligned region 831 on the second lens 810*b* so as to emphasize to the user that looking through the region 821 is disfavored. For example, when the wearer has been looking through the close-vision region 821 for more than a threshold amount of time (possibly 10 minutes, or more or less), the close-vision region 821 can be disposed with no color, or with a grey color, to indicate that it is disfavored, while the distant-vision region 822 can be disposed with an amber or blue color, to indicate that it is not disfavored.

The selection of colors (or color textures) can be made particular to an individual use case. For example, when playing games using a ball whose targeting is relative important, the ball itself can be disposed in an orange color (to stand out), while sky and grass can be disposed using a neutral grey color (to provide background). In contrast, when playing games using a smartphone or other mobile device, a close-vision region 821 can be polarized using settings for digital devices, while a distant vision region 822 can be polarized using settings for natural lighting.

(Bright Objects)

Similarly, when the eyewear detects that the user is looking at a very bright object or a region of the user's field of view (FOV) that is very bright or has substantial glare, or is flashing or otherwise distracting, the eyewear can take action to direct the user's attention away from the excessive light. For one example, the eyewear can shade the very bright region of the user's FOV. For another example, the eyewear can direct the user's attention to another object by inverse-shading the other object. In such cases, the eyewear can shade a region substantially surrounding (or otherwise emphasizing) the object to which the eyewear directs the user's attention, while leaving the object itself unshaded. This can have the effect that the object appears brighter than the nearby shaded regions, without actually increasing the object's brightness.

For example, the eyewear can be disposed to adjust shading with respect to an object or a portion of the user's field of view (FOV) at which the user is looking. In such cases, when the user is looking in a particular direction, the eyewear can be disposed to shade only portions of the user's FOV in that direction. Similarly, in such cases, when the user is looking at a particular object, such as when looking in a particular direction and at a particular depth of focus so as to distinguish a selected object, the eyewear can be disposed to shade only that selected object. An outbound camera, such as a camera mounted behind one or more of the lenses and disposed to view a location or region at which the user is looking, can be disposed to determine an amount of shading that optimizes the user's view, or to determine an amount of shading that optimizes a clarity of the location or region at which the user is looking.

In such cases, the eyewear can be disposed to detect where the user is looking in response to one or more of: a dynamic eye tracking system, one or more "outbound" cameras disposed to review the user's field of view (FOV) from inside one or more lenses. For example, the dynamic eye tracking system can be disposed to determine in what direction, and at what depth of focus, the user is looking. This can have the effect that the dynamic eye tracking system can determine a location in three-dimensional (3D) space at which the user is looking. For another example, the outbound camera can be disposed to examine the user's FOV from inside one or more of the lenses. Either of these techniques can have the effect that when the user moves their head or otherwise alters their FOV, the eyewear can adjust the 3D location that is shaded. More precisely, the eyewear can adjust a location on each lens so that the joint focus of the user's eyes at that 3D location is shaded.

(Chromatic Imbalance)

Similarly, the eyewear can be disposed to detect when a region of the user's field of view (FOV) is chromatically unbalanced, such as due to an atmospheric effect (e.g., sunrise or sunset). In such cases, the eyewear can be disposed to adjust the chromatic balance of that region of the user's FOV, such as by altering a chromatic response of the lens (or one lens of multiple such lenses). This can have the effect that the user can see objects that might otherwise be obscured by the color imbalance, such as when sunset can make it difficult to see objects that are red or orange, such as streetlights or vehicle brake lights.

In such cases, the eyewear can also be disposed to identify objects that are normally red/orange (or another color for which the color imbalance might obstruct visibility) and to inverse-shade a color balance for those objects. For example, the eyewear can be disposed to detect streetlights or vehicle brake lights, or aircraft warning lights or landing strip lights. In such cases, the eyewear can be disposed to chromatically adjust a region of the user's field of view (FOV) substantially surrounding the object (or otherwise near the object) to remove the imbalanced color, while leaving the object itself its natural color. This can have the effect that the user can clearly see the object with its natural color despite the chromatic imbalance.

(Attention Pattern)

Similarly, when the eyewear detects a prospective or actual problem with respect to the wearer's attention pattern, the eyewear can be disposed to identify a problem and take action to direct the user's vision. For example, if the eyewear detects that the user's vision is unusually focused in a particular direction, such as when the user is about to doze off when driving, it can take action to ameliorate the problem. The eyewear can direct the user's attention away from the region where the user's vision is unusually focused, or to direct the user's attention toward a more propitious direction, or otherwise attempt to cause the user to focus properly while driving.

For example, the eyewear can shade a region where the user's vision is unusually focused, so as to force the user to look in a different direction. Alternatively, the eyewear can shade a very small region where the user's vision is unusu- ally focused, so as to avoid blocking the user's vision in the direction where they are driving the vehicle; in such cases, the eyewear can generate a relatively smaller shaded region, disposed to move about in the user's field of view (FOV), so as to attract the user's attention and jostle the user away from dozing off. For example, the eyewear can be disposed to generate a relatively small darkly shaded dot that moves so as to attract the attention of the user.

For another example, when the eyewear detects that the user's vision is unusually defocused, such as might occur when the user is excessively tired, is dozing off, or is subject to an adverse medical condition, the eyewear can be disposed to inverse-shade a region of the user's field of view (FOV) so as to attract the user's attention. In such cases, the eyewear can inverse-shade a region of the user's FOV so as to text whether the user is sufficiently responsive to prompts, thus possibly indicating whether the user is sufficiently alert to drive a ground vehicle, pilot an aircraft, or otherwise operate heavy machinery. In such cases, the eyewear can be disposed to alert the user, or if that is insufficient, to send a message to obtain assistance for the user.

In such cases, when the eyewear detects, in response to the user's vision, that the user is subject to an adverse medical condition, the eyewear can send a message to medical personnel, to emergency responders, to user support persons (such as friends or relatives), to local volunteers or other "good Samaritans", or otherwise to request assistance. The eyewear can be disposed to send information describing the user's medical status, the nature of the user's vision, the nature of the adverse medical condition, and any other information relevant to obtaining or rendering assistance.

Hybrid Alteration of Unselected Regions

In such cases, the eyewear 800 can alternatively apply a different hybrid alteration to the unselected region 820, such as a chromatic alteration, a prismatic alteration, a polarization alteration, or otherwise.

(Shading/Inverse-Shading)

In such cases, when the eyewear 800 determines that the user is gazing at a close-range object, the eyewear 800 can shade the distant region 822 (or inverse-shade the close-order region 821), so as to encourage the user to look through the close-order region 821. For example, the eyewear 800 can include a shading element disposed to shade the unselected region (that is, the distant region 822) or inverse-shade the selected region (that is, the close-order region 821). This can have the effect that the user is encouraged to look through the close-order region 821. When the unselected region 820 is 100% shaded, that is, it is made completely dark or otherwise opaque, the user can be required to look through the selected region to be able to see, thus would be required to use the selected region.

Thus, when the user's gaze is directed to a close object, the eyewear 800 can require the user to use the close-order region 821 to view that object. Similarly, when the user's gaze is directed to a distant object, the eyewear 800 can require the user to use the distant region 822 to view that object. Similar principles apply to mid-range objects, to objects in an area of the user's peripheral vision, to objects that are partially obscured in the user's field of view (FOV), or otherwise.

In one embodiment, the eyewear 800 can apply shading/inverse-shading by polarization of the selected region 820 or the unselected region 820. For example, the eyewear 800 can apply shading by polarizing the unselected region 820 so as to remove much of its luminance; this can have the effect that the unselected region 820 can appear less bright than the selected region 820, thus encouraging the user to look through the selected region 820. For another example, the eyewear 800 can apply shading by polarizing the selected region 820 so as to remove glare or excessive light; this can have the effect that the selected region 820 can appear without glare or otherwise undisturbed by visual artifacts, thus (again) encouraging the user to look through the selected region 820.

(Chromatic Alteration)

For example, the eyewear 800 can apply a first chromatic alteration to the unselected region 820, such as by altering colors in the unselected region 820 to appear black-and-white to the user. This can have the effect that the user would immediately see that the unselected region 820 was disfavored, thus that the user was encouraged to use the selected region 820. However, the user would still be able to use the disfavored unselected region 820, only without color resolution.

For another example, the eyewear 800 can apply a second chromatic alteration to the unselected region 820, such as by altering colors in the unselected region 820 to remove (or to enhance) one or more colors from the color gamut available to the user when looking through the unselected region. For example, the eyewear 800 can filter colors in the unselected region 820 so as to remove blue frequencies from the unselected region 820. This can have the effect that the user would see colors in the unselected region 820 as substantially skewed toward the red end of the visible spectrum, possibly thus appearing more orange in color, and providing the user with a clear hint that unselected region 820 is disapproved by the eyewear 800.

(Prismatic Alteration)

For another example, the eyewear 800 can apply a prismatic alteration to one or more regions 820, such as by altering a direction of view through those regions 820 to direct the user's view toward an object at the distance associated with those regions 820. In such cases, the eyewear 800 can direct the user's view through those regions 820 toward an object at the appropriate distance. In such cases, when the user has eyewear 800 with both a close-order region 821 and a distant region 822, the eyewear 800 can use a prismatic effect to cause the user to see, when the user looks through the close-order region 821, a book, smartphone or other mobile device, or other near object that the user would generally look down to see. This could apply even if the user's field of view (FOV) through the close-order region 821 was not directed at the near object. Similarly, the eyewear 800 can use a prismatic effect to cause the user to see, when the user looks through the distant region 822, an object or FOV associated with a relatively distant view.

For another example, the eyewear 800 can apply a prismatic alteration to one or more regions 820, such as by altering a direction of view through those regions 820 associated with the user's peripheral vision. In such cases, the eyewear 800 can direct the user's view through those regions 820 toward an object otherwise appearing in the user's peripheral FOV, where the user's vision can be relatively imprecise, to cause that object to appear in the user's central FOV, where the user's vision can have better accuracy. This can have the effect that regions 820 ordinarily associated with peripheral vision can be directed toward the user's central vision, allowing the user to better perceive peripheral regions when appropriate.

Multiple Lenses and Hybrid Personalization

In one embodiment, the eyewear 800 can include multiple lenses to provide hybrid personalization. A first lens 810a can provide for correction or enhancement of the user's vision, while a second lens 810b, overlaying at least a part of the first lens, can provide for hybrid personalization of the first lens. For example, the second lens 810b can include a hybrid element, such as having electronically induced shading, or inverse-shading, electronically induced chromatic alteration, electronically induced prismatic alteration, or otherwise. The hybrid element can be responsive to a programmable computing device. In such cases, the programmable computing device can be responsive to a sensor responsive to infalling light, a sensor responsive to the user's medical or other condition, a sensor responsive to a user input, or otherwise.

Alternatively, the hybrid element can include a device responsive to the infalling light itself, such as a chemical or other device. The response to infalling light can be in response to a heat or thermal effect thereof, to an amount of ultraviolet (UV), to an electric or electromagnetic field thereof, or otherwise. In such cases, the hybrid element can be responsive to infalling luminance to chemically cause shading or chromatic alteration, such as performed by sunglasses responsive to UV or other luminance. Or, in such cases, the hybrid element can be responsive to infalling luminance to polarize the infalling light, with the effect that shading can be performed, such as performed by polarizing sunglasses.

In one embodiment, the eyewear 800 can include, between the first lens 810a and the second lens 810b, an electronic transmitter 840, such as a microwave transmitter, disposed to receive energy from the infalling light or from a voltage differential between the first lens and the second lens. The electronic transmitter can include a power harvester 841, such as further described herein, so as to provide power to the transmitter. In such cases, the electronic transmitter can be disposed to send information to a computer device or other remote device 842, such as for processing, for reporting on the status of the eyewear 800 or the user, for controlling the eyewear or the hybrid element thereof, or otherwise.

In one embodiment, the eyewear 800 can include, in response to the first lens 810a or the second lens 810b, or the electronic transmitter, a circuit 850 disposed to adjust one or more of: the first lens, the second lens, the electronic transmitter, or another aspect of the eyewear. The circuit 850 can be coupled to and responsive to the computing device or other remote device 842, such as a device on the eyewear 800, remotely coupleable to the eyewear, or otherwise.

For example, the eyewear 800 can adjust a correction or enhancement of the user's eyesight (such as using the first lens 810a or the second lens 810b) in response to the circuit 850. This can have the effect that the eyewear 800 can respond to sensory information from the user, from user input, from the ambient environment, from one or more input images available at or near the user, from one or more objects near the eyewear, from predictive information available from a computing device, or otherwise. In such cases, the eyewear 800 can adjust the correction or enhancement of the user's eyesight in response to an object at which the user is looking, in response to a user input, in response to an ambient environment (such as an ambient light level), in response to a medical condition or other condition of the user, or otherwise.

Emulation of User's Field of View

For another example, the eyewear 800 can include a camera or other input element 860, such as a CCD, an infrared (IR) or ultraviolet (UV) receiver, an electromagnetic antenna, or otherwise, disposed to receive one or more inputs from a field of view (FOV) associated with the user's eye(s). For example, a camera or other input element 860 disposed to receive an image similar to the user's eye can be coupled to the computing device or other remote device 842 and customized to have a substantially identical response to the input image as the user's eye(s). In such cases, the eyewear 800 can be controlled by the computing device or other remote device 842, coupled to the camera. This can have the effect that the correction or enhancement applied by the eyewear 800 can be automatically adjusted in response to the image seen by the camera or other input element 860.
(Shading Alteration)

In one such case, the eyewear 800 can determine an amount of shading required in response to an amount of light infalling on the camera or other input element 860, representing the amount of light infalling on the user's eye. In response thereto, the eyewear 800 can cause one or more lens regions 820 to be shaded, or to be shaded or inverse-shaded with respect to an object being viewed by the user, so as to optimize a clarity of the user's view.

In another such case, the eyewear 800 can determine whether there is an excess of ultraviolet (UV) light infalling from the environment. When this occurs, the eyewear 800 can perform shading with respect to the excess UV light, inverse-shading with respect to a selected object being viewed by the user, or other actions to ameliorate the possible effects of excess UV light on the user. For example, some users might be sensitive to excess UV light, such as possibly being subject to migraines, photophobia, or other neurological conditions in response thereto.

In one embodiment, the eyewear 800 can be disposed to adjust shading with respect to at least a portion of the user's field of view (FOV) during a time period while the user blinks. Since a blink takes a finite amount of time, the eyewear 800 can adjust an amount of shading while the user is blinking (and the pupil is covered by the eyelid). This can have the effect that the user sees a different amount of shading before the blink and after the blink. The eye integrates the amount of shading into its received image. This can have the effect that the user does not notice the change in the amount of shading.

In one embodiment, the eyewear can be similarly disposed to adjust other visual effects (such as polarization or refraction) with respect to at least a portion of the user's field of view (FOV) during a time period while the user blinks. Similar to adjustment of shading during the user's blink, this can have the effect that the user sees different other visual effects (such as polarization or refraction) before the blink and after the blink, which can be integrated by the eye into its received image, so that the user does not notice the change.
(Color Alteration)

In another such case, the eyewear 800 can determine an amount of infalling light in each visible frequency range and compare the infalling light with the user's ability to distinguish each color. If the user has any color blindness, either complete color blindness or a more common form such as red-green color blindness, the eyewear 800 can adjust the colors presented to the user's eye in response to one or more of:

optimizing clarity of the user's field of view (FOV) after accounting for the user's color blindness;
presenting a false color image of the user's FOV so as to alert the user with respect to the presence of colors the user is not able, or not easily able, to distinguish;
or otherwise.

For example, when the user has red-green color blindness, the eyewear 800 can present additional brightness over and above the actual infalling light in a selected set of frequencies (such as in blue) to outline red areas of the image and other additional brightness over and above the actual infalling light (such as in yellow) to outline green areas of the image. This can have the effect that the user can see brightly outlined those areas that would otherwise appear grey due to color blindness.

Alternatively, when the user has red-green color blindness, the eyewear 800 can present additional brightness over and above the actual infalling light in a selected set of frequencies (such as in blue) to saturate red areas of the image, so as to allow the user to distinguish red areas of the image from green areas of the image, despite the user's natural color blindness.

Alternatively, when the user has red-green color blindness, the eyewear 800 can present grey areas of the image to indicate red and green areas of the image, along with chyrons or other markers to indicate whether the greyed-out areas should be red or green. When the user has a different type of color blindness, the eyewear 800 can present other types of indicators to the user.

In another such case, the eyewear 800 can determine a type of weather in the user's field of view (FOV), such as by using the outward-facing camera or other input element 860, or such as by receiving a weather report from a remote device (not shown) in response to a GPS device or other location device (not shown). For example, when the weather is very sunny, the eyewear 800 can perform shading or color alteration, so as to emulate sunglasses or otherwise protect the user's eyes from excess sunline, and so as to allow the user to see more clearly in that environment. For another example, when the weather is very cloudy, hazy, or otherwise dark, the eyewear 800 can perform inverse-shading or color alteration, so as to allow the user to see more clearly in that environment.
(Focus Alteration)

In another such case, the eyewear 800 can determine whether the image being presented to the user's eye is in focus. The eyewear 800 can adjust the correction to the image made by one or more lens regions 820 so as to optimize clarity of the image. This can have the effect that unclear images are adjusted by the eyewear 800 so as to present them clearly to the user's eye. In such cases, the eyewear 800 can perform an autofocus function on the image, such as in response to the gaze direction and focal length of the user's eye; in response to object recognition of an object being viewed by the user; in response to motion blur, object blur, or visual noise with respect to an object interacting with its background, or otherwise. In such cases, the user can In another such case, the eyewear 800 can determine a moving object being viewed by the user. For example, when the user is a participant or a view of a sporting event, the moving object can be a baseball, golf ball, or other sporting equipment. For another example, when the user is a law enforcement officer or military personnel, or is engaged in a search-and-rescue operation, the moving object can be a distant person. The eyewear 800 can determine the location of the object in the user's field of view (FOV), such as using an artificial intelligence (AI) or machine learning (ML) technique, as further described herein with respect to other figures. Having identified the object, the eyewear 800 can determine a distance to the object and can alter the presentation of the object to the user so as to enhance the user's depth perception thereof.

User Control of Hybrid Personalization

In one embodiment, the eyewear 800 can receive user input, so as to affect the hybrid personalization. For example, when the user is viewing a selected object or a selected portion of the user's field of view (FOV), the user can perform eye gestures, facial gestures, hand or finger gestures, or other bodily movements, so as to provide inputs to the eyewear 800 that the user desires one or more selected actions by the eyewear.

(Gestures)

For example, the eye gestures can include one or more eye blinks, eye rolls or other pupillary movements, movements of gaze direction, or otherwise, or combinations thereof. The user can blink twice or more in multiple succession, can look up, look down, look right, look left, or in another selected direction, one or more in succession. In some examples: the user can look left and blink twice; the user can look upward-left three times in succession; the user can look upward-left, upward-right, and then down; or otherwise.

For example, the facial gestures can include one or more squints, frowns or smiles, nose wiggles, chin movements, teeth clenching, or otherwise. The user can combine one or more facial gestures, can combine one or more facial gestures with one or more eye gestures, or otherwise.

For example, the hand or finger gestures can include any type of hand or finger movement or positioning, and can be presented
- within the user's field of view;
- within an image capture region of the eyewear 800;
- within an image capture region of an auxiliary outward-facing camera, such as one mounted on a side or rear of the eyewear 800;
- or otherwise. The eyewear 800 can determine that the user has performed one or more hand or finger gestures, and which one, using an artificial intelligence (AI) or machine learning (ML) technique. The hand or finger gestures can be combined with any other gestures available to the user.

(Other User Inputs)

The user can also provide other inputs to the eyewear 800 using a touch control or other input device 870. For example, the input device 870 can include a button, capacitive sensor, motion sensor, slide, switch, touchpad, another device responsive to touch or to proximity of the user's hand or fingers, or otherwise. When the user activates the input device 870, the eyewear 800 can determine that the user desires one or more selected actions by the eyewear. The selected actions can be predetermined when the eyewear 800 is configured or can be altered by the user.

The user can also provide other inputs to the eyewear 800 using a Bluetooth™ control, smartphone, smart watch, or another mobile device. For example, the user can invoke an application (sometimes called an "app") on a smartphone or other mobile device, which can communicate with the computing device to provide inputs to, or otherwise control, the eyewear 800.

Figure 9:
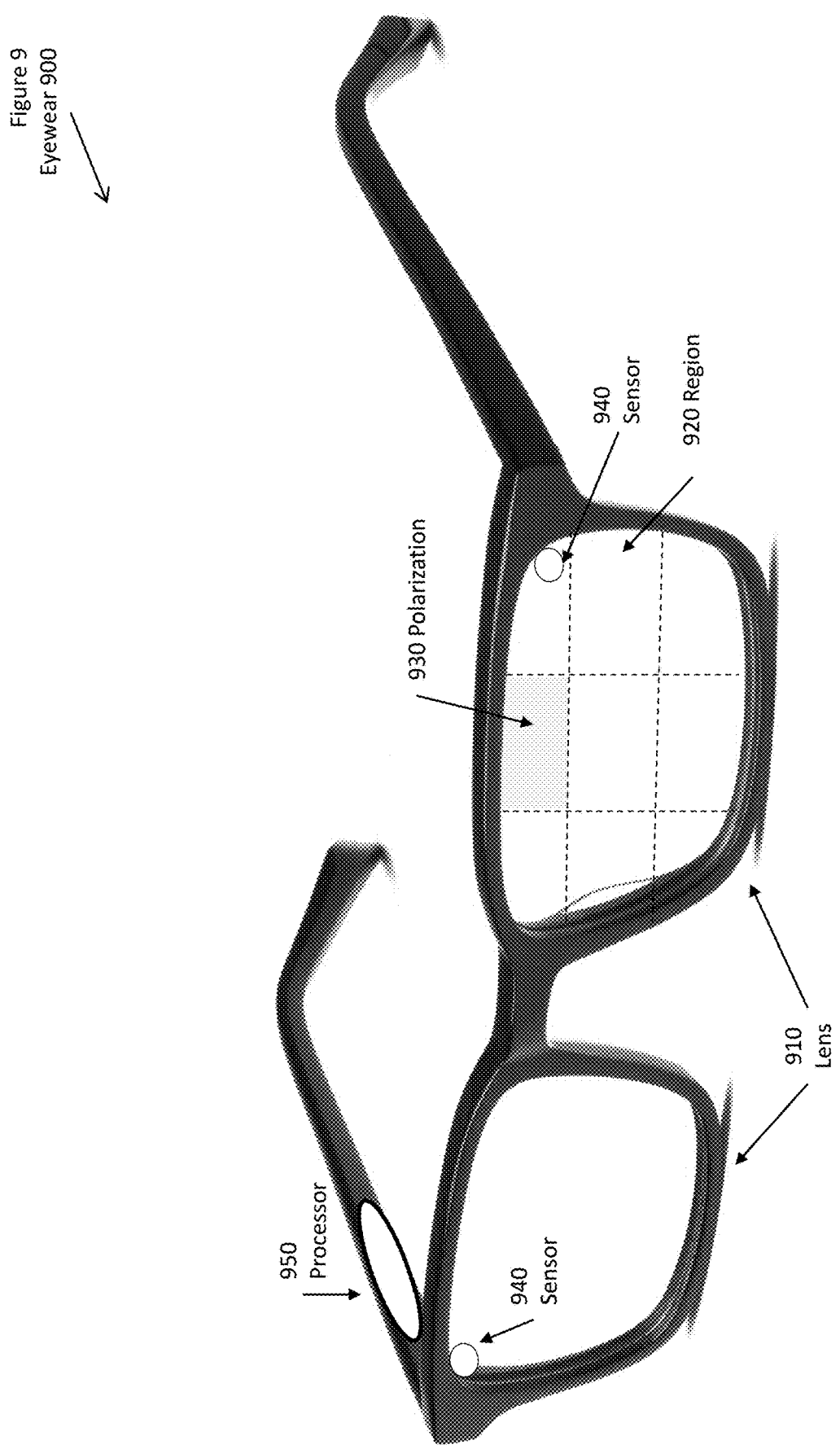
FIG. 9 shows a conceptual drawing of an example eyewear used to provide dynamic adjustment of polarization.

FIG. 9—Dynamic Adjustment of Polarization

FIG. 9 shows a conceptual drawing of an example eyewear used to provide dynamic adjustment of polarization.

An example eyewear 900 can include one or more elements as shown in the figure, including at least
- one or more lenses 910, such as lenses mounted on a frame, or such as contact lenses disposed for wearing by a user (not shown);
- one or more regions 920 disposed on at least one lens, the regions being controllable to adjust polarization in real time;
- one or more polarizers 930 disposed on at least one region, the polarizers being controllable to adjust the polarization of their associated regions;
- one or more sensors 940 disposed to determine an angle of the lenses or the regions, the sensors being coupled to the polarizers;
- (optionally) one or more processors 950 disposed to determine a difference between (A) the polarization provided by the polarizers, and (B) a desired polarization.

As further described herein with respect to other and further embodiments, the one or more regions 920 can cover an entire lens 910. In such cases, when polarization of a region 920 is adjusted, the polarization of the entire lens 910 can be adjusted.

As further described herein with respect to other and further embodiments, the one or more regions 920 can each cover a section of an entire lens 910 defined by a portion of the wearer's field of view (FOV), such as a close-vision region, a distant vision region, or a mid-range vision region. Alternatively, the portion of the wearer's FOV can include a central region of vision or a peripheral region of vision.

As further described herein with respect to other and further embodiments, the one or more regions 920 can each cover a section of an entire lens 910 defined by an individual small portion of the wearer's field of view (FOV), such as an individual pixel. One or more such pixels can be combined to define a larger region. As further described herein, these larger regions can include sets of pixels that are defined statically or dynamically.

As further described herein with respect to other and further embodiments, each such region 920 can be dynamically controlled, such as in real time, to adjust the polarization thereof. For example, each such region 920 can include an electrically controlled polarizer disposed to alter an angle of polarization in real time.

Adjusting Polarization to Match Glare

In one embodiment, the one or more polarizers 930 can be adjusted in real time in response to changes in a relative angle between the wearer's eye and a direction of infalling glare. When light is reflected from a surface, it can become polarized in a plane. For example, this can apply when the reflective surface includes a body of water or a solid object such as glass or metal. When the polarizers 930 are adjusted in response to the polarization plane of the infalling glare, this can have the effect that glare infalling to the wearer's eye can be mitigated. Accordingly, the polarizers 930 can be adjusted so as to reduce or eliminate the amount of glare allowed to reach the wearer's eye.

In one embodiment, the polarizers 930 can be electrically controlled to make desired adjustments. When the polarizing plane is misaligned with respect to infalling glare, the polarizers 930 can be adjusted so that the alignment is improved. For example, when it is desired that the polarizers 930 are aligned at right angles to the plane of the infalling glare, it might occur, due to the wearer's motion or due to a change in angle or direction of the infalling glare, that the polarizers 930 are no longer aligned properly. In such cases, the plane of personalization can be adjusted to a proper angle.

In one embodiment, the polarizers 930 can be electrically controlled to alter the plane of personalization. One or more sensors 940 can determine an angle at which the glare is being viewed. One or more processors 950 can determine a difference between (A) the angle at which the glare is being viewed and (B) a desired angle. The processors 950 can generate an electronic control signal (not shown), such as at an output pin of a processor chip or circuit board (not shown). The electronic control signal can be coupled to one or more of the electrically controlled polarizers 930. This can have the effect of altering one or more of the polarizer's plane of personalization.

In one embodiment, the one or more sensors 940 can include one or more gyroscope or magnetometers, another device suitable to determine a relative orientation of the eyewear with respect to the infalling glare, or a combination thereof. For example, one or more sensors 940 can be mounted on the eyewear, such as on a frame disposed to hold the lenses 910 in place. In such cases, a single sensor 940 can be mounted on the frame near one of the lenses 910, or a pair of sensors can be mounted on the frame near each one of a pair of lenses. Alternatively, a set of sensors 940 can be mounted about one of the lenses 910, such as in a circle or ellipse surrounding a lens, or two sets of sensors can be mounted about two of the lenses, such as in a circle or ellipse associated with and surrounding each lens.

In one embodiment, when the wearer moves their head, the frame can alter their angle with respect to the infalling glare. This can have the effect that the sensors 940 determine that the angle of the wearer's lenses 910 with respect to a reference, and thus with respect to the plane of the infalling glare, has changed. Thus, the polarization angle of the lenses 910 should be changed to maintain the effectiveness of glare reduction.

Alternatively, the one or more sensors 940 can be disposed within the eyewear (such as mounted between the wearer's eye and a lens 910) and can include a sensor disposed to measure an amount of infalling light. For example, the sensor 940 can include a light sensor, an infrared (IR) sensor, a camera, or another device suitable to determine an amount of infalling glare. When so disposed, the sensor 940 can measure an amount of infalling glare at one or more polarization angles, in response to which a processor 950 in the eyewear can select an optimum polarization angle at which to minimize the amount of infalling glare.

In one embodiment, when the one or more processors 950 determine the difference between the two specified angles, this can have the effect of determining a difference between (A) the polarization provided by the polarizers 930, and (B) a desired polarization. The one or more processors 950 can determine this difference periodically, aperiodically, or otherwise from time to time, in real time. This can have the effect that the polarization provided by the polarizers 930 can be adjusted in real time to maintain a desired polarization, such as an optimum polarization for minimizing an amount of infalling glare. For example, when the actual polarization differs from the desired polarization, the one or more sensors 940 can detect that infalling glare is more than a measured minimum amount, and the one or more processors 950 can determine an appropriate correction. This can have the effect that the actual polarization is maintained substantially equal to the desired polarization, or at least close enough that the wearer does not notice a difference.

Adjusting Polarization to Match External Devices

In one embodiment, the one or more polarizers 930 can be adjusted in real time in response to changes in a relative angle between the wearer's eye and a direction of an external device. For example, the external device can include a display, such as a control display or sensor display in a vehicle, such as an aircraft or a racing car. At least some of these control displays or sensor displays can be polarized, thus, their outputs include polarized light.

Depending on the location where the wearer is seated and the direction at which the wearer's head is turned, it can occur that one or more of the polarizers 930 is misaligned with the control display or sensor display, and thus, presents an extremely darkened (or even unreadably black) output.

In one embodiment, the one or more polarizers 930 can be adjusted in response to the location of the wearer and the direction of their head, and in response to knowledge of the location and orientation of the control displays or sensor displays.

In another embodiments, the one or more polarizers 930 can be adjusted in response to a signal, such as an electromagnetic signal, from the control displays or sensor displays to the polarizers 930, in which the displays indicate their relative orientation. For example, the displays can communicate with the polarizers 930 using Wi-Fi, Bluetooth™, near field communication (NFC), or another method In another embodiment, the one or more polarizers 930 can be adjusted in response to a camera disposed behind the polarizers 930 and looking outward in imitation of the wearer; when the camera sees an excessively darkened control display or sensor display, the eyewear can adjust the direction of polarization so as to provide for clear viewing of the control displays or sensor displays.

In another embodiments, the one or more polarizers 930 can be adjusted in response to an external signal, such as a user control (possibly from a smartphone or other mobile device), or from one or more of the control displays or sensor displays identifying its location or orientation.

When the eyewear determines a relative orientation between the polarizers 930 and the control displays or sensor displays, the eyewear can adjust, in real time, an orientation of the polarizers 930. This can have the effect that the polarizers 930 are disposed to allow polarized light to pass through the lenses to the wearer's eyes, so as to allow the wearer to see control displays or sensor displays clearly.

When the eyewear receives a user command directing it to change a relative orientation between the polarizers 930 and the control displays or sensor displays, the eyewear can adjust, in real time, an orientation of the polarizers 930. This can have the effect that the polarizers 930 are disposed to allow polarized light to pass through the lenses as directed by the user, so as to allow the user to see control displays or sensor displays in a manner they desire.

When the eyewear determines a relative orientation between the polarizers 930 and the control displays or sensor displays (by any technique), the eyewear can adjust, in real time, an orientation of the polarizers 930. This can have the effect that the polarizers 930 are disposed to allow polarized light to pass through the lenses to the wearer's eyes, so as to allow the wearer to see control displays or sensor displays clearly.

When used in combination with a camera or other technique for automatically determining the relative orientation between the polarizers 930 and another device (such as control displays or sensor displays), the eyewear can perform a function of "auto-polarization", similar to "autofocus" techniques used with respect to camera focus on objects at a distance. This can have the effect that the polarization field can be controlled (A) to optimize viewing of the object the user is looking at and focusing upon; (B) to eliminate glare and maintain night vision adaptation for the user; (C)

to see clearly in circumstances with relatively wide variances in brightness; and (D) otherwise when unwanted light can be filtered out of the user's field of view using polarization.

Use Cases for Adjusting Polarization

As described herein, adjusting polarization can be useful when the user is manipulating a vehicle, such as an aircraft, a racing car, a sailboat or speedboat, or otherwise when the user's attention is divided between viewing an outside-the-vehicle field of view and a set of control displays or sensor displays inside-the-vehicle. In such cases, the light environment outside the vehicle can vary substantial from the light environment inside the vehicle. Other examples include:

- The user can include law enforcement personnel, military personnel, and other personnel whose attention is divided between potential threats and their own equipment. For example, law enforcement personnel can be distracted at night by automobile lights, flashlights, flood lights, gun muzzle flashes, streetlights, and other unexpected light sources. Law enforcement personnel can benefit from polarizing their own light sources and using eyewear that uses that polarization to filter out those law enforcement light sources.
- The user can include racecar drivers and other vehicle drivers whose attention might be impaired by rapid changes in the light environment, such as when entering or exiting tunnels, passing large hills, or otherwise entering or exiting shadowed regions. For example, racing drivers can benefit from using excess light, such as headlights, and filtering that light away when it is not needed.
- The user can include baseball or other players in a stadium context, particularly at night, whose attention is divided between the game equipment itself and external sources of distraction. For example, distractions can include advertisements, floodlights, spectators, other players, and other unexpected attention-seeking objects.

FIG. 10—Adjustment of Magnification

FIG. 10 shows a conceptual drawing of an example eyewear used to provide dynamic adjustment of magnification.

An example eyewear 1000 can include one or more elements as shown in the figure, including at least
- one or more lenses 1010, such as lenses mounted on a frame, or such as contact lenses disposed for wearing by a user (not shown);
- one or more regions 1020 disposed on at least one lens, the regions being controllable to adjust polarization in real time;
- one or more magnifiers 1030 disposed on at least one region, the magnifiers being controllable to adjust the magnification of their associated regions;
- one or more sensors 1040 disposed to determine a gaze direction and/or focal length of the wearer's eye with respect to the regions, the sensors being coupled to the magnifiers;
- one or more wearer inputs 1050 disposed to receive one or more input controls from the wearer, such as an eye gesture, a touch input, or otherwise;
- (optionally) one or more processors 1060 coupled to the sensors, the wearer inputs, a combination thereof, or otherwise.

As further described herein with respect to other and further embodiments, the one or more regions 1020 can cover an entire lens 1010. In such cases, when magnification of a region 1020 is adjusted, the magnification of the entire lens 1010 can be adjusted.

As further described herein with respect to other and further embodiments, the one or more regions 1020 can each cover a section of an entire lens 1010 defined by a portion of the wearer's field of view (FOV), such as a close-vision region, a distant vision region, or a mid-range vision region. Alternatively, the portion of the wearer's FOV can include a central region of vision or a peripheral region of vision.

As further described herein with respect to other and further embodiments, the one or more regions 1020 can each cover a section of an entire lens 1010 defined by an individual small portion of the wearer's field of view (FOV), such as an individual pixel. One or more such pixels can be combined to define a larger region. As further described herein, these larger regions can include sets of pixels that are defined statically or dynamically.

As further described herein with respect to other and further embodiments, each such region 1020 can be dynamically controlled, such as in real time, to adjust the magnification thereof. For example, each such region 1020 can include an electrically controlled magnifier disposed to alter an amount of magnification, such as in real time.

In one embodiment, the one or more magnifiers 1030 can be adjusted (such as in real time) in response to one or more of (A) changes in gaze direction and/or focal length of the wearer's eye, (B) inputs from the wearer, (C) object recognition, or otherwise. For example, when the wearer's gaze is directed to a selected object, the eyewear can adjust its magnification with respect to the selected object so as to make that object easier for the wearer to distinguish. This might involve increasing or decreasing an amount of magnification of a portion of the wearer's field of view (FOV) in which that object is found.

For example, this can apply when the wearer directs their gaze to a particular drawing, symbol, or word on a display (whether a printed page, a physical sign, a computer display, a smartphone or mobile device display, or a heads-up display). Alternatively, this can apply when the wearer directs their gaze to a particular object or person (whether nearby or distant). When the magnifiers 1030 are adjusted in response to selection of a particular object, that object can be made more easily visible to the wearer.

For another example, this can apply when the wearer desires to apply a binocular effect to their field of view (FOV), such as when the wearer desires to see a distant object more clearly. This can also apply when the wearer desires to see a distant object at a larger magnification, such as when that distant object occupies only a small portion of the wearer's FOV.

For another example, this can also apply when the eyewear attempts to draw the wearer's attention to a particular object, such as an object or person that the eyewear has recognized as of interest to the wearer. In such cases, the eyewear can draw the wearer's attention to the object in one or more of
- highlighting the object/person using shading or inverse-shading;
- highlighting the object/person using color, outlining, artificial phosphorescence (such as by emphasizing the color of the object/person, or altering the color of the object/person to increase contrast with its/their background);
- magnifying the object/person with respect to its/their surroundings;

magnifying the region in the wearer's FOV with respect to the object/person;
or otherwise.

In one embodiment, the magnifiers 1030 can be electrically controlled to make desired adjustments, such as to increase/decrease the amount of magnification. For example, the one or more sensors 1040 can determine one or more of (A) a gaze direction and/or focal length by the wearer, (B) one or more inputs by the wearer, (C) one or more circumstances statistically correlated or otherwise corresponding to circumstances in which the wearer desires an increase/decrease in the amount of magnification, such as when a particular object or person is recognized, or (D) other circumstances in which an increase/decrease in the amount of magnification is desirable. In response thereto, the processors 1060 can generate an electronic control signal (not shown), such as at an output pin of a processor chip or circuit board (not shown). The electronic control signal can be coupled to one or more of the electrically controlled magnifiers 1030. This can have the effect of altering an amount of magnification.

In one embodiment, the one or more sensors 1040 can be disposed within the eyewear (such as mounted between the wearer's eye and a lens 1010) and can include a sensor disposed to measure a gaze direction and/or a focal length by the wearer's eye. For example, the sensor 1040 can include an infrared (IR) sensor or a camera directed at the wearer's eye (such as their pupil), or another device suitable to determine gaze direction and/or focal length. When so disposed, the sensor 1040 can determine an object the wearer's gaze is directed to. In response to this information, the processor 1060 can select an optimum amount of magnification to maximize the visibility of the object.

Alternatively, the one or more sensors 1040 can be disposed on the eyewear (such as mounted on an externally accessible surface) and can include touchable surface disposed to receive an input by the wearer. For example, the sensor 1040 can include a button, a capacitive touch sensor, a slider, a proximity sensor, a voice input, or otherwise, disposed to detect when the wearer provides an input indicating the wearer's desire to increase/decrease magnification. When so disposed, the sensor 1040 can determine that the wearer desires to increase/decrease an amount of magnification of the eyewear. In response to this information, the processors 1060 can increase/decrease the amount of magnification as directed by the wearer.

Alternatively, the one or more sensors 1040 can be disposed on the eyewear, such as mounted on a forward-looking camera directed at the wearer's field of view (FOV). In such cases, the sensors 1040 can be disposed to provide information from which the processors 1060 can determine an object or person in the wearer's FOV. In response to this information, the processors 1060 can increase/decrease the amount of magnification so as to make the detected object or person more visible to the wearer.

Alternatively, the processors 1060 can be disposed to receive information from one or more sensors 1040 and can combine that information so as to detect one or more circumstances in which the wearer has statistically desired a change in an amount of magnification. In response to this information, the processors 1060 can determine a reliability of whether or not the wearer would desire a change in an amount of magnification. When the processors 1060 determine a sufficient degree of confidence that the wearer would desire a change in an amount of magnification, the processors can increase/decrease the amount of magnification so as to conform to the wearer's predicted desire.

In one embodiment, when the processors 1060 determine that the amount of magnification should be changed, this can have the effect of making one or more images or objects in the wearer's field of view (FOV) more visible to the wearer. The one or more processors 1060 can determine whether to make such changes periodically, aperiodically, or otherwise from time to time, in real time or otherwise.

FIG. 11—Dynamic Adjustment of Reflection

FIG. 11 shows a conceptual drawing of an example eyewear used to provide dynamic adjustment with respect to reflection and partial reflection.

An example eyewear 1100 can include one or more elements as shown in the figure, including at least
- one or more lenses 1110, such as lenses mounted on a frame;
- one or more mirrors 1120 disposed to provide a reflective effect, so as to allow the wearer (not shown) to see at an angle not ordinarily available;
- one or more sensors 1130 disposed to determine a gaze direction and/or focal length of the wearer's eye with respect to the mirrors, the sensors being coupled to the mirrors;
- one or more wearer inputs 1140 disposed to receive one or more input controls from the wearer, such as an eye gesture, a touch input, or otherwise;
- (optionally) one or more processors 1150 coupled to the sensors, the wearer inputs, a combination thereof, or otherwise.

The mirrors 1120 can be coupled to the processors 1150. The processors 1150 can control the angle at which the mirrors 1120 are positioned, and where applicable, can electronically control a focal length of the mirrors 1120. The processors 1150 can determine an angle and distance at which the wearer is looking, such as by using the sensors 1130 to determine a gaze direction and/or focal length of the wearer's eye. The processors 1150 can adjust the angle and focal length of the mirrors 1120 in response thereto. This can have the effect that the wearer can see behind themselves, to the side, or otherwise, using the mirrors 1120.

For example, the mirrors 1120 can be disposed so as to provide a continuous image to the wearer that collectively shows a central vision region and a peripheral vision region. For another example, the mirrors 1120 can be disposed so as to provide a continuous image to the wearer that collectively shows a forward-looking view and a rearward-looking view. This can have the effect that the wearer's eye and brain can integrate the portions of the presentation by the lenses 1110 and the mirrors 1120 so as to present a full image to the wearer, without any disjoint breaks at edges of the lenses 1110 or at disjoint regions therein.

The wearer can also use the lenses 1110 and the mirrors 1120 to view a peripheral vision region of their field of view, using a central vision region of their retina. This can have the effect that the wearer can have as clear vision of the peripheral vision region of their field of view as they have of the central vision region of their field of view.

FIG. 12—Dynamic Adjustment of 3D Presentation

FIG. 12 shows a conceptual drawing of an example eyewear used to provide dynamic adjustment with respect to three-dimensional (3D) viewing of a display.

An example eyewear 1200 can include one or more elements as shown in the figure, including at least one or more lenses 1210, such as lenses mounted on a frame, or such as contact lenses disposed for wearing by a user (not shown);

one or more 3D presentation devices 1220 disposed to provide a 3D presentation, such as a 3D still image (not shown) or a 3D moving image (not shown);

one or more sensors 1230 disposed to determine a gaze direction and/or focal length of the wearer's eye with respect to the regions, the sensors being coupled to the magnifiers;

one or more wearer inputs 1240 disposed to receive one or more input controls from the wearer, such as an eye gesture, a touch input, or otherwise;

(optionally) one or more processors 1250 coupled to the sensors, the wearer inputs, a combination thereof, or otherwise.

As further described herein with respect to other and further embodiments, the 3D presentation devices 1220 can include one or more controllers with respect to the lenses 1210, so as to provide images to the wearer that collectively show a 3D presentation. As further described herein, the images can include portions of the 3D presentation at distinct depths of the wearer's field of view (FOV). This can have the effect that the wearer's eye and brain can integrate the portions of the 3D presentation so as to present a 3D image (still or moving) to the wearer.

For example, one or more 3D images (such as a 3D still image, a 3D moving image, or a combination thereof) can be presented with respect to a display. The display can include one or more of a smartphone or another mobile device display, a phablet or tablet display;

a wearable or implantable device display;

a computer display, an internet browser display;

a gaming device display;

a television display or another video display;

a head-up display (HUD), a billboard display, a movie theater display, a window or other see-through display;

a biomedical display or another telemedicine display;

a computer-aided design (CAD) display, a modeling or presentation display, or another multi-viewer display;

or otherwise.

In such cases, a 3D still image or a 3D moving image can be presented with respect to a smartphone or another mobile device display, such as might be presented with respect to a game "app" executing on the smartphone or mobile device, or such as might be presented with respect to an 3D video call using the smartphone or mobile device.

Alternatively, a 3D still image or a 3D moving image can be presented with respect to a gaming device display, a computer device, or a related type of display, such as might be presented with respect to a game being played by one player, or between or among more than one player, or such as might be presented with respect to a game being played using the internet or another long-distance communication link.

Alternatively, a 3D still image or a 3D moving image can be presented with respect to a 3D presentation being made to an audience, such as might occur with respect to a live-action show, a movie theater, a news event, a sports activity (in which an individual player's action can be focused-upon and presented to the audience), or otherwise. Similarly, a 3D presentation can be made to a class of students, or another audience.

Alternatively, a 3D still image or a 3D moving image can be presented with respect to a telemedicine activity or another relatively long-distance expert activity. For example, an expert can provide oversight to a student or another individual performing an activity under the aegis of an expert who is unable to attend physically, or for whom personal attendance is infeasible.

When the display is disposed to provide a 3D presentation and the wearer alters their gaze from/to the display, the eyewear can turn on/off a 3D presentation in response thereto. For example, when the eyewear is disposed to provide a 3D presentation at the display and the wearer moves their gaze from the display, the eyewear can turn off its 3D presentation and allow the wearer to see their normal field of view (FOV) without any 3D adjustment. When the wearer moves their gaze to the display, the eyewear can turn on its 3D presentation and allow the wearer to see the display using 3D viewing.

As further described herein with respect to other and further embodiments, the 3D presentation devices 1220 can provide the portions of the 3D presentation using one or more of time-division multiplexing, in which the distinct portions are interlaced with respect to time;

color-division multiplexing, in which the distinct portions are distinguished by a color (such as red/blue);

spatial-division multiplexing, in which the distinct portions are distinguished by a spatial offset or an angle at which they are presented;

lens-division multiplexing, in which the distinct portions are distinguished by which one of the lenses 1210 (or interlaced pixels or regions of the lenses) at which they are presented;

or otherwise.

As further described herein with respect to other and further embodiments, the eyewear can determine, in response to the wearer's gaze direction and/or focal length, or in response to an input by the wearer, or in response to a predictive measure in response to circumstances from which a statistical inference can be drawn, or otherwise, whether the wearer is directing their gaze to a display. When the eyewear is disposed to provide a 3D image with respect to the display, the eyewear can determine when the wearer adjusts their gaze to/from the display. When the wearer adjusts their gaze to/from the display, the eyewear can adjust whether it provides a 3D image, or alternatively, whether it allows normal sight of the wearer's normal field of vision (FOV) without providing a 3D image. This can have the effect that the wearer can view the 3D image at the display without suffering blur when looking away from the display.

Method of Adapting to Changes in Light/Dark Viewing

The eyewear and systems described herein can provide a method of adapting to changes in light/dark viewing, such as by adjusting shading/inverse-shading to activate (or maintain activated) the wearer's rods in their retina. This can be relevant when, for example, the wearer of eyewear described herein transitions from a bright to a dark viewing environment, such as when exiting a bright police car into a dark night-time environment, or such as when entering a bright indoor location from a dark night-time environment;

the wearer of eyewear described herein transitions from a dark to a bright viewing environment, such as when driving or flying from a dark night-time environment to a bright daytime environment.

In such cases, the wearer's rods (which can provide detailed viewing in a dark viewing environment) de-activate relatively quickly and re-activate relatively slowly. The eyewear can be disposed to determine when the wearer is about to transition from a dark to a bright viewing environment; in such cases, the eyewear can shade the bright viewing environment so as to prevent the wearer from losing the activation of their rods (losing their "night vision"). If the bright viewing environment is expected to last substantial time, the eyewear can allow the shading effect to fade, so as to activate the wearer's cones in their retina (gaining "color vision"). This can have the effect that relatively brief exposure to bright light does not cause the wearer to lose their night vision, a phenomenon sometimes called "night blindness".

The eyewear can also be disposed to determine when the wearer is about to transition from a bright to a dark viewing environment; in such cases, the eyewear can shade the bright viewing environment for a relatively long time, so as to allow the wearer's rods to activate (thus, providing the wearer with "night vision"). This can be particularly effective when the wearer is driving a car or piloting an aircraft in the direction of sunset; when the sun is low on the horizon, it can shine directly in the wearer's eyes, degrading the wearer's night vision at a time when it is about to be most needed.

Method of Protecting Eyesight from Changes in Light/Dark Environments

Example ambient luminance cases. The eyewear and systems described herein can provide a method of protecting the wearer's eyesight from changes in relative light/dark environments, such as by adjusting shading/inverse-shading to prevent excessive ambient luminance from penetrating to the wearer's retina. This can be relevant when, for example, the wearer of eyewear described herein is subject to a sudden increase in ambient luminance, such as when transitioning from a relatively dark ambient environment to a relatively bright ambient environment;

the wearer of eyewear described herein is subject to a sudden increase in ambient luminance, such as when the wearer receives sudden glare or other bright light directed at their eye(s);

the wearer of eyewear described herein is subject to a sudden increase in background luminance, such as when the wearer is tracking a moving object that moves in front of a bright light source, such as a floodlight or the sun;

the wearer of eyewear described herein is subject to a sudden increase in sensitivity to ambient luminance, such as when the wearer has recently been the subject of a medical procedure that has the effect of causing the eyes to become more light-sensitive;

the wearer of eyewear described herein is subject to a sudden increase in ambient luminance, in which the change in ambient luminance is too fast for the wearer's eyes to react;

the wearer of eyewear described herein is subject to a sudden increase in ambient luminance, such as when using a "night vision" device or another type of device that amplifies luminance;

the wearer of eyewear described herein is subject to an increase in ambient luminance with respect to only one of two eyes, such as when the wearer attempts to keep track of multiple objects, one of which has a bright background and one of which does not;

the wearer of eyewear described herein is subject to an increase in ambient luminance with respect to only a subset of colors, such as when the wearer is subject to an increase in ambient luminance with respect to only blue or ultraviolet, only green, or only red or infrared;

the wearer of eyewear described herein is subject to a short pulse, or multiple short pulses, of change in ambient luminance, such as a sequence of short pulses of greatly increased ambient luminance.

In one embodiment, the eyewear and systems described herein can include an ambient luminance sensor, as further described herein, that can determine an amount of ambient luminance to which the wearer's eye is subject. For example, the ambient luminance sensor can be coupled to a computing device, which can control a shading element so as to protect the wearer's eye against excessive ambient luminance. The computing device can compare the amount of ambient luminance against a threshold value and can determine whether to provide shading in response to that comparison.

For example, this process can be useful when the wearer is subject to a sudden increase in ambient luminance, such as when transitioning from a relatively dark ambient environment to a relatively bright ambient environment. In such cases, the transition can trigger the computing device to provide a different amount of shading, so as to prevent the wearer from being temporarily blinded or subject to eye pain by the newly-bright ambient environment.

For another example, this process can be useful when the wearer is subject to a sudden increase in ambient luminance, such as when the wearer receives sudden glare or other bright light directed at their eye(s). The sudden glare can be from a "flashbang" grenade, as further described herein, from a reflection of a floodlight or the sun from a reflective surface, as further described herein, from revealing a bright background light such as a floodlight or the sun, as further described herein, or otherwise. This can occur when a shiny object moves so as to cause a reflection of light into the wearer's eyes, or when a cloud moves away from the sun to reveal bright light. The sudden glare can also result from the wearer tracking a moving object that moves in front of a bright light source, such as a floodlight or the sun, as further described herein. This can occur when the wearer is involved in a sport, such as a baseball player who is tracking a ball with a floodlight or the sun as background.

For another example, this process can be useful when the wearer is subject to a sudden increase in sensitivity to ambient luminance, such as when the wearer has recently been the subject of a medical procedure that has the effect of causing the eyes to become more light-sensitive. Examples of such medical procedures can include (A) cataract surgery, (B) surgery with respect to detachment of the retina, (C) eye dilation from an optometrist visit, or otherwise. This can occur when the wearer has had their eyes dilated at an optometrist visit and becomes very sensitive to sunlight or other bright light.

For another example, this process can be useful when the wearer is subject to a sudden increase in ambient luminance, in which the change in ambient luminance is too fast for the wearer's eyes to react. In such cases, the wearer's eyes can generally only reach with respect to a turn-off or turn-on time for the wearer's cone or rod cells, while the eyewear can react electronically. Similarly, the wearer's eyes can generally only react within about 300-500 milliseconds, while the eyewear can react electronically within about 5-50 milliseconds. Thus, the eyewear can react sufficiently fast that bright light, glare, or other debilitating visual input, can be shaded by the eyewear against damage or pain to the wearer.

For another example, this process can be useful when the wearer is using a "night vision" device or another type of device that amplifies luminance, and there is a sudden increase in ambient luminance. In such cases, the device that amplifies luminance can make the error of rapidly increasing luminance as viewed by the wearer, with the possible effects of (A) making it difficult for the wearer to see, (B) debilitating the wearer's night vision, or otherwise. For example, when using a "night vision" device, the wearer might be subject to adverse effects when their target shines a light in their direction; in such cases, it can be useful for the eyewear to rapidly shade the wearer against that light. Moreover, in such cases, the shading element can be disposed between the wearer's eye and the "night vision" device itself.

For another example, this process can be useful when the wearer is subject to an increase in ambient luminance with respect to only one of two eyes. This can occur when the wearer is involved in a sport, such as a baseball player who is (with one eye) tracking a ball with a floodlight or the sun as background, and who is (with another eye) concurrently tracking another player who is moving. In such cases, the wearer's view of the ball might need to be shaded, while the wearer's view of the other player might not need to be shaded.

For another example, this process can be useful when the increase in ambient luminance is only with respect to a particular set of frequency, such as a particular range of colors (e.g., blue/ultraviolet, green, red/infrared, or otherwise). In such cases, the eyewear can shade only with respect to the color(s) for which there is a substantial increase in luminance; thus, the eyewear can restrict its shading to only those color(s). For example, when the increase in ambient luminance is only with respect to blue, the eyewear can shade only blue light, thus reducing the amount of blue light injected into the wearer's eyes.

For another example, this process can be useful when the increase in ambient luminance is only applied for a very short time duration, such as a short pulse, or multiple short pulses, of change in ambient luminance. For example, the wearer can be subject to a sequence of short pulses of greatly increased ambient luminance. Without shading, this can have a deleterious effect on the wearer's visual acuity or other visual capabilities; with shading, the wearer can be protected against this effect.

Multiple ambient luminance thresholds. For example, the computing device can maintain two independent ambient luminance threshold values, such as $\theta_1$ and $\theta_2$, at which an amount of shading is altered, such as to provide shading or to remove shading. Similarly, the computing device can maintain two independent amounts of shading, such as $\sigma_1$ and $\sigma_2$, which represent amounts of shading that are provided (or removed).

For example, without loss of generality, $\theta_2 > \theta_2$ and $\sigma_2 > \sigma_2$. The threshold amounts $\theta_2$ and $\theta_2$ can be separated by an amount of ambient luminance sufficiently large that the wearer would otherwise recognize the difference. Similarly, without loss of generality, $\sigma_1$ and $\sigma_2$ can be separated by an amount of shading sufficiently large that the wearer would otherwise recognize the difference.

In such cases, when the amount of ambient luminance becomes more than $\sigma_2$, the computing device can increase the amount of shading to $\sigma_1$, so as to reduce the amount of luminance reaching the wearer's eyes to a limit that does not impair the wearer's sight even temporarily. The amount of shading can then be maintained at $\sigma_1$, so as to provide the wearer with a relatively stable viewing environment, at least until the amount of ambient luminance is significantly reduced. When the amount of ambient luminance later becomes less than $\theta_2$, the computing device can decrease the amount of shading to $\sigma_2$, so as to increase the amount of luminance reaching the wearer's eyes, again so that the wearer's sight is not impaired even temporarily. This can effectively provide a hysteresis loop, refraining from unnecessary changes in shading, so as to provide that the amount of shading can be dependent not only on the amount of ambient luminance, but also on the recent history of the amount of ambient luminance.

In one embodiment, the computing device can maintain a third independent ambient luminance threshold value, such as $\theta_3$, at which an amount of shading is altered, such as to provide shading or to remove shading. Similarly, the computing device can maintain a third independent amounts of shading, such as $\sigma_3$, which represents an amount of shading that is provided (or removed).

For example, without loss of generality, $\theta_2 > \theta_3 > \theta_2$ and $\sigma_1 > \sigma_3 > \sigma_2$. As further described herein with respect to the pair of threshold values $\theta_2$ and $\theta_2$, the pair of threshold values $\theta_1$ and $\theta_3$, and the pair of threshold values $\theta_3$ and $\theta_2$, can be separated by an amount of ambient luminance sufficiently large that the wearer would otherwise recognize the difference. Similarly, without loss of generality, the pair of shading values $\sigma_1$ and $\sigma_3$, and the pair of shading values $\sigma_3$ and $\sigma_2$, can be separated by an amount of shading sufficiently large that the wearer would otherwise recognize the difference.

In such cases, when the amount of ambient luminance becomes more than the intermediate value $\theta_3$, the computing device can increase the amount of shading to the intermediate value $\sigma_3$. Thereafter, when the amount of ambient luminance increases to more than $\theta_1$, the computing device can increase the amount of shading to $\sigma_1$, or when the amount of ambient luminance decreases to less than $\theta_2$, the computing device can decrease the amount of shading to $\sigma_2$. With three or more such values $\theta_i$ and $\sigma_j$, the amount of shading can be maintained so as to provide a relatively stable viewing environment, at least until the amount of ambient luminance changes significantly, while also continuously adjusting the amount of shading so that the wearer's sight is not impaired even temporarily. This can effectively provide a sequence of hysteresis loops, so as to make only necessary changes in shading and to otherwise maintain a relative constant amount of shading for only small changes in the amount of ambient luminance.

In one embodiment, the first and the second ambient luminance thresholds can be set to optimize an amount of visual acuity by the wearer's eye. For example, the wearer's color sensitivity, the wearer's contrast sensitivity, the wearer's night vision, or the wearer's vision sensitivity, can be optimized. Thus, the amount of shading applied to the ambient light can be set so as to allow the wearer the best possible visual acuity, for example, by providing the best possible contrast between a targeted object and a background, between a targeted object and another object, or otherwise.

In one embodiment, the amount of ambient luminance can be determined for the viewing environment separately with respect to each eye. Thus, the amount of shading applied to the ambient light can be set separately with respect to each eye, so as to allow the wearer (for example) to pay attention to different target objects with each eye. Similarly, this technique can provide a hysteresis loop of shading, separately with respect to each eye, between the first and second ambient luminance threshold, or between any adjacent pair of ambient luminance thresholds.

FIG. 13—Illumination where the User is Looking

FIG. 13 (collectively including FIGS. 13A and 13B) shows a conceptual drawing of eyewear used to provide dynamic lighting in a direction being viewed by a wearer.

Illumination by Eyewear

FIG. 13A shows a conceptual drawing of eyewear being used to provide light where the user is looking. As otherwise described herein, an example eyewear 1300 can include one or more elements as shown in the figure, including at least

- a dynamic eye tracking mechanism 1310 disposed to determine a gaze direction and/or focal length of the wearer's eye;
- one or more sensors 1320 disposed to receive commands or requests from the wearer.

As described herein, the eyewear 1300 can also include additional elements disposed to provide illumination where the wearer is looking, such as one or more of

- a lamp (such as an LCD, laser, or other illuminating device) 1330, disposed to provide illumination in a direction in which the wearer is looking;
- (optionally) one or more processors 1350 coupled to the dynamic eye tracking mechanism, the sensors, a combination thereof, or otherwise.

As described herein, the lamp can be disposed on a portion of the eyewear, such as on a frontpiece (such as at a location between the user's eyes) or on an earpiece (such as at a location near the user's temple) and disposed to provide a light beam in a direction which the user is looking and focused at a distance at which the user is focusing. In the figure, the lamp is show disposed on the frontpiece of a set of glasses. However, in the context of the invention, there is no particular requirement for any such limitation; the lamp can be disposed anywhere it can be used to illuminate an object at which the wearer looks.

As described herein, the eyewear 1300 can be disposed to determine a gaze direction and/or focal length of the wearer's eye. In response thereto, the eyewear 1300 can be disposed to direct light from the lamp 1330 in the direction or at the focal length where the wearer's eyes are focusing, thus, to the location in three-dimensional (3D) space where the wearer is looking. This location can be a particular object or a particular surface of a designated object (such as a surface of a smartphone display).

This can have the effect that the eyewear can illuminate objects at which the wearer is looking. Thus, when the wearer adjusts the direction they are looking, adjusts the depth of field at which they are looking, tilts their head, squints, otherwise moves due to an external force, the eyewear can "light where the wearer looks", and if so desired, only where the wearer looks.

As also described herein, the eyewear 1300 can be disposed to illuminate where the wearer looks and to shade areas where the wearer is not looking. For example, when the wearer views a display screen, the eyewear 1300 can be disposed to determine where on the display screen the wearer is looking, to specially illuminate that portion of the display screen, and to shade other portions of the display screen. This can have the effect of highlighting one or more particular portions of the display screen, possibly making those portions easier for the wearer to read.

Illumination by External Device

FIG. 13B shows a conceptual drawing of eyewear being used to control one or more devices to highlight one or more displays, in response to where the user is looking.

As described herein, the eyewear 1300 can also include elements disposed to control an external device, such as

- an electromagnetic or ultrasonic transmitter 1350, possibly disposed to control a device 1360 (such as a smartphone or other mobile device, a phablet or tablet, or a desktop computer having a coupled display) having one or more viewable displays 1370.

For example, when the user is looking at the device 1360, the eyewear 1300 can determine the wearer's gaze direction or focal length. The one or more processors 1350 can receive information from the dynamic eye tracking mechanism 1310 and, in response thereto, determine a three-dimensional (3D) location at which the wearer is looking.

The one or more processors 1350 can direct the transmitter 1350 to send one or more signals to the device 1360, informing the latter where the wearer is looking and directing the device 1360 what tasks to perform with that information. For example, the device 1360 can highlight a designated portion of the mobile device's screen, specifically, a portion at or near where the wearer is looking on the screen.

This can have the effect that the device 1360 can show the wearer just what the wearer is looking for. Some possible advantages include at least the following:

- The wearer can more easily see the portion of the screen they desire to see. For example, when the screen includes text, particularly small text, highlighting the text in which the wearer is interested can more easily allow the wearer to clearly see that text. This can be combined with magnifying the text of interest to the wearer, as other and further described herein.
- The device 1360 can more easily display the portion of the screen of interest to the wearer in otherwise adverse lighting conditions, such as by brightening that portion of the screen, without having to brighten the entire screen. This can have the effect of saving power usage and battery time otherwise available to the device.
- The device 1360 can more easily display the portion of the screen of interest to the wearer at a relatively greater brightness, without excessive power usage. This can have the effect of providing a brighter screen to the wearer for viewing, and can also have the effect of limiting the amount of heating by the device to provide a bright display.

The device 1360 can also urge the wearer to review particular portions of the display, such as by moving the highlighted portions of the display while the wearer is viewing them. This can urge the wearer to move their gaze with the highlighting, thus urging the wearer to move their gaze direction across the display. For example, the device 1360 can move the highlighted portions of the screen across a sequence of text to help the wearer improve their reading speed.

In another embodiment, the eyewear 1300 can be disposed to operate with multiple display screens 1370a and 1370b. The multiple display screens 1370a and 1370b can be controlled either by a single device 1360 (whether a mobile device or a "desktop" device) or by multiple devices 1360 (which can be the same or different types of device). In such cases, the eyewear 1300 can determine whether the wearer is looking at a first screen or a second screen, and in response thereto, cause the screen being looked at (the "active" screen) to have a first visual effect and the screen not being looked at (the "inactive" screen) to have a second visual effect.

For example, the eyewear 1300 can direct the inactive screen to be substantially dimmed, so the user is not subject to excessive brightness directed at their peripheral vision. For another example, the eyewear 1300 can direct the inactive screen to have its color balance altered. In such cases,

- The inactive screen can be filtered to be more amber, so as to reduce peripheral-vision brightness in the blue portion of the visual spectrum; or The inactive screen can be directed to provide green light, so as to prevent or reduce the likelihood of, or to treat or reduce the severity of, migraines.

Altering Illumination by Wearer Commands

In additional embodiments, the eyewear 1300 can be disposed to recognize commands or requests from the wearer to alter the intensity (or other features) of the illumination. In such cases, wearer commands can include capacitive or touch controls, eye or face gestures, finger or hand gestures, head or mouth movements, voice commands, electromagnetic commands from another device, other user commands described herein, or other ways the wearer can direct the eyewear 1300.

In such cases, the eyewear 1300 can be disposed to allow the wearer to direct the illumination to have a different amount of area at the illuminated device 1360 or object, a different angle or amount of polarization, a different color or color balance (or a different set of colors in a varying color pattern), or another visual effect. In additional such cases, the eyewear 1300 can be disposed to direct the device 1360 to increase a magnification, or to impose other visual effects, on the portion of the screen being viewed by the wearer. For example, the eyewear 1300 can be disposed to alter a color or color balance of that portion, to cause that portion to blink, or otherwise change a way that portion can be viewed by the wearer.

FIG. 14—Peripheral Vision

FIG. 14 (collectively including FIGS. 14A and 14B) shows a conceptual drawing of eyewear including a peripheral vision lens. FIG. 14A shows a side view of eyewear including a peripheral vision lens. FIG. 14B shows a top view of eyewear including a peripheral vision lens.

FIG. 14A shows a side view of eyewear including a peripheral vision lens. FIG. 14B shows a top view of eyewear including a peripheral vision lens. One or more peripheral vision lenses can be disposed in a wearer's peripheral field of view, thus, to a side of the wearer's eyes and face.

As otherwise described herein, an example eyewear 1400 can include one or more elements as shown in the figure, including at least
- a frame 1410 disposed to hold one or more front vision lenses, such as one for each eye;
- a pair of earpieces 1420L and 1420R disposed to each hold a peripheral lens, such as one for each eye;
- a dynamic eye tracking mechanism 1430 disposed to determine a gaze direction and/or focal length of the wearer's eye;
- an object recognition system 1440 disposed to determine a three-dimensional (3D) location of an object within the wearer's field of view;
- a peripheral light sensor 1450 disposed to sense the light on the side of the eyewear (such as in the wearer's peripheral field of view) and to provide information to a processor (not shown); the processor can use the peripheral light sensor 1450 to determine where to shade/inverse-shade the peripheral lenses.

As other and further described herein, the dynamic eye tracking mechanism 1430 can be disposed to determine a gaze direction and/or focal length separately for each wearer's eye. For example, the dynamic eye tracking mechanism 1430 can determine whether the wearer's eye is looking at an object identified by the object recognition system 1440. The eyewear 1440 can be disposed so that, when the wearer's eye is looking at an identified object 1460, the eyewear can identify which lens the object is visible through, such as whether the object is visible through a front vision lens or a peripheral vision lens.

The eyewear 1440 can be disposed so that, when the wearer's eye is looking at an identified object 1460 through a peripheral vision lens, the eyewear can shade/inverse-shade one or more of the front vision lenses or peripheral vision lenses. This can have the effect that, when the wearer is looking at an object 1460 using a peripheral vision lens, the eyewear 1440 can shade/inverse-shade the object so as to improve the wearer's visual acuity with respect to the object.

For example, the eyewear 1440 can be disposed to
(1) recognize an object 1460 visible in the wearer's field of view through a peripheral vision lens (which can operate separately for each eye); and one or more of:
(2a) shade/inverse-shade a front vision lens so as to urge the wearer to view the object through the peripheral vision lens (which can also operate separately for each eye);
(2b) shade/inverse-shade the peripheral vision lens so as to improve the wearer's visual acuity with respect to the object (which can also operate separately for each eye).

The peripheral light sensors can also provide an indicator to the processor when bright light is about enter one or more of the front lenses, thus, directly oncoming the wearer's front field of view, before the wearer (or sensors on the front lenses) has their vision affected by the incoming bright light. For example, when the wearer is controlling a vehicle, such as an aircraft or speedboat, this can have the effect of warning the eyewear of incoming bright light approaching the wearer's peripheral vision and then frontal vision, before that incoming bright light debilitates the wearer's vision (in either direction).

This can also have the effect of providing an artificial compass or artificial horizon for the wearer using the Sun as a reference light. For example, the eyewear can use a timer to determine a proper direction of the Sun, in combination with using a peripheral sensor to determine an angle the wearer or the wearer's vehicle makes with respect to the Sun. Similarly, the eyewear can use an accelerometer or gyroscope to determine a relative location of the wearer or the wearer's vehicle (in response to a sequence of accelerations or sequence of movements at constant velocity), or can use a magnetometer to determine a proper direction of the North magnetic pole or South magnetic pole.

The indicator to the processor can also predict other incoming bright lights, such as a headlight, laser, or spotlight, aimed errantly or intentionally at the wearer's eye. The processor, in response to the predicted incoming bright light, can be disposed to shade/inverse-shade one or more of the lenses (whether frontal lenses or peripheral lenses), so as to prevent the wearer from being adversely affected by the incoming bright light before that bright light shines directly into the wearer's eye.

More generally, any two of the lenses, such as a forward-facing lens and a peripheral-facing lens, any two forward-facing lenses, or any two peripheral-facing lenses, can provide different adjustments to visual effects available to the wearer. For example, these visual effects can include any of the visual effects described below. Moreover, as any two such visual effects can be applied separately for each lens, they can be applied separately for each eye.

In other embodiments, a single lens, such as a single forward-facing lens or a single peripheral-facing lens, can provide one or more adjustments to visual effects available to the wearer. For example, these visual effects can include any of the visual effects described below.

The object recognition system 1440 can be disposed to determine a three-dimensional (3D) location of an object within the wearer's field of view. For example, the object recognition system 1440 can be disposed to determine through which lens the wearer can view the object. This can have the effect that the eyewear 1440 can identify where the wearer should look to view the object 1460, such as whether to view the object through a forward-facing lens or a peripheral-facing lens.

The object shading/inverse-shading recognition system 1440 can be disposed to encourage/discourage the wearer to view objects 1460 using their peripheral vision, or to encourage/discourage the wearer from viewing objects using their forward vision, or combinations thereof.

As described in the Incorporated Disclosures, the eyewear 1440 can improve the wearer's visual acuity with respect to the object 1460 by one or more of:

shade/inverse-shade the object so as to allow the wearer to more easily view the object in an ambient light environment;

shade/inverse-shade the object to provide a sequence of still images or a sequence of moving images, so as to allow the wearer to more easily view a moving object (or a spinning object, or an object otherwise changing with respect to its background).

In one embodiment, the eyewear 1440 can shade/inverse-shade the peripheral-facing lens so as to substantially decrease brightness of light incoming from a peripheral direction when the wearer is looking forward. For example, the wearer might be operating a vehicle (such as an aircraft or speedboat) and be directing their attention at instruments for the vehicle, while a relatively bright light is incoming from a peripheral direction. In such cases, it can be desirable to shield the bright light from the peripheral direction to provide a shield to allow the wearer to view the instruments while not being blinded from a side.

Similarly, the eyewear 1440 can shade/inverse-shade the frontal-facing lens so as to substantially decrease brightness of light incoming from a frontal direction when the wearer is looking to a side. For example, when the wearer is operating a vehicle (such as an aircraft or speedboat) and is directing their attention at an object outside the vehicle, while a relatively bright light is incoming from a frontal direction, it can be desirable to shield the bright light from the frontal direction to allow the wearer to view the external object on a side while not being blinded from the front.

For example, the eyewear 1440 can shade/inverse-shade the object to provide a still images or a sequence of moving images as described in the Incorporated Disclosures, such as application Ser. No. 16/684,479, filed Nov. 14, 2019, naming inventor Scott LEWIS, titled "Dynamic visual optimization", currently pending. As described therein, the eyewear can shade/inverse-shade the object by interleaving shaded periods with unshaded periods (herein sometimes called "frames"), so as to provide an image of the object that the wearer's eye integrates into a single image, but which is relatively increased in contrast with an ambient environment. As described therein, each set of frames can include one or more relatively shaded still/moving images interleaved with a relatively unshaded still/moving images, with the relatively shaded images or relatively unshaded images possibly having different amounts of shading. In such cases, this can have the effect that an object viewed against a bright or visually noisy background, or an object viewed while changing against its background (such as a spinning ball or other object), can be viewed with better visual acuity.

In other and further embodiments, the eyewear 1440 can be disposed to alter the wearer's vision through one or more of the front vision lenses, or through one or more of the peripheral vision lenses, using techniques other than shade/inverse-shade. For example, the eyewear 1440 can alter any of the visual effects provided by lenses, including:

a chromatics effect, color balance effect, color injection effect, or other effect on color, viewable through a front or peripheral vision lens;

a corrective lens effect, magnification effect, refraction effect, or other effect on focus viewable through a front or peripheral vision lens;

an anti-glare effect, a polarization effect, or other effect on shading/inverse-shading viewable through a front or peripheral vision lens;

a prismatic effect, a reflection effect, or other effect on direction of images viewable through a front or peripheral vision lens;

or any other effect suitable for improving visual acuity with respect to an object viewable through a front or peripheral vision lens.

The eyewear 1440 can be disposed to combine these effects with a shading/inverse-shading effect, with each other, or in multiple combinations.

In other and further embodiments, the eyewear 1440 can be disposed so as to apply a visual-effect adjustment by one or more of the forward-facing lens or the peripheral-facing lens. For example, the peripheral-facing lens can be disposed to provide a magnification effect, anti-glare effect in response to an amount of light in the ambient environment, or another visual acuity effect, so as to allow the wearer to more easily view an object 1460 appearing in their peripheral vision; the forward-facing lens can be disposed to provide a shading/inverse-shading effect so as to urge the wearer to look in the direction of their peripheral vision. In other examples, the eyewear 1440 can be disposed to apply "digital visual optimization" as described in the Incorporated Disclosures (thus, providing a sequence of still images or a sequence of moving images), so as to allow the wearer to more easily view an object 1460 appearing in their peripheral vision. In other examples, the eyewear 1440 can be disposed to provide other or further possibilities that allow the wearer to more easily view an object appearing in their peripheral vision, to urge the wearer to view an object 1460 appearing in their peripheral vision, or to otherwise improve the wearer's peripheral vision.

In other and further embodiments, the eyewear 1440 can be disposed to apply different adjustments to the forward-facing lens and the peripheral-facing lens, so as to encourage the wearer to view, or to improve the acuity of the wearer's view, of objects 1460 in their peripheral field of view.

Combination of Functions

In one embodiment, the eyewear can combine two or more such functions, such as in response to an input from the wearer designating that those functions should be combined, or such as in response to the eyewear recognizing a circumstance in which the wearer typically requests that those functions should be combined. For example, the wearer can designate that those functions should be combined using an eye gesture or other input. For another example, the eyewear can recognize a circumstance in which the wearer typically requests that those functions should be combined in response to a machine learning technique, such as a statistical response to sensory parameters, wearer parameters, environmental parameters, or otherwise. In such cases, the sensory parameters or wearer parameters can include information with respect to the wearer's medical or other status; the environmental parameters or can include information with respect to the scene in the wearer's field of view (FOV). The eyewear can also be responsive to other information, or to a combination of factors, such as the eyewear being more/less sensitive to selected parameters (or to particular wearer inputs) when sensory parameters or wearer parameters indicate particular medical or other status, or otherwise.

Alternative Embodiments

While this Application primarily describes a systems and techniques that relate to dynamic adjustment of eyewear, including at least one or more of:

dynamically adjusting the eyewear in response to wearer commands, such as when the wearer recognizes that a change in eyewear parameters is desirable;

dynamically adjusting the eyewear in response to commands from an overseer or other party, such as when other party recognizes that the wearer is undergoing a medical or other sensory condition;

dynamically adjusting the eyewear in response to one or more other eyewear devices, such as when multiple wearers are cooperating to each identify information available to any one of them; or otherwise;

dynamically adjusting the eyewear in response to one or more personalization parameters;

dynamically adjusting the eyewear in response to one or more hybrids of environmental factors or wearer commands.

After reading this Application, those skilled in the art will recognize that the techniques described herein are applicable to a wide variety of different types of eyewear and substitutes for eyewear; to a wide variety of facts about the wearer and their eyewear, and any relationship to their environment; to a wide variety of different ways in which the eyewear could be dynamically adjusted; to a wide variety of other devices that could be used with the eyewear, or ways in which the eyewear could be used; or otherwise.

This Application describes a preferred embodiment with preferred process steps and, where applicable, preferred data structures. After reading this Application, those skilled in the art would recognize that, where any calculation or computation is appropriate, embodiments of the description can be implemented using general purpose computing devices or switching processors, special purpose computing devices or switching processors, other circuits adapted to particular process steps and data structures described herein, or combinations or conjunctions thereof, and that implementation of the process steps and data structures described herein would not require undue experimentation or further invention.

The claims are incorporated into the specification as if fully set forth herein.

The invention claimed is:

1. Eyewear including
a first lens having a first particular adjustment to a first particular portion of a wearer's field of view and a second particular adjustment to a second particular portion of the wearer's field of view;
a second lens disposed to direct the wearer's gaze through the first particular portion of the wearer's field of view during a first activity and through the second particular portion of the wearer's field of view during a second activity, the second lens being responsive to one or more features of the wearer's eye;
wherein the second lens is disposed to adjust an amount of shading/inverse-shading to relatively darken a portion of the wearer's field of view to urge the user to use a selected gaze direction.

2. Eyewear as in claim 1, wherein
the first lens is disposed to apply a first and a second visual effect;
the second lens is disposed to select among the first and the second visual effect, so as to provide either the first or the second visual effect to the wearer when looking through the combination of the first and the second lens.

3. Eyewear as in claim 2, wherein
a third lens is disposed to apply a third visual effect.

4. Eyewear as in claim 3, wherein
the third visual effect includes one or more of: a color balance adjustment, a color tint effect, a shading or inverse-shading effect.

5. Eyewear as in claim 1, wherein
the first lens is disposed to apply a first refraction effect when the wearer looks through the first particular portion of their field of view and to apply a second refraction effect when the wearer looks through the second particular portion of their field of view;
the second lens is disposed to apply a visual effect to one of the first or the second particular portion of the wearer's field of view, in response to whether the eyewear selects the first or the second particular portion of the wearer's field of view as a preferred portion of the wearer's field of view through which the user should look.

6. Eyewear as in claim 5, wherein
the first lens is disposed to apply a first and a second visual effect;
the second lens is disposed to select among the first and the second visual effect, so as to provide either the first or the second visual effect to the wearer when looking through the combination of the first and the second lens.

7. Eyewear as in claim 6, wherein
the first visual effect is associated with a long-range viewing distance;
the second visual effect is associated with a short-range viewing distance.

8. Eyewear as in claim 6, wherein
the second lens is disposed to select between the first refraction and the second refraction using one or more of:
a color balance adjustment technique, a color tinting technique, or a shading or inverse-shading technique.

9. Eyewear as in claim 1, wherein
the second lens is disposed to apply shading to a first selected portion of the wearer's field of view, whereby the user is encouraged to look through a second selected portion of the wearer's field of view.

10. Eyewear as in claim 1, wherein
the second lens is disposed to apply shading to a first selected portion of the wearer's field of view, whereby the wearer is encouraged to look toward or away from a particular selected direction.

11. Eyewear as in claim 10, wherein
the second lens is disposed to apply shading to a first selected portion of the wearer's field of view, whereby the wearer is encouraged to look toward or away from a selected object at a particular selected direction and depth of focus.

12. Eyewear as in claim 10, wherein
the second lens is disposed to apply shading to a first selected portion of the wearer's field of view, whereby the wearer is encouraged to look toward or away from a selected object at a particular selected direction and depth of focus.

13. Eyewear as in claim 10, including
a camera disposed to view a location or region at which the wearer is looking, through one or more of the lenses;
a shading element coupled to the camera and disposed to determine an amount of shading to optimize one or more of:
the wearer's view of a selected object at the location or region at which the wearer is looking; or
a clarity of the location or region at which the wearer is looking.

14. Eyewear as in claim 1, wherein
the first lens is disposed to include a first region for vision correction with respect to closer-range vision and a second region for vision correction with respect to longer-range vision;
the second lens is disposed to apply shading to the first region when the eyewear encourages the wearer to look through the second region and to apply shading to the second region when the eyewear encourages the wearer to look through the first region.

15. Eyewear as in claim 1, wherein
the second lens is disposed to apply a visual effect to a selected one of the first or the second region in response to a parameter with respect to the wearer.

16. Eyewear as in claim 15, wherein
the parameter with respect to the wearer includes one or more of:
detection of a feature of the wearer's eye;
detection of a predicted or prospective problem with respect to the wearer's attention pattern;
the lens includes a plurality of regions, each region being disposed to be separately controlled to adjust the viewing effect with respect to that region.

17. Eyewear as in claim 16, wherein
the feature of the wearer's eye includes one or more of:
when the wearer's eye becomes dry or stained in response to excessive closer-range viewing.

18. Eyewear as in claim 16, wherein
the predicted or prospective problem with respect to the wearer's attention pattern includes one or more of:
when the wearer becomes tired;
when the wearer has been paying attention to bright light, light with glare or flashing;
when the wearer has been concentrating on light with potential adverse color balance;
when the wearer has been concentrating on relatively small objects;
when the wearer has difficulty focusing; or
when other aspects of the wearer's field of view affect the wearer's attention, a wearer's medical condition, or the wearer's vision.

19. Eyewear as in claim 1, including
one or more of: an eye tracking system disposed to determine a gaze direction or depth of focus of the wearer's eye, or a camera disposed to view a location or region at which the wearer is looking from inside one or more of the lenses, the eye tracking system or the camera being disposed to determine a location in a three-dimensional space at which the wearer is looking;
wherein when the wearer moves their eyes/face or head, or otherwise alters their field of view, the eyewear is disposed to adjust shading with respect to the wearer's field of view.

20. Eyewear as in claim 19, including
the eye tracking system or the camera are disposed to determine a three-dimensional location at which the wearer is looking in response to a joint focus of the wearer's two eyes.

\* \* \* \* \*